US011718179B2

(12) United States Patent  
Barvesten et al.

(10) Patent No.: US 11,718,179 B2  
(45) Date of Patent: Aug. 8, 2023

(54) PLAYBACK CONTROL ASSEMBLY FOR MEDIA PLAYBACK DEVICE

(71) Applicant: Spotify AB, Stockholm (SE)

(72) Inventors: Mats Barvesten, Karlskrona (SE); Johan Oskarsson, Stockholm (SE); Andreas Cedborg, Stockholm (SE); Björn Nilsson, Uppsala (SE)

(73) Assignee: Spotify AB, Stockholm (SE)

( * ) Notice: Subject to any disclaimer, the term of this patent is extended or adjusted under 35 U.S.C. 154(b) by 978 days.

(21) Appl. No.: 16/434,125

(22) Filed: Jun. 6, 2019

(65) Prior Publication Data

US 2019/0337389 A1 Nov. 7, 2019

(30) Foreign Application Priority Data

May 3, 2018 (EP) .................................... 18170555

(51) Int. Cl.
*B60K 35/00* (2006.01)
*B60K 37/06* (2006.01)
*B60K 37/02* (2006.01)

(52) U.S. Cl.
CPC .............. *B60K 37/06* (2013.01); *B60K 35/00* (2013.01); *B60K 37/02* (2013.01); *B60K 2370/126* (2019.05); *B60K 2370/131* (2019.05)

(58) Field of Classification Search
None
See application file for complete search history.

(56) References Cited

U.S. PATENT DOCUMENTS

| 6,154,201 | A | 11/2000 | Levin et al. |
| 2004/0007450 | A1 | 1/2004 | Kojima et al. |
| 2004/0209642 | A1 | 10/2004 | Kim |
| 2007/0063995 | A1 | 3/2007 | Bailey et al. |
| 2008/0158790 | A1* | 7/2008 | Itoh ...................... H04B 1/3822 361/679.02 |
| 2009/0015549 | A1 | 1/2009 | Gelfond et al. |
| 2009/0229387 | A1* | 9/2009 | Lee .......................... G05G 7/10 74/89.2 |
| 2011/0032666 | A1* | 2/2011 | Gideonse .............. G06F 1/1626 361/679.01 |
| 2016/0085304 | A1 | 3/2016 | Mistry et al. |

(Continued)

FOREIGN PATENT DOCUMENTS

| GB | 1261605 A | 1/1972 |
| WO | 2017/089859 A1 | 6/2017 |

OTHER PUBLICATIONS

Extended European Search Report from corresponding European Application No. 18170555.9, dated Sep. 21, 2018.

(Continued)

*Primary Examiner* — James M McPherson
(74) *Attorney, Agent, or Firm* — Merchant & Gould P.C.

(57) ABSTRACT

A system is provided for streaming media content in a vehicle. The system includes a personal media streaming appliance system configured to connect to a media delivery system and receive media content from the media delivery system at least via a cellular network. The personal media streaming appliance system operates to transmit a media signal representative to the received media content to a vehicle media playback system so that the vehicle media playback system operates to play the media content in the vehicle.

14 Claims, 31 Drawing Sheets

(56) References Cited

U.S. PATENT DOCUMENTS

2017/0255266 A1    9/2017  Holenarsipur et al.
2018/0079305 A1*   3/2018  Teichman .............. B60K 35/00

OTHER PUBLICATIONS

"FM Transmitter, Tohayie Bluetooth Wireless Radio Adapter Audio Receiver Stereo Music Tuner Modulator Car Kit with Hands-free Calling & Dual USB Charger," ToHayie. Accessed Jan. 18, 2018. Available at: https://www.amazon.com/Transmitter-Bluetooth-Wireless-Modulator-Hands-free/dp/B075D7NY4C.
European Extended Search Report in Application 20190260.8, dated Oct. 12, 2020, 5 pages.

* cited by examiner

PLAYBACK CONTROL ASSEMBLY FOR MEDIA PLAYBACK DEVICE

CROSS-REFERENCE TO RELATED APPLICATION(S)

This application claims priority to European Application No. 18170555.9, filed on May 3, 2018, and titled PLAYBACK CONTROL ASSEMBLY FOR MEDIA PLAYBACK DEVICE.

BACKGROUND

Many people enjoy consuming media content while travelling or during other activities. For example, many drivers and passengers listen to audio content, such as songs, albums, podcasts, audiobooks, and other types of audible content, in vehicles. Typical sources of such audio content in vehicles include radios and fixed media players, such as devices that can play media content from CDs, USB drives, or SD cards. Media content from such typical sources is not flexible or personalized for the listeners in vehicles.

Alternatively, mobile devices, such as mobile phones or tablets running audio streaming applications, can offer a personalized and flexible music-consuming experience using large catalogs of media content available from a media content server. However, mobile devices are not well suited for a vehicle environment for various reasons, such as legal restrictions and sophisticated user interfaces that are not convenient for use in a vehicle.

There exists a need for a media playback system that is easy to use and control for media content playback while providing personalized user experience of consuming media content in a vehicle.

SUMMARY

In general terms, the present disclosure relates to a personal media streaming appliance system. In one possible configuration and by non-limiting example, the system is configured to stream personalized media content for playback in a vehicle. Various aspects are described in this disclosure, which include, but are not limited to, the following aspects.

One aspect is a playback control assembly for a media playback device in a vehicle. The playback control assembly includes a control knob assembly. The control knob assembly is movably engaged with a body of the media playback device and configured to receive a manual input from a user for controlling playback of media content. The manual input includes a pressing input and a rotational input. The control knob assembly includes a front face and a rotary knob. The front face has a plurality of input regions. Each input region is configured to receive the pressing input. The front face is configured to be physically depressible at the plurality of input regions, respectively, upon receiving the pressing input thereat. The rotary knob has a rotational input surface configured to receive the rotational input and rotate relative to the front face and the body of the media playback device upon receiving the rotation input.

In certain examples, the playback control assembly includes a display device arranged at the front face of the control knob assembly and configured to display information relating to the playback of the media content.

In certain examples, the front face includes a display carrier configured to receive and support the display device.

In certain examples, the plurality of input regions includes a first region and a second region arranged opposite to the first region with a center of the front face therebetween. The front face is configured to pivot in a first pivot direction and trigger a first playback control instruction when the pressing input is applied on the first region, and pivot in a second pivot direction and trigger a second playback control instruction when the pressing input is applied on the second region.

In certain examples, the plurality of input regions includes a third region and a forth region arranged opposite to the third region with the center of the front face therebetween. The front face is configured to pivot in a third pivot direction and trigger a third playback control instruction when the pressing input is applied on the third region, and pivot in a fourth pivot direction and trigger a fourth playback control instruction when the pressing input is applied on the fourth region.

In certain examples, the plurality of input regions includes a fifth region arranged at the center of the front face. The front face is configured to depress with respect to the body of the media playback device and trigger a fifth playback control instruction when the pressing input is applied to the fifth region.

In certain examples, the control knob assembly includes a plurality of press input sensors arranged under the plurality of input regions of the front face, respectively. Each of the plurality of press input sensors is configured to be actuated when the pressing input is applied to a corresponding input region of the plurality of input regions, thereby causing the front face to be depressed at the corresponding input region.

In certain examples, the plurality of press input sensors is arranged at a plurality of sensor regions under the display carrier. The plurality of sensor regions is aligned with the plurality of input regions of the front face.

In certain examples, the control knob assembly includes a spring device configured to bias the front face to an undepressed position relative to the body of the media playback device.

In certain examples, the rotary knob is configured to surround the front face and provides a peripheral grip surface on which the rotational input is applied to at least partially rotate the rotary knob.

In certain examples, the control knob assembly includes a rotational input sensor device that detects receipt of the rotational input on the rotary knob.

In certain examples, the rotation input sensor device includes an optical rotary encoder assembly.

In certain examples, the optical rotary encoder assembly includes a sensing wheel and one or more sensing units. The sensing wheel is rotatable with the rotary knob and has first strips and second strips that are alternately arranged. The first strips have a first reflection coefficient, and the second strips have a second reflection coefficient. The one or more sensing units each are fixed relative to the rotary knob and configured to emit light toward the sensing wheel and receive reflected light from the sensing wheel.

In certain examples, the control knob assembly includes a bearing device and a detent device. The bearing device is configured to enable the rotary knob to rotate relative to the body. The detent device is configured to resist the rotation of the rotary knob.

In certain examples, the detent device includes a detent wheel and an elastic member. The detent wheel is rotatable with the rotary knob. The detent wheel has an inner diameter with a plurality of grooves. The elastic member is fixedly arranged in the control knob assembly. The elastic member has an arcuate portion configured to engage the plurality of grooves as the detent wheel rotates together with the rotary knob, thereby providing resisting force against the rotation of the rotary knob.

DETAILED DESCRIPTION

Figure 1:
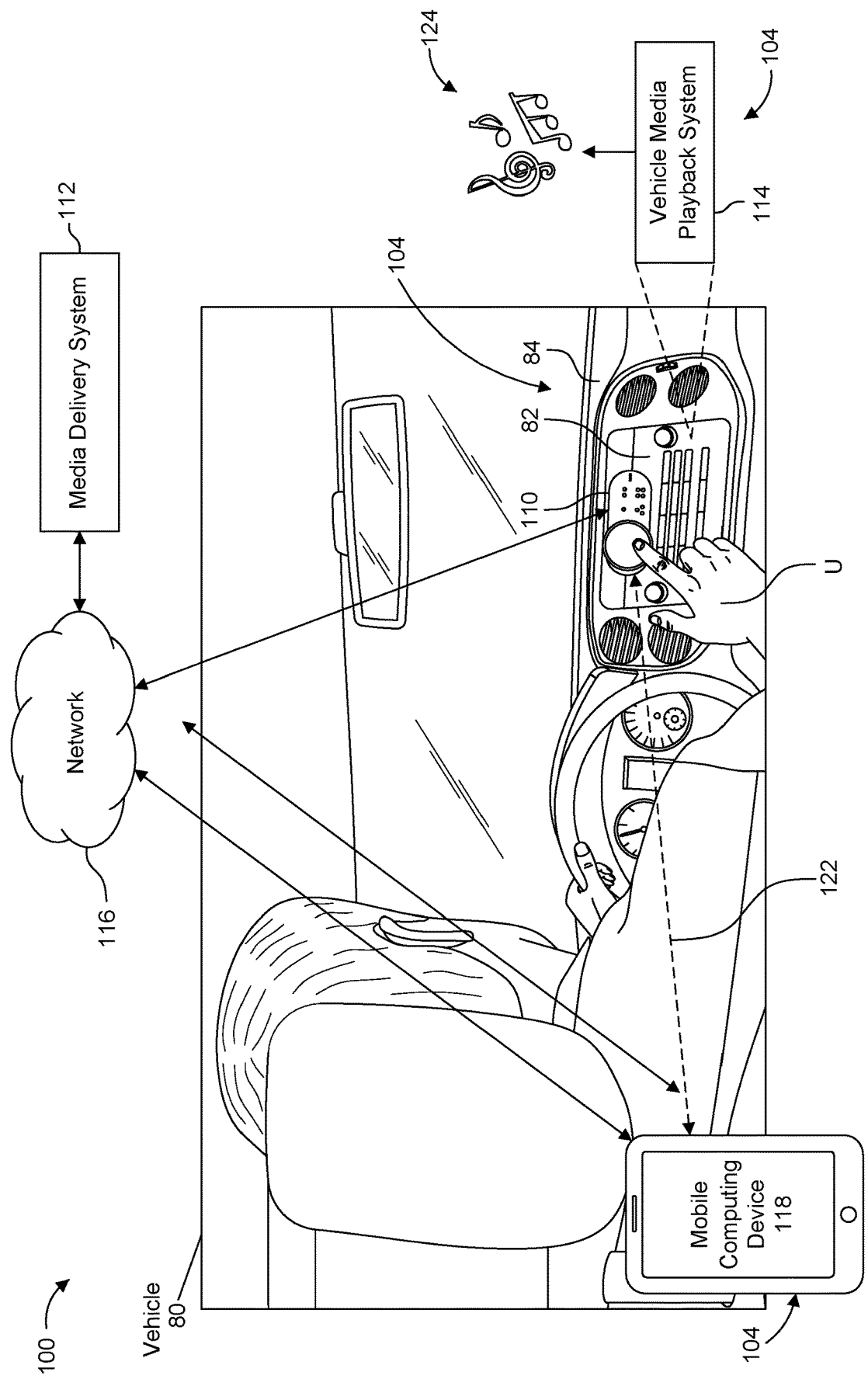
FIG. 1 illustrates an example system for streaming media content for playback.

Various embodiments will be described in detail with reference to the drawings, wherein like reference numerals represent like parts and assemblies throughout the several views.

People spend a significant amount of time travelling in vehicles. Many of them find that time to be more enjoyable when they are listening to music, watching videos, or otherwise consuming media content. Media content includes audio and video content. Examples of audio content include songs, albums, playlists, radio stations, podcasts, audio-books, and other audible media content items. Examples of video content include movies, music videos, television programs, and other visible media content items. In many cases, video content also includes audio content. As used herein, the term "vehicle" can be any machine that is operable to transport people or cargo. Vehicles can be motorized or non-motorized. Vehicles can be for public or private transport. Examples of vehicles include motor vehicles (e.g., cars, trucks, buses, and motorcycles), rail vehicles (e.g., trains, trams), tracked vehicles, watercraft (e.g., ships, boats), aircraft, human-powered vehicles (e.g., bicycles), wagons, and other transportation means. A user can drive a vehicle or ride in as a passenger for travelling. As used herein, the term "travel" and variants thereof refers to any activity in which a user is in transit between two locations.

Consuming media content in a vehicle presents many challenges. In general, a user in a moving vehicle may have limited attention available for interacting with a media playback device due to the need to concentrate on travel related activities, such as driving and navigation. Therefore, while a vehicle is moving, it can be difficult for a user in the vehicle to interact with a media playback device without disrupting the driving or navigation. Further, the user interface of a media playback device can be overly complex, or may require such fine motor skills that it can be difficult to use while travelling in a vehicle. Voice-based user interfaces also encounter significant challenges to use in a vehicle environment. The passenger areas of a vehicle are often noisy due to engine noise, road noise, wind and weather noises, passenger noises, and the sound of any media content that may be playing on a media playback system in the vehicle. This noise hampers the ability of the voice-based user interface to interact with a user. Moreover, accessing media content while travelling may be difficult, expensive, or impossible depending on network availability or capacity along the route of travel. Further, accessing and playing media content can require significant amounts of electric power. Thus, use of a mobile device for media content playback during travel may be undesirable because it will drain the battery. It can also be challenging to connect a media playback device to a vehicle's built-in audio system because of the requirement to connect to auxiliary cables or undergo a complicated wireless pairing process. Embodiments disclosed herein address some or all of these challenges. It should be understood, however, that various aspects described herein are not limited to use of a media playback device during travel.

On the other hand, many users desire a personalized media consuming experience. For example, a user can access almost limitless catalogs of media content through various free or fee-based media delivery services, such as media streaming services. Users can use mobile devices or other media playback devices to access large catalogs of media content. Due to such large collections of media content, it is desired to make it possible to customize a selection of media content to match users' individual tastes and preferences so that users can consume their favorite media content while travelling in a vehicle.

Many vehicles include a built-in media playback device, such as a radio or a fixed media player, such as a player that can play media content from a CD, USB driver, or SD cards. However, the media content that is delivered using these built in vehicle media playback devices is greatly limited and is not flexible or customizable to the user.

Alternatively, a mobile device, such as a smartphone or a tablet, can be used by a user to enjoy personalized and flexible music consuming experience in a vehicle by running music streaming applications thereon. However, mobile devices are not well suited for use in a vehicle environment for various reasons. For example, mobile devices are not readily accessible or controllable while driving or navigating. Further, connection between a mobile device and a vehicle audio system is often inconvenient and unreliable. Moreover, the music streaming application is not automatically ready to run and play media content, and the user needs to pick up the mobile device and open the music streaming application and control a sophisticated user interface to play media content. Additionally, many users have limited mobile data available via their mobile devices and are concerned about data usage while using the music streaming application in the vehicle. Battery drainage and legal restrictions on use while driving are further drawbacks to using mobile devices for playing media content in the vehicle.

To address these challenges, the present disclosure provides a special-purpose personal appliance that can be used for streaming media in a vehicle. In some embodiments, the appliance is specially designed to be dedicated for media streaming purposes in a vehicle, and there is no other general use. Some embodiments of the appliance can operate to communicate directly with a media content server and receive streamed media content from the server via a cellular network. In these embodiments, other computing devices, such as mobile devices, are not involved in this direct communication between the appliance and the media content server. Mobile data cost can be included in the subscription of the media streaming service or a purchase price of the personal appliance. Therefore, the customer's possible concern about mobile data usage can be eliminated. In other embodiments, the appliance can connect to another computing device, such as a mobile device, that provides a mobile hotspot to enable the appliance to communicate with the media content server rather than the appliance communicating with it directly. For example, a mobile device is used to assist in communication between the appliance and the media content server.

Further, the appliance can be associated with a user account of the user for the media streaming service so that the user can enjoy personalized media content.

In some embodiments, the appliance provides a simplified user interface so that a user can easily control playback of media content in a vehicle while maintaining his or her focus on other tasks such as driving or navigating. For example, the appliance has a limited set of physical control elements that are intuitively controllable for playback of media content with little (often only one) input from a user. Examples of such physical control elements include a rotatable knob and one or more physically-depressible buttons.

Further, in some embodiments, the appliance is configured to be easily mounted to an interior structure of a vehicle, such as a dashboard, so that the user can easily reach the appliance.

In some embodiments, the appliance also provides an output interface that can be easily connected to a vehicle audio system, such as via an auxiliary input port, Bluetooth®, or an FM transmitter. Therefore, the media content streamed to the appliance can then be transmitted from the appliance to the vehicle audio system for playback in the vehicle.

In some embodiments, the appliance can include a voice interaction system designed for voice interaction with a user in the noisy environment of a vehicle. In some embodiments, the appliance includes multiple microphones that reduce the effects of ambient noise in the passenger area of the vehicle. In an example, the appliance includes at least three microphones: two directed to the passenger area of the vehicle and another facing away from the passenger area of the vehicle to pick up vibrations and low frequency noise for cancellation. The appliance also applies spectral noise cancellation to reduce non-voice frequencies. In addition, omnidirectional noise cancellation is applied in some embodiments to reduce omni-directional sound (e.g., vehicle noise). Directional noise is detected by determining a difference between audio inputs detected by the two microphones facing the passenger area. The difference is preserved as directional audio input. The appliance further cancels out audio that it is currently playing, allowing the appliance to detect voice commands even over loud music, for instance. In this manner, the appliance is arranged to provide an improved voice-based interface in a vehicle environment.

As described herein, consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, a vehicle is described as an example of an environment in which media content is consumed. Further, travelling (and in particular driving) in a vehicle is described as an example of an activity during which media content is consumed. However, it should be understood that the same concepts are similarly applicable to other forms of media consumption and to other environments or activities, and at least some embodiments include other forms of media consumption and/or are configured for use in other environments or during other activities.

FIG. 1 illustrates an example system 100 for streaming media content for playback. The system 100 can be used in a vehicle 80. The vehicle 80 includes a dashboard 82 or a head unit 84. The system 100 includes one or more media playback devices 104 configured to play media content, such as a personal media streaming appliance (PMSA) system 110, a media delivery system 112, a vehicle media playback system 114, and a mobile computing device 118. The system 100 further includes a data communication network 116 and an in-vehicle wireless data communication network 122.

The PMSA system 110 operates to receive media content that is provided (e.g., streamed, transmitted, etc.) by a system external to the PMSA system 110, such as the media delivery system 112, and transmit the media content to the vehicle media playback system 114 for playback. In some embodiments, the PMSA system 110 is a portable device which can be carried into and used in the vehicle 80. The PMSA system 110 can be mounted to a structure of the vehicle 80, such as the dashboard 82 or the head unit 84. In other embodiments, the PMSA system 110 can be configured to be built in a structure of the vehicle 80. An example of the PMSA system 110 is illustrated and described in more detail with reference to FIGS. 2 and 6.

The media delivery system 112 operates to provide media content to one or more media playback devices 104 via the network 116. In the illustrated example, the media delivery system 112 provides media content to the PMSA system 110 for playback of media content using the vehicle media playback system 114. An example of the media delivery system 112 is illustrated and described in further detail herein, such as with reference to FIG. 3.

The vehicle media playback system 114 operates to receive media content from the PMSA system 110 and generates a media output 124 to play the media content in the vehicle 80. An example of the vehicle media playback system 114 is illustrated and described in further detail herein, such as with reference to FIG. 4.

The network 116 is a data communication network that facilitates data communication between the PMSA system 110 and the media delivery system 112. In some embodiments, the mobile computing device 118 can also communicate with the media delivery system 112 across the network 116. The network 116 typically includes a set of computing devices and communication links between the computing devices. The computing devices in the network 116 use the links to enable communication among the computing devices in the network. The network 116 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 116 includes various types of communication links. For example, the network 116 can include wired and/or wireless links, including cellular, Bluetooth®, ultra-wideband (UWB), 802.11, ZigBee, and other types of wireless links. Furthermore, in various embodiments, the network 116 is implemented at various scales. For example, the network 116 can be implemented as one or more vehicle area networks, local area networks (LANs), metropolitan area networks, subnets, wide area networks (WAN) (such as the Internet), or can be implemented at another scale. Further, in some embodiments, the network 116 includes multiple networks, which may be of the same type or of multiple different types.

In some embodiments, the network 116 can also be used for data communication between other media playback devices 104 (e.g., the mobile computing device 118) and the media delivery system 112. Because the network 116 is configured primarily for data communication between computing devices in the vehicle 80 and computing devices outside the vehicle 80, the network 116 is also referred to herein as an out-of-vehicle network for out-of-vehicle data communication.

Unlike the network 116, the in-vehicle wireless data communication 122 can be used for direct data communication between computing devices (e.g., the media playback devices 104) in the vehicle 80. In some embodiments, the in-vehicle wireless data communication 122 is used for direct communication between the PMSA system 110 and the mobile computing device 118. In other embodiments, the mobile computing device 118 can communicate with the PMSA system 110 in the data communication network 116. In some embodiments, the in-vehicle wireless data communication 122 can also be used for data communication between the PMSA system 110 and the vehicle media playback system 114.

Various types of wireless communication interfaces can be used for the in-vehicle wireless data communication 122. In some embodiments, the in-vehicle wireless data communication 122 includes Bluetooth® technology. In other embodiments, the in-vehicle wireless data communication 122 includes WiFi® technology. In yet other embodiments, other suitable wireless communication interfaces can be used for the in-vehicle wireless data communication 122, such as near field communication (NFC) and an ultrasonic data transmission.

In some embodiments, the mobile computing device 118 is configured to play media content independently from the PMSA system 110. In some embodiments, the mobile computing device 118 is a standalone computing device that, without the PMSA system 110 involved, can communicate with the media delivery system 112 and receive media content from the media delivery system 112 for playback in the vehicle 80. An example of the mobile computing device 118 is illustrated and described in further detail herein, such as with reference to FIG. 5.

Figure 2:
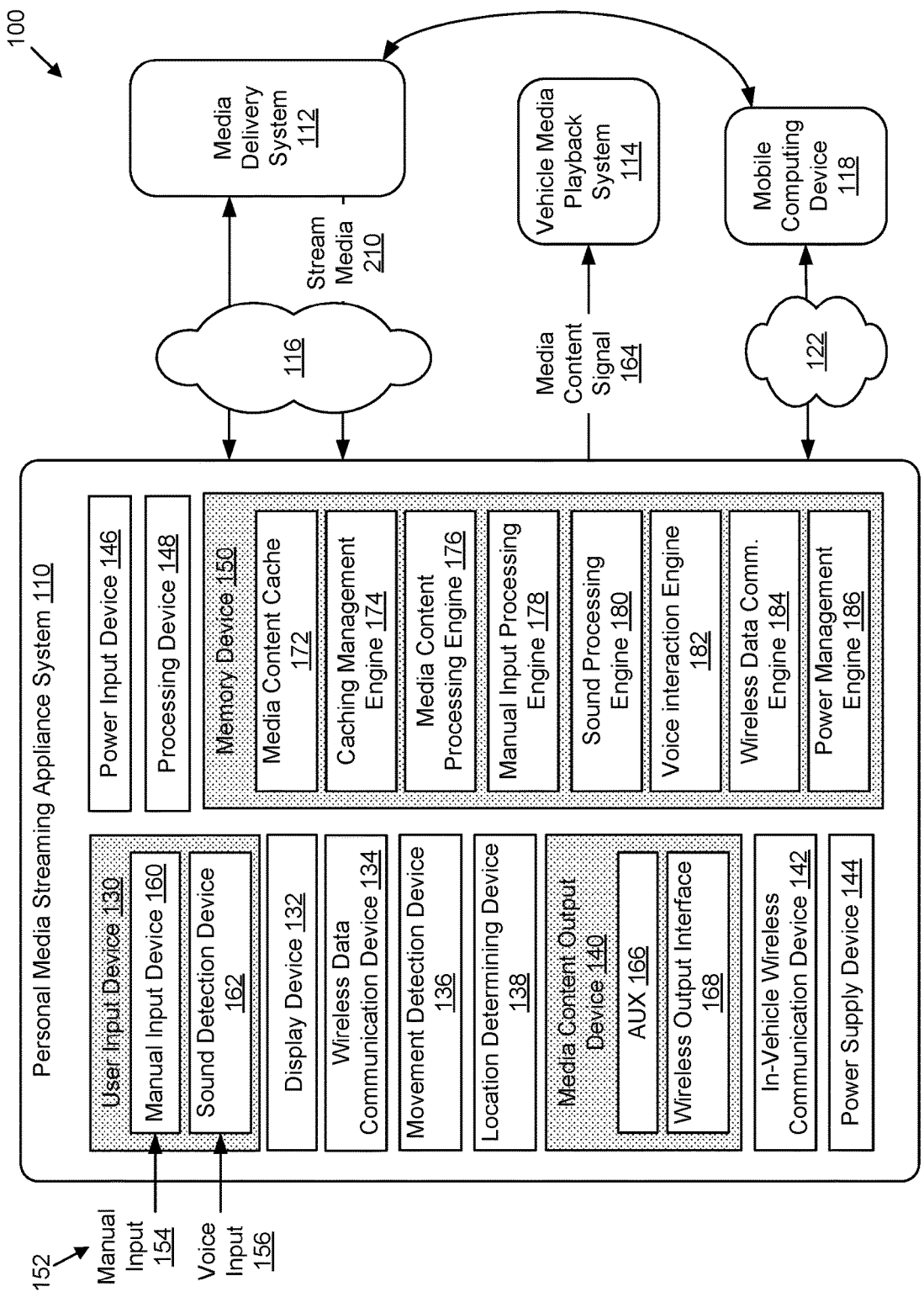
FIG. 2 is a block diagram of an example embodiment of a personal media streaming appliance (PMSA) system.

FIG. 2 is a block diagram of an example embodiment of the PMSA system 110 of the media streaming system 100 shown in FIG. 1. In this example, the PMSA system 110 includes a user input device 130, a display device 132, a wireless data communication device 134, a movement detection device 136, a location determining device 138, a media content output device 140, an in-vehicle wireless communication device 142, a power supply device 144, a power input device 146, a processing device 148, and a memory device 150.

In some embodiments, the PMSA system 110 is a system dedicated for streaming personalized media content in a vehicle environment. At least some embodiments of the PMSA system 110 have limited functionalities specifically selected for streaming media content from the media delivery system 112 at least via the network 116 and/or for providing other services associated with the media content streaming service. The PMSA system 110 may have no other general use such as found in other computing devices, such as smartphones, tablets, and other smart devices. For example, in some embodiments, when the PMSA system 110 is powered up, the PMSA system 110 is configured to automatically activate a software application that is configured to perform the media content streaming and media playback operations of the PMSA system 110 using at least one of the components, devices, and elements of the PMSA system 110. In some embodiments, the software application of the PMSA system 110 is configured to continue running until the PMSA system 110 is powered off or powered down to a predetermined level. In some embodiments, the PMSA system 110 is configured to be free of any user interface control that would allow a user to disable the automatic activation of the software application on the PMSA system 110.

As described herein, the PMSA system 110 provides various structures, features, and functions that improve the user experience of consuming media content in a vehicle.

As illustrated, the PMSA system 110 can communicate with the media delivery system 112 to receive media content via the network 116 and enable the vehicle media playback system 114 to play the media content in the vehicle. In some embodiments, the PMSA system 110 can communicate with the mobile computing device 118 that is in data communication with the media delivery system 112. As described herein, the mobile computing device 118 can communicate with the media delivery system 112 via the network 116.

The user input device 130 operates to receive a user input 152 from a user U for controlling the PMSA system 110. As illustrated, the user input 152 can include a manual input 154 and a voice input 156. In some embodiments, the user input device 130 includes a manual input device 160 and a sound detection device 162.

The manual input device 160 operates to receive the manual input 154 for controlling playback of media content via the PMSA system 110. In addition, in some embodiments, the manual input 154 is received for managing various pieces of information transmitted via the PMSA system 110 and/or controlling other functions or aspects associated with the PMSA system 110.

In some embodiments, the manual input device 160 includes one or more manual control elements configured to receive various manual control actions, such as pressing actions and rotational actions. As described herein, the manual input device 160 includes a manual control knob assembly 510 and one or more physical button assemblies 512, which is further illustrated and described with reference to FIG. 6.

The sound detection device 162 operates to detect and record sounds from proximate the PMSA system 110. For example, the sound detection device 162 can detect sounds including the voice input 156. In some embodiments, the sound detection device 162 includes one or more acoustic sensors configured to detect sounds proximate the PMSA system 110. For example, acoustic sensors of the sound detection device 162 includes one or more microphones. Various types of microphones can be used for the sound detection device 162 of the PMSA system 110.

In some embodiments, the voice input 156 is a user's voice (also referred to herein as an utterance) for controlling playback of media content via the PMSA system 110. In addition, the voice input 156 is a user's voice for managing various data transmitted via the PMSA system 110 and/or controlling other functions or aspects associated with the PMSA system 110.

In some embodiments, the sound detection device 162 is configured to cancel noises from the received sounds so that a desired sound (e.g., the voice input 156) is clearly identified. For example, the sound detection device 162 can include one or more noise-cancelling microphones which are configured to filter ambient noise from the voice input 156. In addition or alternatively, a plurality of microphones of the sound detection device 162 are arranged at different locations in a body of the PMSA system 110 and/or oriented in different directions with respect to the body of the PMSA system 110, so that ambient noise is effectively canceled from the voice input 156 or other desired sounds being identified.

In some embodiments, the sounds detected by the sound detection device 162 can be processed by the sound processing engine 180 of the PMSA system 110 as described below.

Referring still to FIG. 2, the display device 132 operates to display information to the user U. Examples of such information include media content playback information, notifications, and other information.

In some embodiments, the display device 132 operates as a display screen only and is not capable of receiving a user input. By receiving the manual input 154 only via the manual input device 160 and disabling receipt of manual input via the display device 132, the user interface of the PMSA system 110 is simplified so that the user U can control the PMSA system 110 while maintaining focus on other activities in the vehicle 80. It is understood however that, in other embodiments, the display device 132 is configured as a touch-sensitive display screen that operates as both a display screen and a user input device. In yet other embodiments, the PMSA system 110 does not include a display device.

As described herein, in some embodiments, the display device 132 is arranged at the manual input device 160. In other embodiments, the display device 132 is arranged separate from the manual input device 160.

The wireless data communication device 134 operates to enable the PMSA system 110 to communicate with one or more computing devices at a remote location that is outside the vehicle 80. In the illustrated example, the wireless data communication device 134 operates to connect the PMSA system 110 to one or more networks outside the vehicle 80, such as the network 116. For example, the wireless data communication device 134 is configured to communicate with the media delivery system 112 and receive media content from the media delivery system 112 at least partially via the network 116. The wireless data communication device 134 can be a wireless network interface of various types which connects the PMSA system 110 to the network 116. Examples of the wireless data communication device 134 include wireless wide area network (WWAN) interfaces, which use mobile telecommunication cellular network technologies. Examples of cellular network technologies include LTE, WiMAX, UMTS, CDMA2000, GSM, cellular digital packet data (CDPD), and Mobitex. In some embodiments, the wireless data communication device 134 is configured as a cellular network interface to facilitate data communication between the PMSA system 110 and the media delivery system 112 over cellular network.

The movement detection device 136 can be used to detect movement of the PMSA system 110 and the vehicle 80. In some embodiments, the movement detection device 136 is configured to monitor one or more factors that are used to determine movement of the vehicle 80. The movement detection device 136 can include one or more sensors that are configured to detect movement, position, and/or orientation of the PMSA system 110. As an example, the movement detection device 136 is operable to determine an orientation of the PMSA system 110. The movement detection device 136 can detect changes in the determined orientation and interpret those changes as indicating movement of the PMSA system 110. In some embodiments, the movement detection device 136 includes an accelerometer. In other embodiments, the movement detection device 136 includes a gyroscope. Other sensors can also be used for the movement detection device 136, such as a magnetometer, a GPS receiver, an altimeter, an odometer, a speedometer, a shock detector, a vibration sensor, a proximity sensor, and an optical sensor (e.g., a light sensor, a camera, and an infrared sensor).

The location determining device 138 is a device that determines the location of the PMSA system 110. In some embodiments, the location determining device 138 uses one or more of Global Positioning System (GPS) technology (which may receive GPS signals), Global Navigation Satellite System (GLONASS), cellular triangulation technology, network-based location identification technology, Wi-Fi® positioning systems technology, and combinations thereof.

The media content output device 140 is an interface that enables the PMSA system 110 to transmit media content to the vehicle media playback system 114. Some embodiments of the PMSA system 110 do not have a speaker and thus cannot play media content independently. In these embodiments, the PMSA system 110 is not regarded as a standalone device for playing media content. Instead, the PMSA system 110 transmits media content to another media playback device, such as the vehicle media playback device 114 to enable the other media playback device to play the media content, such as through the vehicle stereo system.

As illustrated, the PMSA system 110 (e.g., a media content processing engine 176 thereof in FIG. 2) can convert media content to a media content signal 164, the media content output device 140 transmits the media content signal 164 to the vehicle media playback system 114. The vehicle media playback system 114 can play the media content based on the media content signal 164. For example, the vehicle media playback system 114 operates to convert the media content signal 164 into a format that is readable by the vehicle media playback system 114 for playback.

In some embodiments, the media content output device 140 includes an auxiliary (AUX) output interface 166 and a wireless output interface 168.

Figure 6:
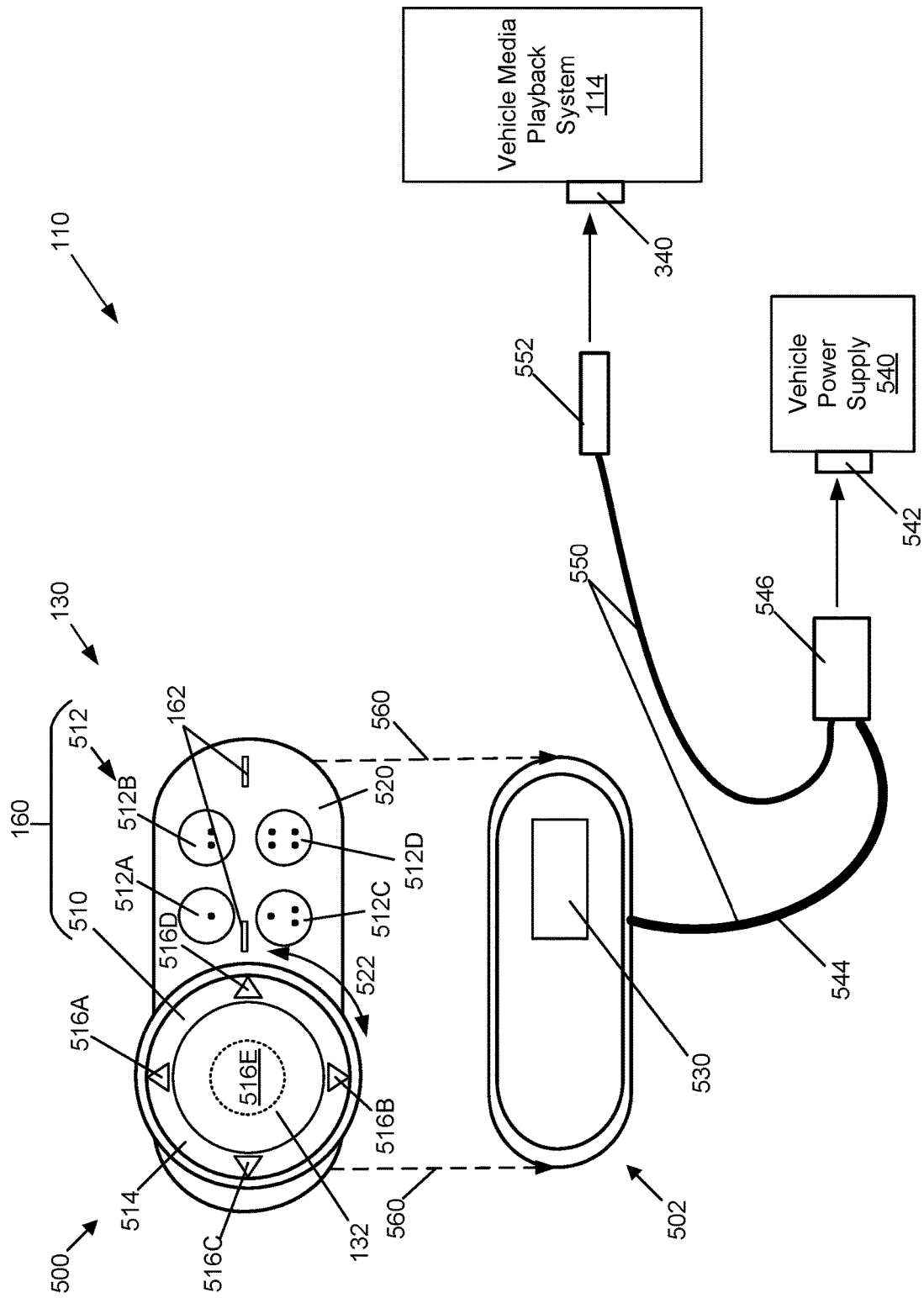
FIG. 6 schematically illustrates an example embodiment of the PMSA system.

The AUX output interface 166 is configured to connect the PMSA system 110 to the vehicle media playback system 114 via a cable (e.g., a media content output line 550 in FIG. 6) of the PMSA system 110. In some embodiments, as illustrated in FIG. 6, the media content output line 550 extending from the PMSA system 110 is connected to an input connector 340 (e.g., an auxiliary input jack or port) of the vehicle media playback system 114. As illustrated herein, the media content output line 550 can be of various types, such as an analog audio cable or a USB cable.

The wireless output interface 168 is configured to connect the PMSA system 110 to the vehicle media playback system 114 via a wireless communication protocol. In some embodiments, the wireless output interface 168 is configured for Bluetooth® connection. In other embodiments, the wireless output interface 168 is configured for other types of wireless connection. In some embodiments, the wireless output interface 168 is incorporated into, or implemented with, the in-vehicle wireless communication device 142. For example, when the media content output device 140 wirelessly transmits media content to the vehicle media playback system 114, the in-vehicle wireless communication device 142 can be used to implement the wireless output interface 168 of the media content output device 140.

Referring still to FIG. 2, the in-vehicle wireless communication device 142 operates to establish a wireless data communication, such as the in-vehicle wireless data communication 122, between computing devices in a vehicle 80. In the illustrated example, the in-vehicle wireless communication device 142 is used to enable the PMSA system 110 to communicate with other computing devices, such as the mobile computing device 118, in the vehicle 80. Various types of wireless communication interfaces can be used for the in-vehicle wireless communication device 142, such as Bluetooth® technology, WiFi® technology, a near field communication (NFC), and an ultrasound data transmission. The in-vehicle wireless communication is also referred to herein as a short-range wireless communication.

The power supply device 144 is included in the example PMSA system 110 and is configured to supply electric power to the PMSA system 110. In some embodiments, the power supply device 144 includes at least one battery. The power supply device 144 can be rechargeable. For example, the power supply device 144 can be recharged using the power input device 146 that is connected to an external power supply. In some embodiments, the power supply device 144 is included inside the PMSA system 110 and is not removable from the PMSA system 110. In other embodiments, the power supply device 144 is removable by the user from the PMSA system 110.

The power input device 146 is configured to receive electric power to maintain activation of components of the PMSA system 110. As described herein, the power input device 146 is connected to a power source of the vehicle 80 (e.g., a vehicle power supply 540 in FIG. 6) and uses the electric power from the vehicle 80 as a primary power source to maintain activation of the PMSA system 110 over an extended period of time, such as longer than several minutes.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer readable media includes any available media that can be accessed by the PMSA system 110. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the PMSA system 110. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media content processing engine 176, a manual input processing engine 178, a sound processing engine 180, a voice interaction engine 182, a wireless data communication engine 184, and a power management engine 186.

Some embodiments of the memory device 150 include the media content cache 172. The media content cache 172 stores media content items, such as media content items that have been received from the media delivery system 112. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 112, the caching management engine 174 operates to cache at least a portion of the media content into the media content cache 172 so that at least a portion of the cached media content can be transmitted to the vehicle media playback system 114 for playback. In other embodiments, the caching management engine 174 operates to cache at least a portion of media content into the media content cache 172 while online so that the cached media content is retrieved for playback while the PMSA system 110 is offline.

The media content processing engine 176 is configured to process the media content that is received from the media delivery system 112, and generate the media content signal 164 usable for the vehicle media playback system 114 to play the media content. The media content signal 164 is transmitted to the vehicle media playback system 114 using the media content output device 140, and then decoded so that the vehicle media playback system 114 plays the media content in the vehicle 80.

The manual input processing engine 178 operates to receive the manual input 154 via the manual input device 160. In some embodiments, when the manual input device 160 is actuated (e.g., pressed or rotated) upon receiving the manual input 154, the manual input device 160 generates an electric signal representative of the manual input 154. The manual input processing engine 178 can process the electric signal and determine the user input (e.g., command or instruction) corresponding to the manual input 154 to the PMSA system 110. In some embodiments, the manual input processing engine 178 can perform a function requested by the manual input 154, such as controlling playback of media content. The manual input processing engine 178 can cause one or more other engines to perform the function associated with the manual input 154.

The sound processing engine 180 is configured to receive sound signals obtained from the sound detection device 162 and process the sound signals to identify different sources of the sounds received via the sound detection device 162. In some embodiments, the sound processing engine 180 operates to filter the user's voice input 156 from noises included in the detected sounds. Various noise cancellation technologies, such as active noise control or cancelling technologies or passive noise control or cancelling technologies, can be used to filter the voice input from ambient noise. In examples, the sound processing engine 180 filters out omnidirectional noise and preserves directional noise (e.g., an audio input difference between two microphones) in audio input. In examples, the sound processing engine 180 removes frequencies above or below human speaking voice frequencies. In examples, the sound processing engine 180 subtracts audio output of the device from the audio input to filter out the audio content being provided by the device. (e.g., to reduce the need of the user to shout over playing music). In examples, the sound processing engine 180 performs echo cancellation. By using one or more of these techniques, the sound processing engine 180 provides sound processing customized for use in a vehicle environment.

In other embodiments, the sound processing engine 180 operates to process the received sound signals to identify the sources of particular sounds of the sound signals, such as people's conversation in the vehicle, the vehicle engine sound, or other ambient sounds associated with the vehicle.

In some embodiments, a recording of sounds captured using the sound detection device 162 can be analyzed using speech recognition technology to identify words spoken by the user. The words may be recognized as commands from the user that alter the playback of media content and/or other functions or aspect of the PMSA system 110. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate the PMSA system 110 such as volume, dominant frequency or frequencies, etc. These sound properties may be used to make inferences about the environment proximate to the PMSA system 110.

Figure 3:
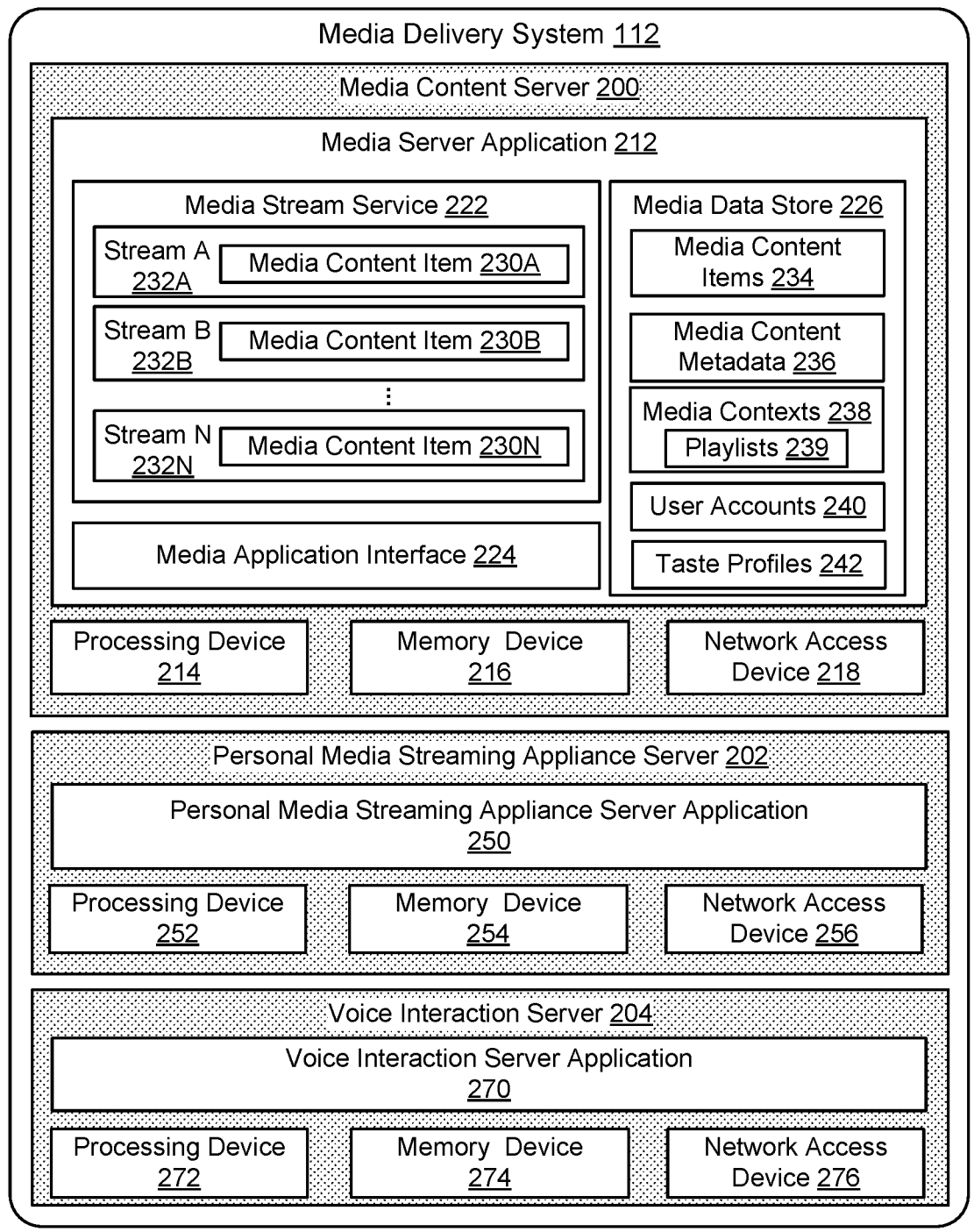
FIG. 3 is a block diagram of an example embodiment of a media delivery system.

The voice interaction engine 182 operates to cooperate with the media delivery system 112 (e.g., a voice interaction server 204 thereof as illustrated in FIG. 3) to identify a command (e.g., a user intent) that is conveyed by the voice input 156. In some embodiments, the voice interaction engine 182 transmits the user's voice input 156 that is detected by the sound processing engine 180 to the media delivery system 112 so that the media delivery system 112 operates to determine a command intended by the voice input 156. In other embodiments, at least some of the determination process of the command can be performed locally by the voice interaction engine 182.

In addition, some embodiments of the voice interaction engine 182 can operate to cooperate with the media delivery system 112 (e.g., the voice interaction server 204 thereof) to provide a voice assistant that performs various voice-based interactions with the user, such as voice feedbacks, voice notifications, voice recommendations, and other voice-related interactions and services.

The wireless data communication engine 184 can interact with the wireless data communication device 134 and operate to transmit data to other computing devices, such as the media delivery system 112, and receive data from such other computing devices, such as the media delivery system 112, via the network 116. In some embodiments, the wireless data communication engine 184 operates to transmit a device identifier of the PMSA system 110 and/or an user account identifier associated with the PMSA system 110 to the computing device (e.g., the media delivery system 112) with which the PMSA system 110 is communicating via the network 116. The media delivery system 112 can use the device identifier and/or the user account identifier to perform a function requested by the PMSA system 110, such as streaming media content requested by the PMSA system 110.

The power management engine 186 can operate to receive electric power through the power input device 146. The power management engine 186 can further operate to charge or recharge the power supply device 144 with the electric power received through the power input device 146.

In some embodiments, the power management engine 186 operates to manage electric power consumption of the PMSA system 110, and switch the PMSA system 110 into one of a plurality of power consumption modes (e.g., a full power mode or a low power mode (such as a sleep mode)) depending on the operation condition of the PMSA system 110.

FIG. 3 is a block diagram of an example embodiment of the media delivery system 112 of FIG. 1. The media delivery system 112 includes a media content server 200, a personal media streaming appliance (PMSA) server 202, and a voice interaction server 204.

The media delivery system 112 comprises one or more computing devices and provides media content to the PMSA system 110 and, in some embodiments, other media playback devices, such as the mobile computing device 118, as well. In addition, the media delivery system 112 interacts with the PMSA system 110 to provide the PMSA system 110 with various functionalities.

In at least some embodiments, the media content server 200, the PMSA server 202, and the voice interaction server 204 are provided by separate computing devices. In other embodiments, the media content server 200, the PMSA server 202, and the voice interaction server 204 are provided by the same computing device(s). Further, in some embodiments, at least one of the media content server 200, the PMSA server 202, and the voice interaction server 204 is provided by multiple computing devices. For example, the media content server 200, the PMSA server 202, and the voice interaction server 204 may be provided by multiple redundant servers located in multiple geographic locations.

Although FIG. 3 shows a single media content server 200, a single PMSA server 202, and a single voice interaction server 204, some embodiments include multiple media servers, multiple PMSA servers, and/or multiple voice interaction servers. In these embodiments, each of the multiple media servers, multiple PMSA servers, and multiple voice interaction servers may be identical or similar to the media content server 200, the PMSA server 202, and the voice interaction server 204, respectively, as described herein, and may provide similar functionality with, for example, greater capacity and redundancy and/or services from multiple geographic locations. Alternatively, in these embodiments, some of the multiple media servers, the multiple PMSA servers, and/or the multiple voice interaction servers may perform specialized functions to provide specialized services. Various combinations thereof are possible as well.

The media content server 200 transmits stream media 210 (FIG. 2) to media playback devices such as the PMSA system 110. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 116. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more streams 232A, 232B, and 232N (collectively 232).

The media application interface 224 can receive requests or other communication from media playback devices or other systems, such as the PMSA system 110, to retrieve media content items from the media content server 200. For example, in FIG. 3, the media application interface 224 receives communication from the PMSA system 110, such as the caching management engine 174 thereof, to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 3, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device 104, such as the PMSA system 110. The media playback device 104 then operates to communicate with the media delivery system 112 so that the media delivery system 112 retrieves the media content items identified by the playlist 239 and transmits data for the media content items to the media playback device 104 for playback.

In some embodiments, the playlist 239 includes a playlist title and a list of content media item identifications. The playlist title is a title of the playlist, which can be provided by a user using the media playback device 104. The list of content media item identifications includes one or more media content item identifications (IDs) that refer to respective media content items 234.

Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 239 may include user-created playlists. For example, a user of a media streaming service provided using the media delivery system 112 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 112 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

In addition or alternatively, at least some of the playlists 239 are created by a media streaming service provider. For example, such provider-created playlists can be automatically created by the media delivery system 112. In some embodiments, a provider-created playlist can be customized to a particular user or a particular group of users. By way of example, a playlist for a particular user can be automatically created by the media delivery system 112 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 240 are used to identify users of a media streaming service provided by the media delivery system 112. In some embodiments, a user account 240 allows a user to authenticate to the media delivery system 112 and enable the user to access resources (e.g., media content items, playlists, etc.) provided by the media delivery system 112. In some embodiments, the user can use different devices (e.g., the PMSA system 110 and the mobile computing device 118) to log into the user account and access data associated with the user account in the media delivery system 112. User authentication information, such as a username, an email account information, a password, and other credentials, can be used for the user to log into his or her user account. Where user data is used, it can be handled according to a defined user privacy policy and can be used to the extent allowed by the user. Where the data of other users is used, it can be handled in an anonymized matter so the user does not learn of the details of other users generally or specifically.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", "sexy", etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 112 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Referring still to FIG. 3, the PMSA server 202 operates to provide various functionalities to the PMSA system 110. In some embodiments, the PMSA server 202 includes a personal media streaming appliance (PMSA) server application 250, a processing device 252, a memory device 254, and a network access device 256. The processing device 252, the memory device 254, and the network access device 256 may be similar to the processing device 214, the memory device 216, and the network access device 218, respectively, which have each been previously described.

In some embodiments, the PMSA server application 250 operates to interact with the PMSA system 110 and enable the PMSA system 110 to perform various functions, such as receiving a user manual input, displaying information, providing notifications, performing power management, providing location-based services, and authenticating one or more users for the PMSA system 110. The PMSA server application 250 can interact with other servers, such as the media content server 200 and the voice interaction server 204, to execute such functions.

Referring still to FIG. 3, the voice interaction server 204 operates to provide various voice-related functionalities to the PMSA system 110. In some embodiments, the voice interaction server 204 includes a voice interaction server application 270, a processing device 272, a memory device 274, and a network access device 276. The processing device 272, the memory device 274, and the network access device 276 may be similar to the processing device 214, the memory device 216, and the network access device 218, respectively, which have each been previously described.

In some embodiments, the voice interaction server application 270 operates to interact with the PMSA system 110 and enable the PMSA system 110 to perform various voice-related functions, such as voice feedback and voice notifications. In some embodiments, the voice interaction server application 270 is configured to receive data (e.g., speech-to-text (STT) data) representative of a voice input received via the PMSA system 110 and process the data to determine a user command (e.g., a user request or instruction). In some embodiments, at least one of the media content server 200, the PMSA server 202, and the voice interaction server 204 may be used to perform one or more functions corresponding to the determined user command.

Figure 4:
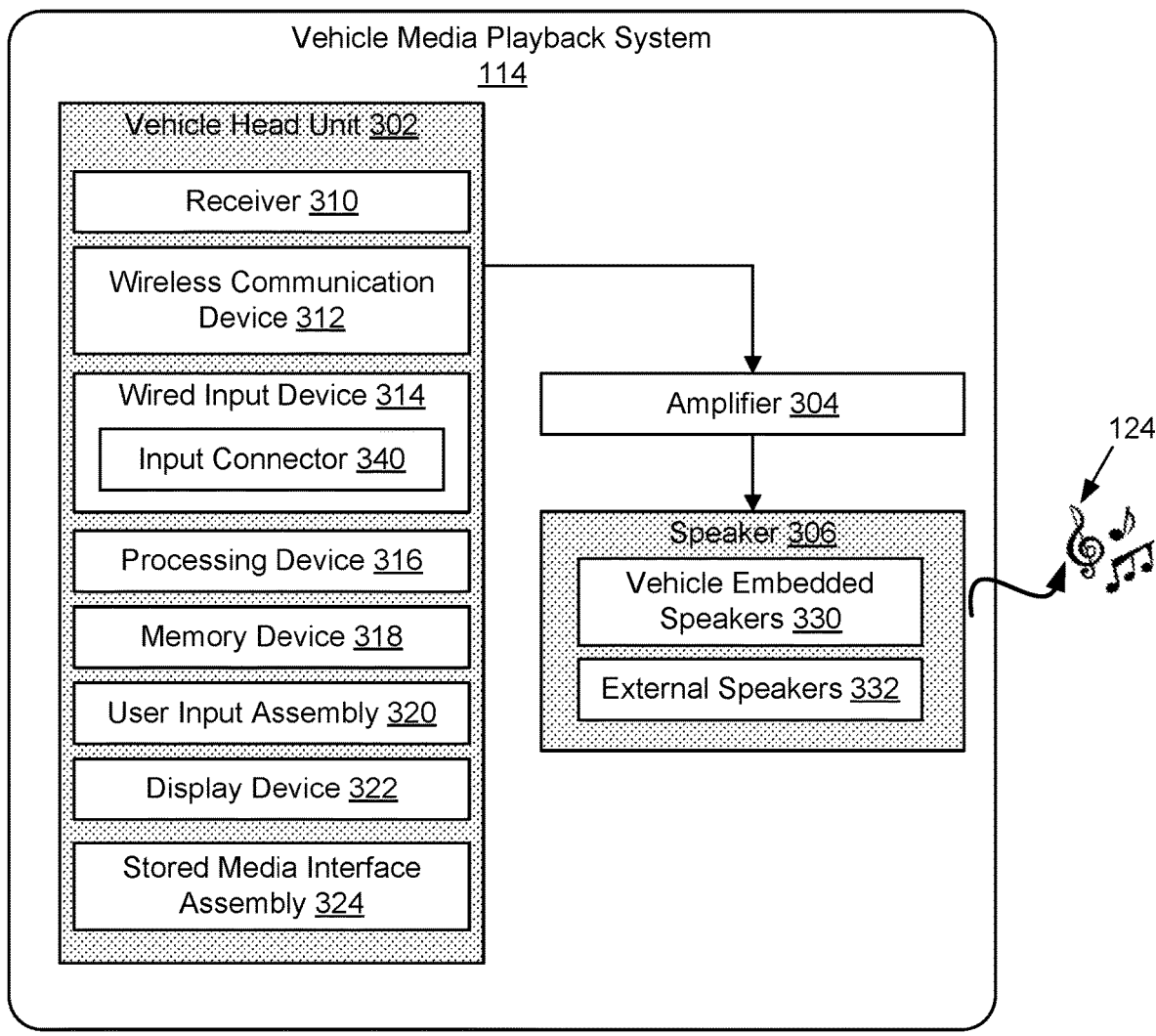
FIG. 4 is a block diagram of an example embodiment of a vehicle media playback system.

FIG. 4 is a block diagram of an example embodiment of the vehicle media playback system 114. In this example, the vehicle media playback system 114 includes a vehicle head unit 302, an amplifier 304, and a speaker 306.

The vehicle head unit 302 is configured to receive a user input and generate media content from various sources. In this example, the vehicle head unit 302 includes a receiver 310, a wireless communication device 312, a wired input device 314, a processing device 316, a memory device 318, a user input assembly 320, a display device 322, and a stored media interface assembly 324.

The receiver 310 operates to receive media content signals from various external sources. The received signals can then be used to generate media output by the vehicle media playback system 114. Some embodiments of the receiver 310 include one or more tuners for receiving radio signals such as FM or AM radio signals. Other embodiments of the receiver 310 include a receiver for receiving satellite radio signals and/or a receiver for receiving internet radio signals.

The wireless communication device 312 operates to communicate with other devices using wireless data signals. The wireless communication device 312 can include one or more of a Bluetooth® transceiver and a WiFi® transceiver. The wireless data signal may comprise a media content signal such as an audio or video signal. In some embodiments, the wireless communication device 312 is used to enable the vehicle media playback system 114 to wirelessly communicate with the PMSA system 110 and receive the media content signal 164 (FIG. 2) from the PMSA system 110 via an in-vehicle wireless network. The in-vehicle wireless network between the PMSA system 110 and the vehicle media playback system 114 can be configured similarly to the in-vehicle wireless data communication 122 (FIG. 2).

The wired input device 314 provides an interface configured to receive a cable for providing media content and/or commands. The wired input device 314 includes an input connector 340 configured to receive a plug extending from a media playback device for transmitting a signal for media content. In some embodiments, the wired input device 314 can include an auxiliary input jack (AUX) for receiving a plug from a media playback device that transmits analog audio signals. The wired input device 314 can also include different or multiple input jacks for receiving plugs from media playback devices that transmit other types of analog or digital signals (e.g., USB, HDMI, Composite Video, YPbPr, and DVI). In some embodiments, the wired input device 314 is also used to receive instructions from other devices.

In some embodiments, the wired input device 314 provides the input connector 340 (e.g., an AUX port) for receiving a connector 552 extending from the PMSA system 110, as illustrated in FIG. 6. The media content signal 164 is then transmitted from the PMSA system 110 to the vehicle media playback system 114 via the cable 550, the connector 552, and the input connector 340.

The processing device 316 operates to control various devices, components, and elements of the vehicle media playback system 114. The processing device 316 can be configured similar to the processing device 148 (FIG. 2) and, therefore, the description of the processing device 316 is omitted for brevity purposes.

In some embodiments, the processing device 316 operates to process the media content signal 164 received from the PMSA system 110 and convert the signal 164 to a format readable by the vehicle media playback system 114 for playback.

The memory device 318 is configured to store data and instructions that are usable to control various devices, components, and elements of the vehicle media playback system 114. The memory device 318 can be configured similar to the memory device 150 (FIG. 2) and, therefore, the description of the memory device 318 is omitted for brevity purposes.

The user input assembly 320 includes one or more input devices for receiving user input from users for controlling the vehicle media playback system 114. In some embodiments, the user input assembly 320 includes multiple knobs, buttons, and other types of input controls for adjusting volume, selecting sources and content, and adjusting various output parameters. In some embodiments, the various input devices are disposed on or near a front surface of the vehicle head unit 302. The various input devices can also be disposed on the steering wheel of the vehicle or elsewhere. Additionally or alternatively, the user input assembly 320 can include one or more touch sensitive surfaces, which can be incorporated in the display device 322.

The display device 322 displays information. In some embodiments, the display device 322 includes a liquid crystal display (LCD) panel for displaying textual information about content and/or settings of the vehicle media playback system 114. The display device 322 can also include other types of display panels such as a light emitting diode (LED) panel. In some embodiments, the display device 322 can also display image or video content.

The stored media interface assembly 324 reads media content stored on a physical medium. In some embodiments, the stored media interface assembly 324 comprises one or more devices for reading media content from a physical medium such as a compact disc or cassette tape.

The amplifier 304 operates to amplify a signal received from the vehicle head unit 302 and transmits the amplified signal to the speaker 306. In this manner, the media output 124 can be played back at a greater volume. The amplifier 304 may include a power source to power the amplification.

The speaker 306 operates to produce an audio output (e.g., the media output 124) based on an electronic signal. The speaker 306 can include one or more vehicle embedded speakers 330 disposed at various locations within the vehicle 80. In some embodiments, separate signals are received for at least some of the speakers (e.g., to provide stereo or surround sound).

In other embodiments, the speaker 306 can include one or more external speakers 332 which are arranged within the vehicle 80. Users may bring one or more external speakers 332 into the vehicle 80 and connect the external speakers 332 to the vehicle head unit 302 using a wired interface or a wireless interface. In some embodiments, the external speakers 332 can be connected to the vehicle head unit 302 using Bluetooth®. Other wireless protocols can be used to connect the external speakers 332 to the vehicle head unit 302. In other embodiments, a wired connection (e.g., a cable) can be used to connect the external speakers 332 to the vehicle head unit 302. Examples of the wired connection include an analog or digital audio cable connection and a universal serial bus (USB) cable connection. The external speaker 332 can also include a mechanical apparatus for attachment to a structure of the vehicle.

Figure 5:
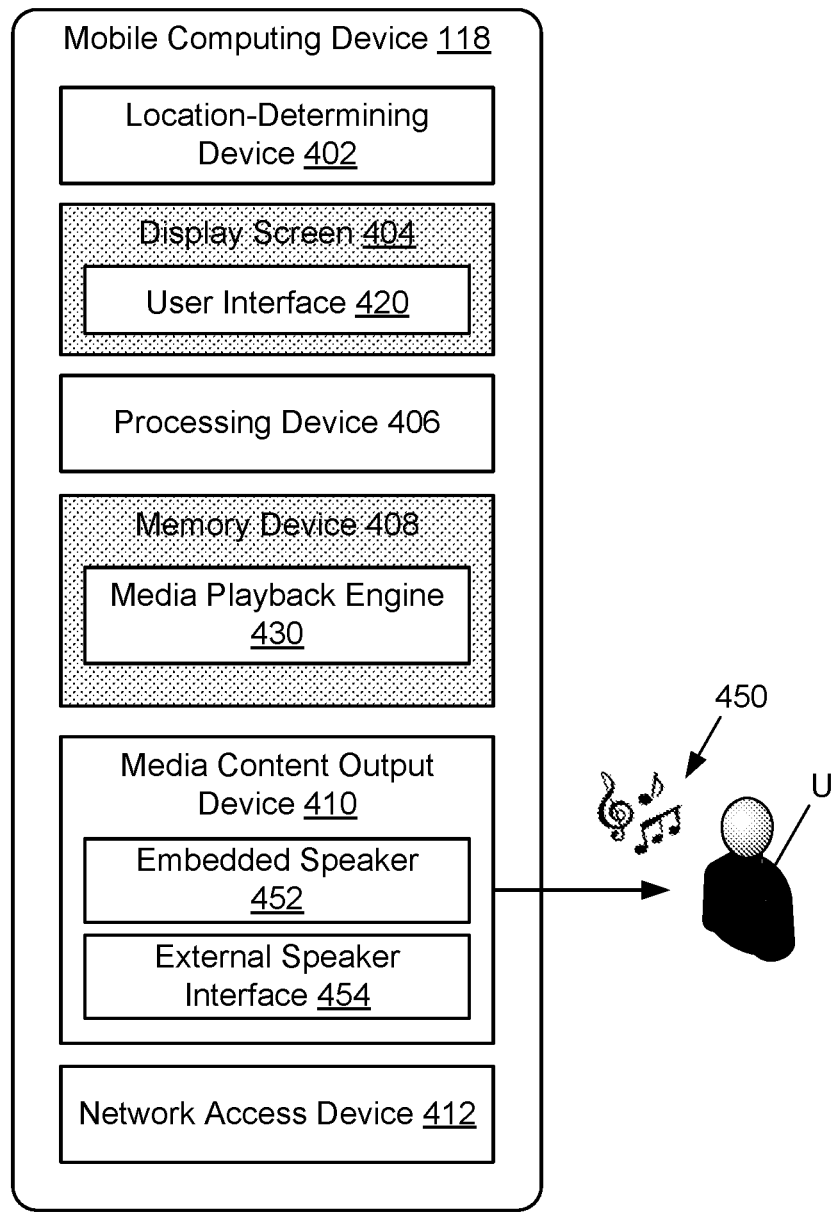
FIG. 5 is a block diagram of an example embodiment of a mobile computing device.

FIG. 5 is a block diagram of an example embodiment of the mobile computing device 118 of FIG. 1.

Similar to the PMSA system 110, the mobile computing device 118 can also be used to play media content. For example, the mobile computing device 118 is configured to play media content that is provided (e.g., streamed or transmitted) by a system external to the mobile computing device 118, such as the media delivery system 112, another system, or a peer device. In other examples, the mobile computing device 118 operates to play media content stored locally on the mobile computing device 118. In yet other examples, the mobile computing device 118 operates to play media content that is stored locally as well as media content provided by other systems.

In some embodiments, the mobile computing device 118 is a handheld or portable entertainment device, smartphone, tablet, watch, wearable device, or any other type of computing device capable of playing media content. In other embodiments, the mobile computing device 118 is a laptop computer, desktop computer, television, gaming console, set-top box, network appliance, blue-ray or DVD player, media player, stereo, or radio.

As described herein, the mobile computing device 118 is distinguished from the PMSA system 110 in various aspects. For example, unlike the PMSA system 110, the mobile computing device 118 is not limited to playing media content, but configured for a wide range of functionalities in various situations and places. The mobile computing device 118 is capable of running a plurality of different software applications for different purposes. The mobile computing device 118 enables the user to freely start or stop activation of such individual software applications.

In at least some embodiments, the mobile computing device 118 includes a location-determining device 402, a display screen 404, a processing device 406, a memory device 408, a media content output device 410, and a network access device 412. Other embodiments may include additional, different, or fewer components. For example, some embodiments may include a recording device such as a microphone or camera that operates to record audio or video content.

The location-determining device 402 is a device that determines the location of the mobile computing device 118. In some embodiments, the location-determining device 402 uses one or more of Global Positioning System (GPS) technology (which may receive GPS signals), Global Navigation Satellite System (GLONASS), cellular triangulation technology, network-based location identification technology, Wi-Fi® positioning systems technology, and combinations thereof.

The display screen 404 is configured to display information. In addition, the display screen 404 is configured as a touch sensitive display and includes a user interface 420 for receiving a user input from a selector (e.g., a finger, stylus etc.) controlled by the user U. In some embodiments, therefore, the display screen 404 operates as both a display device and a user input device. The touch sensitive display screen 404 operates to detect inputs based on one or both of touches and near-touches. In some embodiments, the display screen 404 displays a graphical user interface for interacting with the mobile computing device 118. Other embodiments of the display screen 404 do not include a touch sensitive display screen. Some embodiments include a display device and one or more separate user interface devices. Further, some embodiments do not include a display device.

In some embodiments, the processing device 406 comprises one or more central processing units (CPU). In other embodiments, the processing device 406 additionally or alternatively includes one or more digital signal processors, field-programmable gate arrays, or other electronic circuits.

The memory device 408 operates to store data and instructions. In some embodiments, the memory device 408 stores instructions for a media playback engine 430. The memory device 408 may be configured similarly to the memory device 150 (FIG. 2) and, therefore, the description of the memory device 408 is omitted for brevity purposes.

The media playback engine 430 operates to play media content to the user U. As described herein, the media playback engine 430 is configured to communicate with the media delivery system 112 to receive one or more media content items (e.g., through the stream media 232). In other embodiments, the media playback engine 430 is configured to play media content that is locally stored in the mobile computing device 118.

In some embodiments, the media playback engine 430 operates to retrieve one or more media content items that are either locally stored in the mobile computing device 118 or remotely stored in the media delivery system 112. In some embodiments, the media playback engine 430 is configured to send a request to the media delivery system 112 for media content items and receive information about such media content items for playback.

Referring still to FIG. 5, the media content output device 410 operates to output media content. In some embodiments, the media content output device 410 generates media output 450 for the user U. In some embodiments, the media content output device 410 includes one or more embedded speakers 452 which are incorporated in the mobile computing device 118. Therefore, the mobile computing device 118 can be used as a standalone device that generates the media output 450.

In addition, some embodiments of the mobile computing device 118 include an external speaker interface 454 as an alternative output of media content. The external speaker interface 454 is configured to connect the mobile computing device 118 to another system having one or more speakers, such as headphones, portal speaker assemblies, and the vehicle media playback system 114, so that the media output 450 is generated via the speakers of the other system external to the mobile computing device 118. Examples of the external speaker interface 454 include an audio output jack, a Bluetooth® transmitter, a display panel, and a video output jack. Other embodiments are possible as well. For example, the external speaker interface 454 is configured to transmit a signal through the audio output jack or Bluetooth® transmitter that can be used to reproduce an audio signal by a connected or paired device such as headphones or a speaker.

The network access device 412 operates to communicate with other computing devices over one or more networks, such as the network 116 and the in-vehicle wireless data communication 122. Examples of the network access device 412 include wired network interfaces and wireless network interfaces. Wireless network interfaces includes infrared, Bluetooth® wireless technology, 802.11a/b/g/n/ac, and cellular or other radio frequency interfaces in at least some possible embodiments.

FIG. 6 schematically illustrates an example embodiment of the PMSA system 110 of FIG. 1. In this example, the PMSA system 110 includes a personal media streaming appliance (PMSA) 500 and a docking device 502.

As described herein, the PMSA system 110 is sized to be relatively small so that the PMSA system 110 can be easily mounted to a structure (e.g., a dashboard or head unit) of the vehicle 80 where the user can conveniently manipulate the PMSA system 110. By way of example, the PMSA system 110 is configured to be smaller than a typical mobile computing device, such as a smartphone. Further, the PMSA 500 provides a simplified user interface for controlling playback of media content. For example, the PMSA 500 has a limited set of physical control elements, such as a single rotary knob and one or more physical buttons as described below, so that the user can easily control the PMSA system 110 in the vehicle 80 (FIG. 1).

The PMSA 500 is configured to include at least some of the devices of the PMSA system 110 as illustrated with reference to FIG. 2. In some embodiments, the PMSA 500 includes all of the devices of the PMSA system 110 as illustrated in FIG. 2.

As illustrated also in FIG. 2, some embodiments of the PMSA 500 includes the user input device 130 that includes the manual input device 160 and the sound detection device 162. Some embodiments of the manual input device 160 include a control knob assembly 510 and one or more physical button assemblies 512.

In some embodiments, the control knob assembly 510 is configured to be maneuverable in multiple ways. For example, the control knob assembly 510 provides a plurality of regions on a knob face 514 that are independently depressible upon receiving a user's pressing action against the knob face 514. In the illustrated example, the control knob assembly 510 has five regions 516A-E (collectively 516) (e.g., up, down, left, right, and middle) that are separately depressible. At least some of the regions 516 are configured to receive inputs of different user commands (e.g., requests or instructions).

In other embodiments, the control knob assembly 510 is configured to be manipulated in different ways, such as tilting in multiple directions or sliding in multiple directions.

In addition, the control knob assembly 510 is configured to be rotatable. For example, the user can hold the control knob assembly 510 and rotate with respect to a body 520 of the PMSA 500. The control knob assembly 510 can be rotatable in both directions 522 (e.g., clockwise and counterclockwise). In other embodiments, the control knob assembly 510 is configured to rotate in only one direction.

The control knob assembly 510 is used to receive user inputs for controlling playback of media content. In addition or alternatively, the control knob assembly 510 can be used to receive user inputs for other purposes or functions.

The physical button assemblies 512 are configured to be depressed upon receiving a user's pressing action against the physical button assemblies 512. In the illustrated example, the PMSA 500 has four physical button assemblies 512A-512D (collectively 512). In some embodiments, each of the physical button assemblies 512 is configured to receive a single user command. In other embodiments, at least one of the physical button assemblies 512 is configured to receive multiple user commands.

In some embodiments, the physical button assemblies 512 are used as button assemblies that are preset to be associated with particular media content, thereby facilitating playback of such media content. In these embodiments, the physical button assemblies 512 are also referred to as preset button assemblies 512.

In addition, the PMSA 500 also includes the display screen 132. In some embodiments, the display screen 132 is arranged at the knob face 514 of the control knob assembly 510. As described herein, in some embodiments, the display screen 132 does not include a touch sensitive display screen, and is configured as a display device only. In other embodiments, however, the display screen 132 can be configured to be touch sensitive and receive a user input through the display screen 132 as well.

Referring still to FIG. 6, the docking device 502 is configured to mount the PMSA 500 to a structure of the vehicle 80. The docking device 502 is configured to removably mount the PMSA 500 thereto. The docking device 502 is further configured to attach to a structure of the vehicle 80 (FIG. 1) so that the PMSA 500 is positioned at the structure of the vehicle 80.

In some embodiments, an interface between the PMSA 500 and the docking device 502 is configured to prevent the PMSA 500 from rotating relative to the docking device 502 when the control knob assembly 510 is manipulated by a user. For example, the docking device 502 has a portion (e.g., a front portion of the docking device 502) configured to interlock a corresponding portion of the PMSA 500 (e.g., a rear portion of the PMSA 500) when the PMSA 500 is mounted to the docking device 502 such that the portion of the docking device 502 and the corresponding portion of the PMSA 500 form the interface therebetween.

In addition or alternatively, the PMSA 500 and the docking device 502 include magnetic materials at the interface therebetween so that the PMSA 500 and the docking device 502 are magnetically coupled to each other.

In some embodiments, the docking device 502 includes one or more electrical contacts 530 that are electrically connected to corresponding electrical contacts (not shown in FIG. 6) of the PMSA 500 when the PMSA 500 is mounted to the docking device 502. Such electrical connection between the PMSA 500 and the docking device 502 is provided for various functions.

In some embodiments, as described herein, the PMSA 500 does not include a battery sufficient for a prolonged use without an external power supply. In some embodiments, the PMSA 500 is primarily powered by a vehicle power supply 540. In some embodiments, the docking device 502 has a power receiving line 544 for connection to the vehicle power supply 540. For example, the power receiving line 544 extends from the docking device 502 and has a power connector 546 at a free end that is configured to mate with a vehicle power outlet 542 (e.g., a 12V auxiliary power outlet) of the vehicle power supply 540. As such, the docking device 502 receives electric power from the vehicle power supply 540 via the power receiving line 544, and the electrical connection between the PMSA 500 and the docking device 502 is configured to deliver electric power from the docking device 502 to the PMSA 500.

In some embodiments, as described herein, the PMSA 500 does not have a speaker and is designed to transmit media content signals to the vehicle media playback system 114 so that the media content is played through the vehicle media playback system 114. In some embodiments, the docking device 502 includes a media content output line 550 (also referred to herein as a media content output cable) (e.g., an auxiliary (AUX) output) configured to connect with the vehicle media playback input connector 340 (e.g., an auxiliary (AUX) port) of the vehicle media playback system 114. The docking device 502 is configured to receive media content signals from the PMSA 500 via the electrical connection between the PMSA 500 and the docking device 502, and transmit the signals to the vehicle media playback system 114 via the media content output line 550. In the illustrated embodiment, the power receiving line 544 and the media content output line 550 are combined to be a single line extending from the docking device 502 until the power connector 546, and the media content output line 550 further extends (or branches out) from the power connector 546 and terminates at a media output connector 552. The media output connector 552 is configured to connect to the vehicle media playback input connector 340 of the vehicle media playback system 114. In other embodiments, the media content output line 550 and the power receiving line 544 extend separately from the docking device 502.

In other embodiments, one or more of the power receiving line 544 and the media content output line 550 are directly connected to, and extend from, the PMSA 500 so that electric power is directly supplied to the PMSA 500 without the docking device 502 involved, and that the media content is directly transmitted to the vehicle media playback system 114 without passing through the docking device 502.

In some embodiments, the electrical connection between the PMSA 500 and the docking device 502 can be used to detect connection between the PMSA 500 and the docking device 502.

Figure 7:
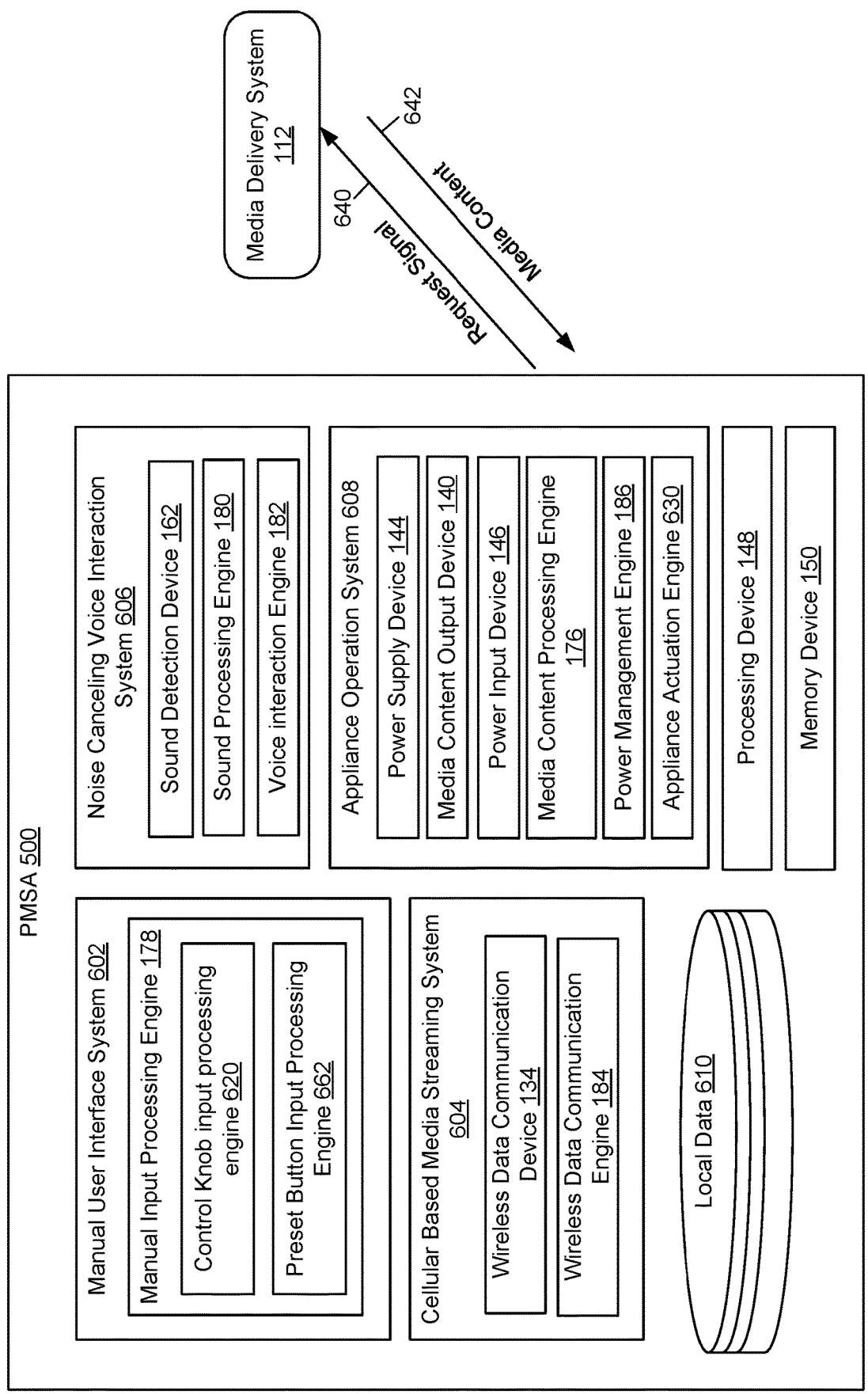
FIG. 7 is a block diagram of an example embodiment of a personal media streaming appliance (PMSA) of the PMSA system.

FIG. 7 is a block diagram of an example embodiment of the PMSA 500 of the PMSA system 110. In some embodiments, the PMSA 500 can include at least some of the devices of the PMSA system 110. Where same or similar devices are shown in this example, the same reference numbers will be used and the description of such same or similar devices is omitted or briefly provided for brevity purposes.

In some embodiments, the PMSA 500 can include the processing device 148 and the memory device 150 as described herein. In addition, the PMSA 500 can include a manual user interface system 602, a cellular-based media streaming system 604, a noise-cancelling voice interaction system 606, and an appliance operation system 608. In some embodiments, the PMSA 500 can include local data 610. In other embodiments, the PMSA 500 can include other devices or systems, such as at least one of the devices and the engines as illustrated and described with reference to FIG. 2.

The manual user interface system 602 is configured to receive manual user input for controlling playback of media content. In some embodiments, the manual user interface system 602 includes the rotatable manual control knob assembly 510 and a plurality of depressible preset button assemblies 512.

In some embodiments, the manual user interface system 602 includes the manual input processing engine 178. As described herein, in some embodiments, the manual input processing engine 178 is included in the memory device 150 and configured to detect the manual user input and control playback of the media content based on the manual user input. In some embodiments, the manual input processing engine 178 includes a control knob input processing engine 620 and a preset button input processing engine 622.

The control knob input processing engine 620 operates to receive the manual input via the control knob assembly 510. In some embodiments, when the control knob assembly 510 includes one or more sensors that detect manual inputs (e.g., press and rotation) and generate electric signals representative of the manual inputs when actuated. The control knob input processing engine 620 operates to process the electric signals and determine the user request (e.g., instruction or command) corresponding to the manual input.

The preset button input processing engine 622 operates to receive the manual input via at least one of the preset button assemblies 512. In some embodiments, when the preset button assemblies 512 includes one or more sensors that detect manual inputs (e.g., press) and generate electric signals representative of the manual inputs when actuated. The preset button input processing engine 622 operates to process the electric signals and determine the user request (e.g., instruction or command) corresponding to the manual input.

The cellular-based media streaming system 604 is configured to communicate with a media content provider (also referred to herein as a media streaming service provider or the like), such as the media delivery system 112, and receive media content from the media content provider via a cellular network. In some embodiments, the cellular-based media streaming system 604 includes the wireless data communication device 134. As described herein, the wireless data communication device 134 can be configured to communicate with the media content provider via a cellular network.

In some embodiments, the cellular-based media streaming system 604 includes the wireless data communication engine 184. As described herein, in some embodiments, the wireless data communication engine 184 is included in the memory device 150 and configured to interact with the wireless data communication device 134 and enable the PMSA system 110 to communicate with the media content provider. In some embodiments, the wireless data communication engine 184 can transmit at least one of a device identifier and a user account identifier to the media content provider and receive media content associated with the at least one of the device identifier and the user account identifier from the media content provider at least partially via the cellular network. As described herein, the device identifier identifies the PMSA 500, and the user account identifier identifies the user account associated with the PMSA 500. The media content provider can operate to determine media content based on the device identifier and/or the user account identifier and transmit the media content to the PMSA 500 at least partially via the cellular network.

The noise-cancelling voice interaction system 606 is configured to provide voice assistant functions with noise-cancellation technology. In some embodiments, the noise-cancelling voice interaction system 606 includes the sound detection device 162 as described herein. For example, the noise-cancelling voice interaction system 606 includes at least one microphone configured to detect sounds in the vehicle.

In some embodiments, the noise-cancelling voice interaction system 606 includes the sound processing engine 180 and the voice interaction engine 182. As described herein, the sound processing engine 180 can operate to identify a voice input from the detected sounds in the vehicle. The voice interaction engine 182 can operate to cooperate with the media content provider to determine a command intended by the voice input.

The appliance operation system 608 is configured to manage operation of the PMSA 500. In some embodiments, the appliance operation system 608 includes at least one of the media content output device 140, the power supply device 144, and the power input device 146.

As described herein, the media content output device 140 (also referred to herein the media content output interface) is configured to enable the PMSA 500 to transmit media content to the vehicle media playback device 114. The media content output device 140 can be of various types, such as an auxiliary (AUX) output interface, a USB output interface, or a wireless output interface (e.g., Bluetooth®, NFC, Wi-Fi®, or FM transmitter). As described herein, the power supply device 144 operates to store electric power to be used in the PMSA 500. The power input device 146 can be configured to be electrically connected to a power source of the vehicle and receive electric power from the vehicle.

In some embodiments, the appliance operation system 608 can include at least one of the media content processing engine 176, the power management engine 186, and an appliance activation engine 630. As described herein, the media content processing engine 176 can operate to process media content and generate a media content signal based on the media content. The media content processing engine 176 can transmit the media content signal to the vehicle media playback system 114 through the media content output device 140 so that the vehicle media playback system can use the media content signal to play the media content.

As described herein, the power management engine 186 is configured to charge the power supply device 144 (e.g., the battery with the electric power received from the power source of the vehicle through the power input device 146.

In some embodiments, the appliance activation engine 630 is configured to at least partially manage and operate at least one of the other engines of the PMSA 500. In some embodiments, the appliance activation engine 630 can be automatically activated by the processing device 148 upon powering up the PMSA 500, and the appliance activation engine 630 at least partially operates at least one of the other engines of the PMSA 500 upon activation.

In some embodiments, the appliance activation engine 630 can continue running until the PMSA 500 is powered off or down below a predetermined power level.

In some embodiments, the PMSA 500 is free of user interface controls that would allow a user to disable operation of the appliance activation engine 630 on the PMSA 500. As such, the operation of the appliance activation engine 630 is not configurable or programmable by a user so that the PMSA 500 automatically starts and continues running until the PMSA 500 is powered off or down to a predetermined power level (e.g., sleep mode).

Referring still to FIG. 7, the PMSA 500 can include the local data 610. The local data 610 is stored locally in the PMSA 500. The local data 610 include data associated with the PMSA 500. An example of the local data 610 is illustrated and described in further detail herein, such as with reference to FIG. 8.

As described herein, the PMSA 500 can operate to receive the user input 152 from a user U for controlling the PMSA 500, such as the manual input 154 or the voice input 156. The PMSA 500 can operate to process the user input 152 and generate a request signal 640 based on the user input 152. The request signal 640 represents a user request intended by the user input 152. The PMSA 500 can transmit the request signal 640 to the media content provider, such as the media delivery system 112, so that the media content provider can perform a function intended by the user request based on the request signal 640. For example, the media content provider can determine media content 642 associated with the request signal 640 and transmit the media content 642 to the PMSA 500 for playback. An example of the request signal 640 is illustrated and described in further detail herein, such as with reference to FIG. 9.

In some embodiments, where the user input 152 is the manual input 154, the manual user interface system 602 can at least partially operate to generate the request signal 640. Where the user input 152 is the voice input 156, the noise-cancelling voice interaction system 606 can at least partially operate to generate the request signal 640. In some embodiments, the cellular-based media streaming system 604 can at least partially operate to transmit the request signal 640 to the media content provider.

Figure 8:
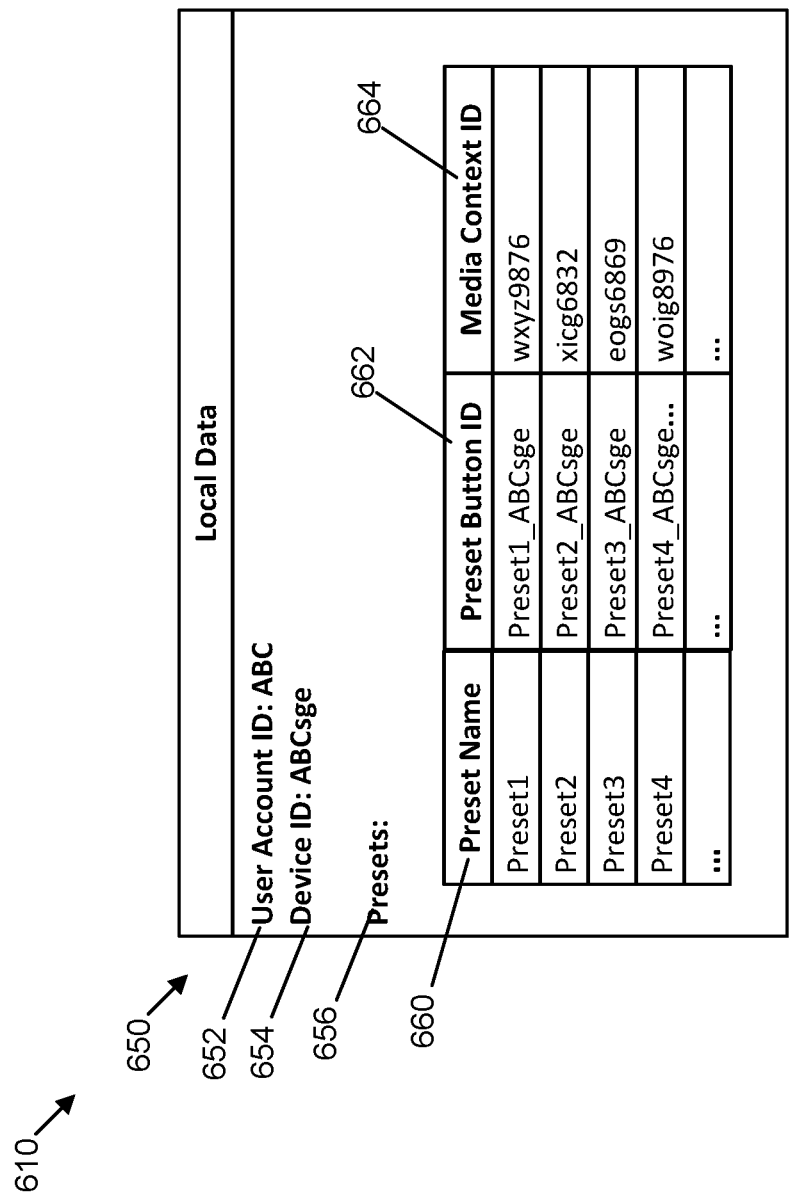
FIG. 8 illustrates an example data structure of local data.

FIG. 8 illustrates an example data structure 650 of the local data 610. As described above, the local data 610 can be stored in the PMSA system 110. In some embodiments, the local data 610 include a user account identifier 652, a device identifier 654, and preset button information 656. In other embodiments, the local data 610 can include other information, such as playback setting information (e.g., playback mode (shuffle, repeat, normal, etc.), playback speed, sound quality, etc.).

The user account identifier 652 is information that identifies a user account associated with the PMSA system 110. The device identifier 654 is information that identifies the PMSA system 110.

The preset button information 656 includes information about one or more preset buttons 512 of the PMSA system 110. In some embodiments, the preset button information 656 includes a preset name 660, a preset button identifier (ID) 662, and a media context identifier (ID) 664. The preset name 660 is a name of a preset button 512. The preset name 660 can be predetermined with a word or phrase (e.g., "Preset 1," "Preset 2," "Preset 3," and "Preset 4"). In other embodiments, the preset name 660 can be reset or renamed as desired by a user. The preset button identifier 662 is configured to identify an associated preset button 512. The media context identifier 664 is configured to identify a media context that is associated with a corresponding preset button 512. In some embodiments, the preset button identifier 662 and/or the media context identifier 664 are configured as Uniform Resource Identifiers (URIs).

Figure 9:
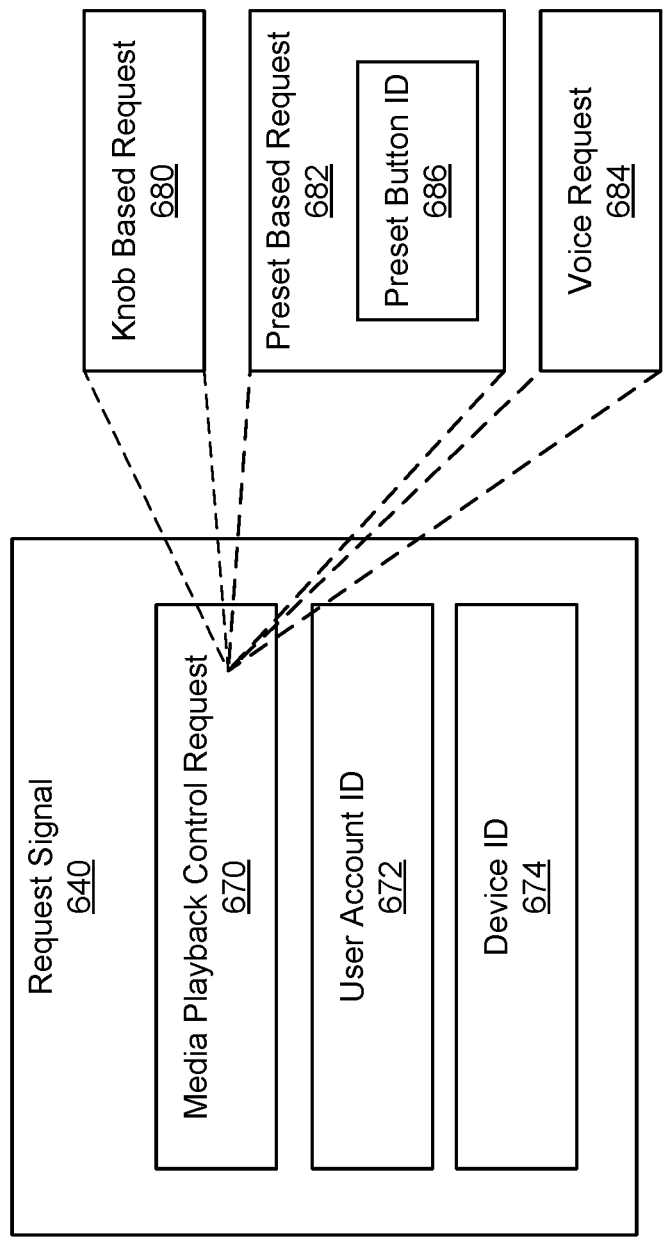
FIG. 9 illustrates an example request signal.

FIG. 9 illustrates an example of the request signal 640 of FIG. 7. In some embodiments, the request signal 640 conveys a media playback control request 670, a user account identifier 672, a device identifier 674.

As described herein, the request signal 640 is transmitted from the PMSA 500 to the media content provider, such as the media delivery system 112. The request signal 640 includes information that is usable by the media delivery system 112 to perform functions requested by the user input 152 via the PMSA 500. In some embodiments, the request signal 640 is generated based at least in part on the local data 610.

In some embodiment, the media playback control request 670 can include a request for controlling playback of media content, such as playing, stopping playback, changing playback settings, and other controlling associated with media content playback. In some embodiments, the media playback control request 670 can be at least one of a control knob based request 680, a preset based request 682, and a voice request 684.

The control knob based request 680 includes a request that is received via the control knob assembly 510. As described herein, the PMSA 500 operates to receive the user manual input 154 (e.g., a pressing action or a rotating action) via the control knob assembly 510 and process the user manual input 154 to determine the request intended by the user input.

The preset based request 682 includes a request that is received via a preset button 512 of the PMSA 500. As described herein, the PMSA 500 operates to receive the user manual input 154 (e.g., a pressing action) via the preset button 512 and process the user manual input 154 to determine the request intended by the user input.

The voice request 684 includes a request that is received via the sound detection device 162 (e.g., one or more microphone) of the PMSA 500. As described herein, the PMSA 500 operates to the receive the voice input 156 via the sound detection device 162 and process the voice input 156 to determine the request intended by the user input.

The user account identifier (ID) 672 is information that identifies a user account associated with the PMSA 500 at which the media playback control request 670 is received. In some embodiments, the user account identifier 672 is retrieved from the local data 610 (e.g., the user account identifier 652).

The device identifier (ID) 674 is information that identifies the PMSA 500 at which the media playback control request 670 is received. In some embodiments, the device identifier 674 is retrieved from the local data 610 (e.g., the device identifier 654).

Where the preset based request 682 is involved, the request signal 640 can include a preset button identifier (ID) 686. The preset button identifier 686 is information that identifies the preset button 512 of the PMSA 500 via which the media playback control request 670 is received. In some embodiments, the preset button identifier 676 is retrieved from the local data 610 (e.g., the preset button identifier 662).

In alternative embodiments, the request signal 640 can further include other information usable by the media content provider. Examples of such other information include a preset name of the selected preset button, a media context identifier associated with the selected preset button, playback setting information, and any other suitable information associated with or stored in the PMSA 500.

Referring to FIGS. 10-16, an example hardware structure of the PMSA system 110 is described. At least some hardware features of the PMSA system 110 have been illustrated and described herein, such as with reference to FIGS. 2, 6, and 7. To the extent appropriate, the same reference numbers can be used and the description of such same or similar devices is omitted or briefly provided for brevity purposes.

Figure 10:
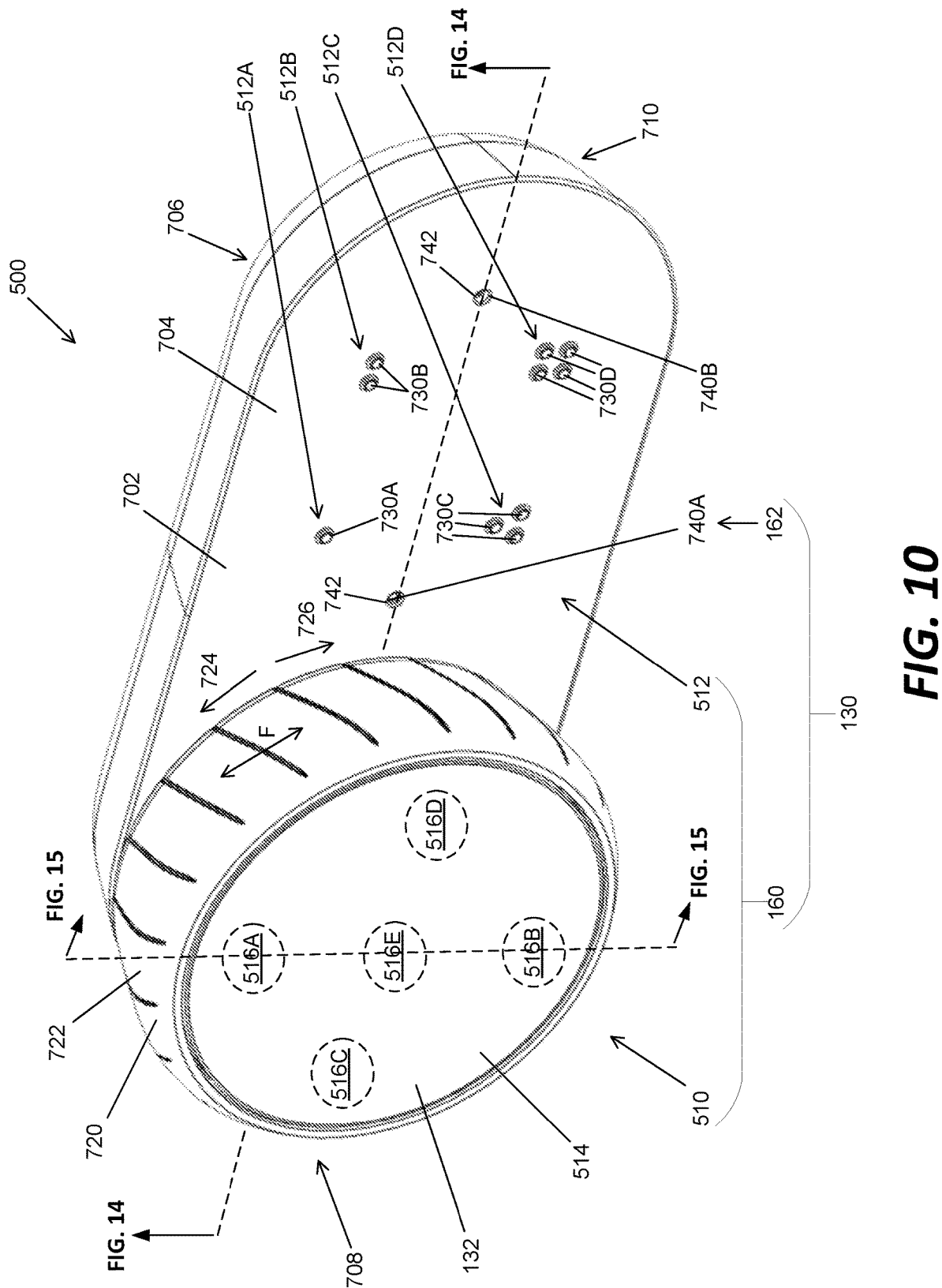
FIG. 10 is a front perspective view of an example PMSA.
Figure 13:
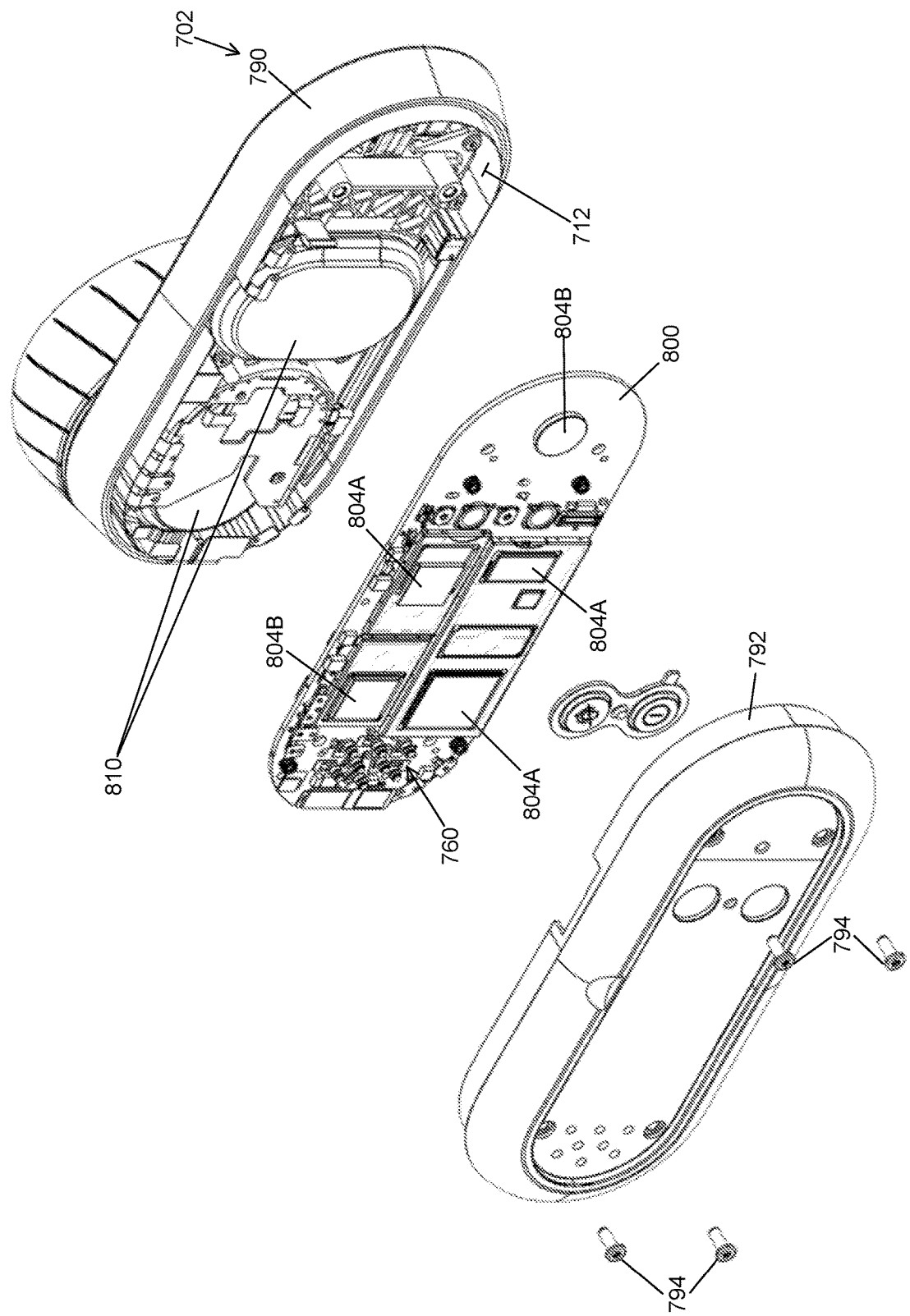
FIG. 13 is another exploded rear perspective view of the PMSA of FIG. 10.

FIG. 10 is a front perspective view of an example of the PMSA 500. In some embodiments, the PMSA 500 includes a body 702 having a front side 704 and a rear side 706 opposite to the front side 704. The body 702 has opposite lateral sides, such as a first lateral side 708 and an opposite second lateral side 710. The body 702 defines an interior space 712 (FIG. 13).

As described herein, the PMSA 500 includes the user input device 130, such as the manual input device 160 and the sound detection device 162. In some embodiments, the manual input device 160 includes a playback control assembly configured to control playback of media content. The manual input device 160 includes a control knob assembly 510 and one or more preset button assemblies 512.

The control knob assembly 510 is manually operable in a plurality of movements relative to the body 702. The plurality of movements correspond to a plurality of manual inputs. In some embodiments, the plurality of movements includes a rotational movement of at least a portion of the control knob assembly 510 relative to the body 702.

The control knob assembly 510 is arranged at the front side 704 of the body 702. In some embodiments, the control knob assembly 510 is disposed off the center of the front side 704 of the body 702 so that it is located to be biased toward either of the lateral sides 708 and 710. In this example, the control knob assembly 510 is arranged closer to the first lateral side 708 than to the second later side 710. Therefore, the center of the rotation of the control knob assembly 510 is spaced apart from the center of the body 702. The off-centered position of the control knob assembly 510 can prevent the body 702 of the PMSA 500 from rotating together with the control knob assembly 510 when the user operates the control knob assembly 510 to rotate relative to the body 702. Further, the off-centered position of the control knob assembly 510 can allow the body 702 to be securely mounted to the docking device 502 while the user rotates the control knob assembly 510, at least partially because the rotation of the control knob assembly 510 does not cause a rotation of the body 702 around its own center.

In some embodiments, the control knob assembly 510 has the front face 514 and a rotary knob 720. The front face 514 and the rotary knob 720 can be used to receive the manual input 154 in various ways.

As described herein, the front face 514 is configured to be depressible in multiple ways upon receiving a pressing action against different regions of the front face 514. In some embodiments, the front face 514 has five input regions 516A, 516B, 516C, 516D, and 516E (collectively 516) that are separately depressible. Actuation of different input regions 516 can be associated with different functions so that, when different input regions 516 are depressed by the manual input 154, different functions are performed. Such different functions can be associated with controlling of media content playback, such as play, stop (including pause), fast forward, fast reverse, skip, change playback mode (e.g., shuffle, repeat, normal, etc.), and other playback controls. Other functions or commands can be associated with, and triggered by, at least one of the input regions 516.

The rotary knob 720 is configured to rotate by the manual input 154. In some embodiments, the rotary knob 720 surrounds the front face 514 and provides a peripheral grip surface 722 on which a rotational input is applied to at least partially rotate the rotary knob 720. For example, the peripheral grip surface 722 is configured to be gripped by the user's fingers. By way of example, the user can hold the rotary knob 720 by gripping the peripheral grip surface 722 with fingers, and rotate the rotary knob 720 relative to the body 702.

In some embodiments, the rotary knob 720 can rotate in a plurality of directions, such as a first rotational direction 724 and an opposite second rotational direction 726. In other embodiments, the rotary knob 720 is configured to rotate in only one direction. In some embodiments, the rotary knob 720 is configured to continue to rotate in at least one of the possible rotational directions, without returning to a predetermined position. In other embodiments, the rotary knob 720 is configured to return to a predetermined default (or original) position when the rotary knob 720 is released after being rotated by a rotating action of the user.

In some embodiments, the rotary knob 720 is rotatable in various ways for receiving various inputs. For example, different functions or commands can be associated with different manipulations of the rotary knob 720, such as different magnitudes of rotation of the rotary knob 720, different speeds of rotation of the rotary knob 720, different directions of rotation of the rotary knob 720, and/or any other rotational control skims.

In some embodiments, the front face 514 is independently operable from the rotary knob 720. For example, the front face 514 can be depressed while the rotary knob 720 remains stationary upon the pressing action against the front face 514. Similarly, the rotary knob 720 can rotate around the front face 514 while the front face 514 remains stationary. In other embodiments, the control knob assembly 510 can be configured such that the front face 514 and the rotary knob 720 can be depressed together upon receiving the pressing action against the front face 514. In yet other embodiments, the control knob assembly 510 can be configured to be depressed as a whole when the front face 514 is depressed.

In some embodiments, the control knob assembly 510 is configured to be controlled in different ways. For example, the control knob assembly 510 is configured to be tilted multiple sideways (e.g., up, down, left, and right). In other examples, the control knob assembly 510 is configured to slide multiple sideways (e.g., up, down, left, and right). In addition, the control knob assembly 510 can be depressed upon pressing at the center as described herein.

As described herein, in some embodiments, the PMSA 500 includes the display screen 132 that is arranged at the knob face 514 of the control knob assembly 510. In some embodiments, the display screen 132 can display information relating to media content playback. In other embodiments, the display screen 132 can display other pieces of information. In some embodiments, the display screen 132 is configured as a display device only and is not touch sensitive. In other embodiments, the display screen 132 can be configured to be touch sensitive and receive a user input through the display screen 132 as well.

Referring still to FIG. 10, as described herein, the preset button assemblies 512 are configured to receive the manual input 154 to play media content that are preset to the respective preset button assemblies 512.

In some embodiments, the preset button assemblies 512 are arranged at the front side 704 of the body 702. In the illustrated example, four preset button assemblies 512A, 512B, 512C, and 512D (collectively 512) are provided at the front side 704 of the body 702.

The preset button assemblies 512 can be distinguished from each other in various methods. In the illustrated example, different numbers of dots are used to indicate different preset button assemblies 512. For example, the preset button assemblies 512A, 512B, 512C, and 512D are provided with one dots 730A, two dots 730B, three dots 730C, and four dots 730D, respectively. The dots 730 (including 730A, 730B, 730C, and 730D) can be configured with at least partially tubes that can protrude above the surface of the front side 704 to provide tactile sensation when touched or pressed by a user. The dots can be made of at least transparent material and lit by one or more light sources from the inside of the body 702. In other embodiments, different elements, such as symbols, characters, signs, printed elements or structures, or indicia can be used to differentiate the preset button assemblies 512. In some embodiments, such elements can be configured to emit light. By way of example, such elements can be at least partially made of self-luminous material. Such illumination of light can be configured to occur when the environment becomes dark.

In some embodiments, the preset button assemblies 512 can be actuated by a pressing action against the physical button assemblies 512. For example, the preset button assemblies 512 are configured to be depressed when a user presses the preset button assemblies 512 against the surface of the front side 704, and the preset button assemblies 512 operate to detect the depression thereof.

In some embodiments, each of the physical button assemblies 512 is configured to receive a single user command. For example, the preset button assemblies 512 are configured such that a single pressing action against each of them corresponds to a single input. In other embodiments, at least one of the physical button assemblies 512 is configured to receive multiple user commands. For example, different pressing actions (e.g., a set of pressing and releasing, a set of pressing and holding for a predetermined period of time, a set of multiple pressings for a predetermined of time, etc.) can correspond to different user inputs.

Referring still to FIG. 10, as described herein, the sound detection device 162 operates to detect sounds in or adjacent the PMSA 500. The sound detection device 162 can detect the voice input 156. In some embodiments, the sound detection device 162 includes one or more acoustic sensors, such as microphones. In the illustrated example, two microphones 740A and 740B (collectively 740) are used for the sound detection device 162. In other embodiments, more than two microphones 740 can be used. In some embodiments, the microphones 740A and 740B are arranged at the front side 704 of the body 702. For example, the microphones 740 are disposed in the interior 712 of the body 702 adjacent (e.g., underneath) the front side 704 of the body 702. The body 702 can have two microphone holes 742 that are aligned with the microphones 740 within the body 702 so that the microphones 740 are at least partially exposed at the front side 704 of the body 702. In other embodiments, one or more microphones 740 can be arranged in other locations in the front side 704 and/or in other sides of the body 702.

Such multiple microphones 740 can be used to cancel noises from the received sounds so that a desired sound (e.g., the voice input 156) is clearly identified. In this example, two microphones 740 of the sound detection device 162 are arranged apart from each other in the body 702 such that ambient noise is effectively canceled from the voice input 156 when the sounds are detected by the microphones 740.

Figure 11:
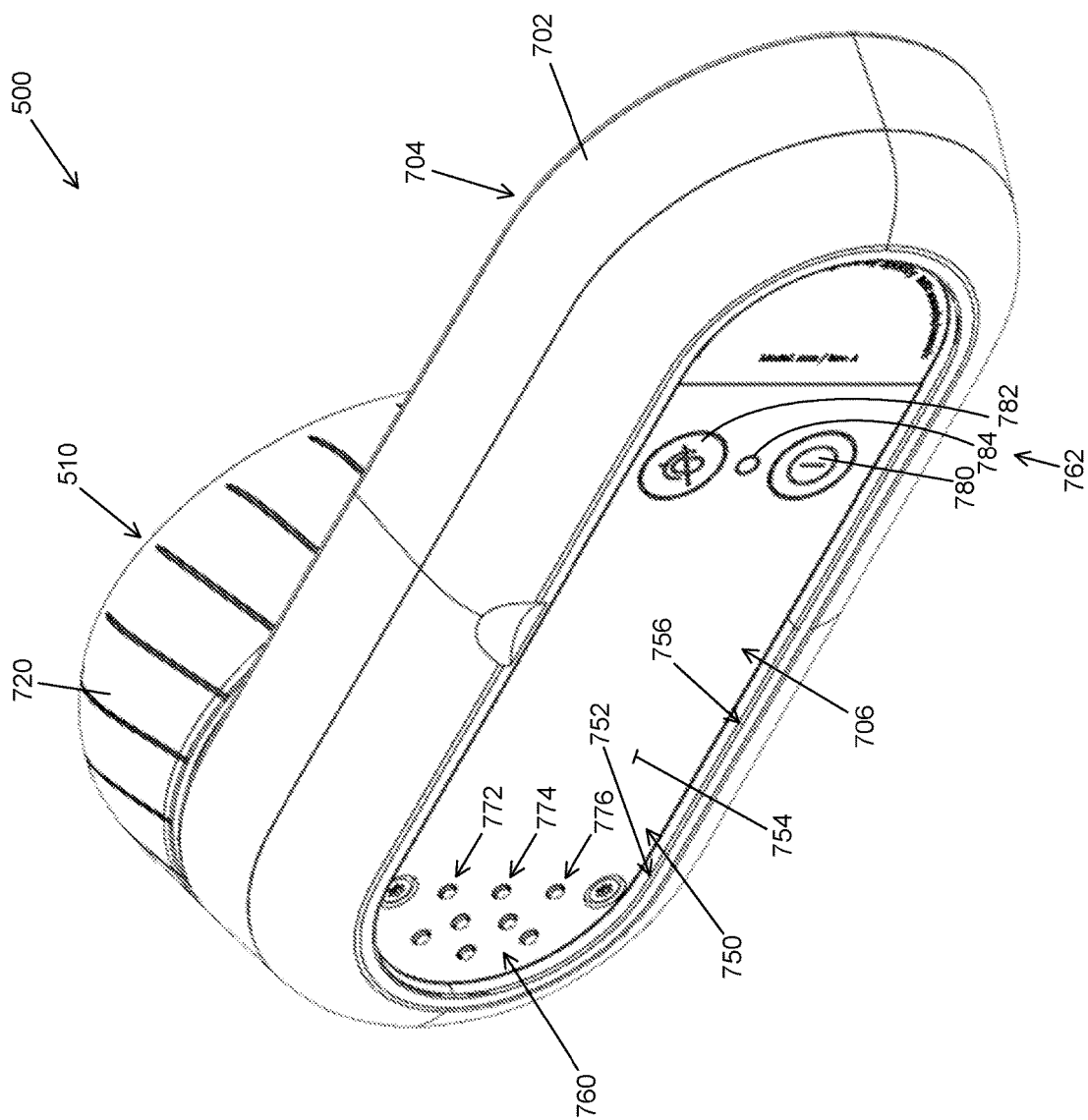
FIG. 11 is a rear perspective view of the PMSA of FIG. 10.

FIG. 11 is a rear perspective view of the PMSA 500 of FIG. 10. In some embodiments, the PMSA 500 includes a dock mounting structure 750, one or more appliance connectors 760, and one or more appliance control interfaces 762.

The dock mounting structure 750 can be arranged at the rear side 706 of the body 702. The dock mounting structure 750 is configured to engage the docking device 502.

In some embodiments, the dock mounting structure 750 is configured to provide anti-rotation structure that prevents the PMSA 500 from disengaging from the docking device 502 or rotating relative to the docking device 502 when the control knob assembly 510 (e.g., the rotary knob 720 thereof) is rotated by the user's rotating manual input. In some embodiments, the dock mounting structure 750 is constructed to have a non-circular profile 752. In the illustrated example, the dock mounting structure 750 includes a recessed portion 754 provided on the rear side 706 of the body 702. The recessed portion 754 can be configured to have a periphery 756 that defines the non-circular profile 752. In the illustrated example, the non-circular profile 752 includes generally semi-circular recesses at opposite ends (i.e., at or adjacent the first and second lateral sides 708 and 710 of the body 702) and a generally rectangular recess that extends between the opposite semi-circular recesses. Other shapes are also possible for the non-circular profile 752, such as generally oval, elliptical, or polygonal shapes.

In some embodiments, the PMSA 500 includes the appliance connectors 760 configured to electrically connect to corresponding connectors of the docking device 502 and enable the PMSA 500 to interact with the docking device 502 for communicating data and/or electric power therebetween. The appliance connectors 760 can include a plurality of electrical contacts. In some embodiments, the appliance connectors 760 include spring-loaded pins, such as Pogo pins. In other embodiments, the appliance connectors 760 include electrical plates.

In some embodiments, the appliance connectors 760 are arranged in the dock mounting structure 750 so that, when the dock mounting structure 750 is mounted to the docking device 502, the appliance connectors 760 are aligned with, and electrically connected to, corresponding connectors of the docking device 502. In some embodiments, the appliance connectors 760 includes a power input connector 772, a media signal output connector 774, and a docking identification connector 776.

The power input connector 772 is configured to electrically connect with a corresponding connector of the docking device 502 and receive electric power from the docking device 502. In some embodiments, the power input connector 772 includes a pair of electrical contacts for receiving electric power from the docking device 502 that can be connected to the power source of the vehicle. As described herein, the power input connector 772 can be used to charge one or more batteries in the PMSA 500 where the PMSA 500 includes such batteries.

The media signal output connector 774 is configured to electrically connect with a corresponding connector of the docking device 502 and transmit media content to the docking device 502. In some embodiments, the PMSA 500 transmits the media content signal 164 (FIG. 2) to the docking device 502 through the media signal output connector 774 so that the docking device 502 transmits the media content signal 164 to the vehicle media playback system 114 via, for example, the media content output line 550.

The docking identification connector 776 is configured to electrically connect with a corresponding connector of the docking device 502 and enables the PMSA 500 to determine that the PMSA 500 is mounted to the docking device 502 in place and electrically connected to the docking device 502 properly.

Referring still to FIG. 11, the PMSA 500 can further include the appliance control interfaces 762. In some embodiments, the appliance control interfaces 762 are arranged at the rear side 706 of the body 702. In other embodiments, the appliance control interfaces 762 are arranged in the dock mounting structure 750.

In some embodiments, the appliance control interfaces 762 include a power button 780, a microphone mute button 782, and a reset button 784. The power button 780 is configured to receive a user input (e.g., a press action) and turn on or off the PMSA 500 based on the user input. The microphone mute button 782 is configured to receive a user input (e.g., a press action) and turn on or off operation of the microphones 740 based on the user input. The reset button 784 is configured to receive a user input (e.g., a press action) and reset or format the PMSA 500 based on the user input.

Figure 12:
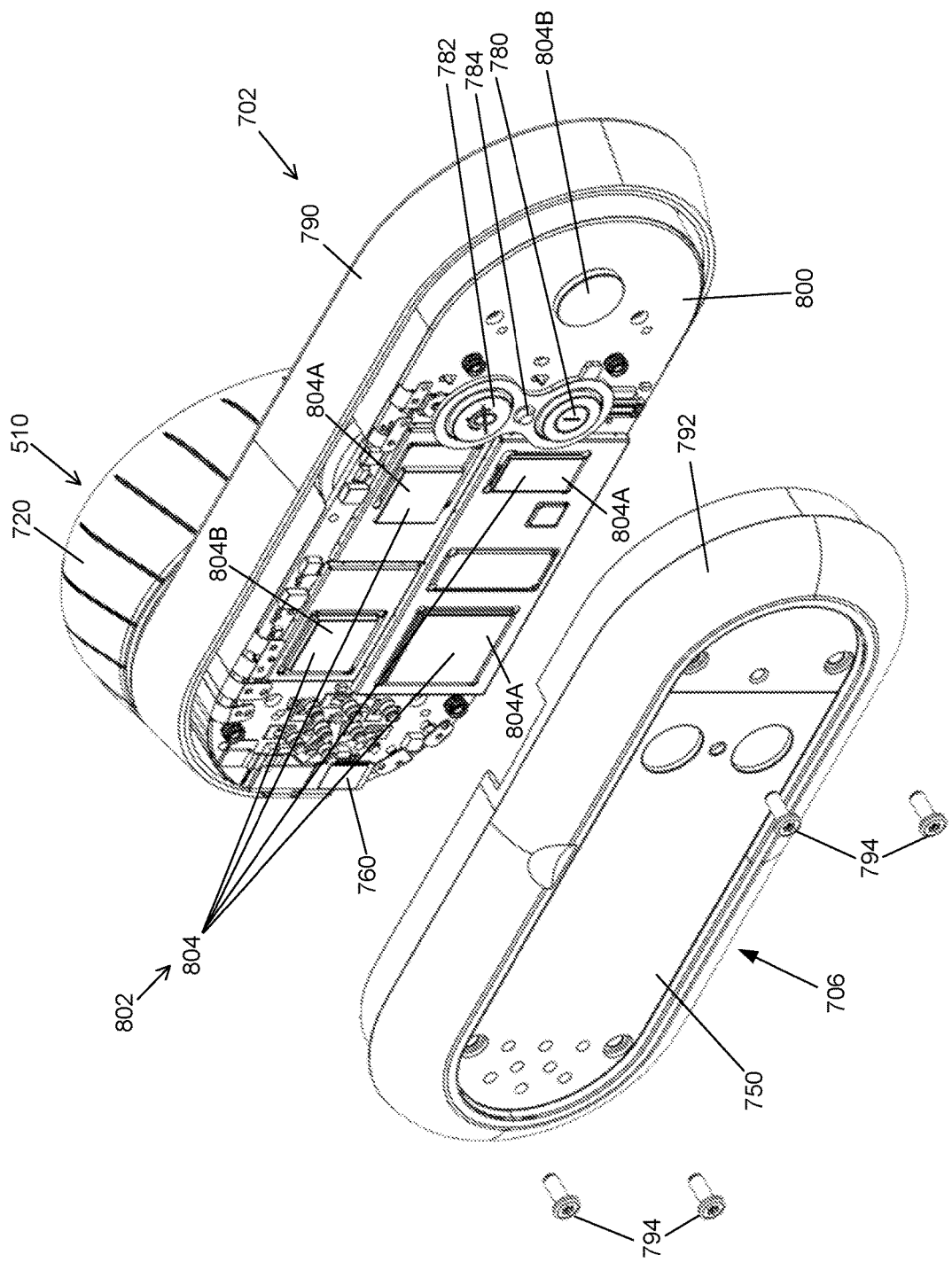
FIG. 12 is an exploded rear perspective view of the PMSA of FIG. 10.

FIG. 12 is an exploded rear perspective view of the PMSA 500 of FIG. 10. In some embodiments, the body 702 of the PMSA 500 includes a front body cover 790 and a rear body cover 792 that is coupled to the front body cover 790, thereby defining the interior space 712. In some embodiments, the front body cover 790 and the rear body cover 792 can be fastened to each other using one or more fasteners 794. In other embodiments, the front body cover 790 and the rear body cover 792 can be coupled in other methods, such as using adhesive.

The PMSA 500 includes at least one printed circuit board (PCB) 800 housed in the interior 712 of the body 702. The PCB 800 is configured to support and electrically connect electronic components and/or electrical components that implement the device, elements, components, and systems of the PMSA 500. For example, the PCB 800 is configured to include at least some of the devices of the PMSA 500 that are illustrated in FIGS. 2 and 7.

In some embodiments, the PMSA 500 includes an appliance magnetic attachment device 802 included in the interior space 712 of the body 702. The appliance magnetic attachment device 802 can be arranged adjacent (e.g., underneath) the rear side 706 of the body 702. The appliance magnetic attachment device 802 is configured to magnetically attract a corresponding magnetic device of the docking device 502 (FIG. 6) and thus cause the PMSA 500 to position and orient relative to the docking device 502 in a predetermined arrangement when the PMSA 500 is mounted to the docking device 502.

In some embodiments, the appliance magnetic attachment device 802 includes one or more plates 804 made of one or more magnetic materials. In some embodiments, the appliance magnetic attachment device 802 includes one or more first magnetic plates 804A with a polarity (e.g., north) and one or more second magnetic plates 804B with an opposite polarity (e.g., south). In this example, the PMSA 500 includes three magnetic plates 804A with "north" pole and two magnetic plates 804B with "south" pole.

In some embodiments, the appliance magnetic attachment device 802 is arranged in the dock mounting structure 750 (e.g., underneath the rear side 706 of the body 702 where the dock mounting structure 750 is located) so that the appliance magnetic attachment device 802 is used along with the dock mounting structure 750 of the PMSA 550.

FIG. 13 is another exploded rear perspective view of the PMSA 500 of FIG. 10. In FIG. 13, the PCB 800 is removed from an assembly received in the front body cover 790. In some embodiments, the PMSA 500 includes one or more batteries 810 (as the power supply device 144) included in the interior space 712 of the body 702. In this example, two batteries 810 are included in the interior space 712 of the body 702 and can be recharged and supply electric power to the PMSA 500.

Referring to FIGS. 14-31, an example of the control knob assembly 510 is described in more detail.

Figure 14:
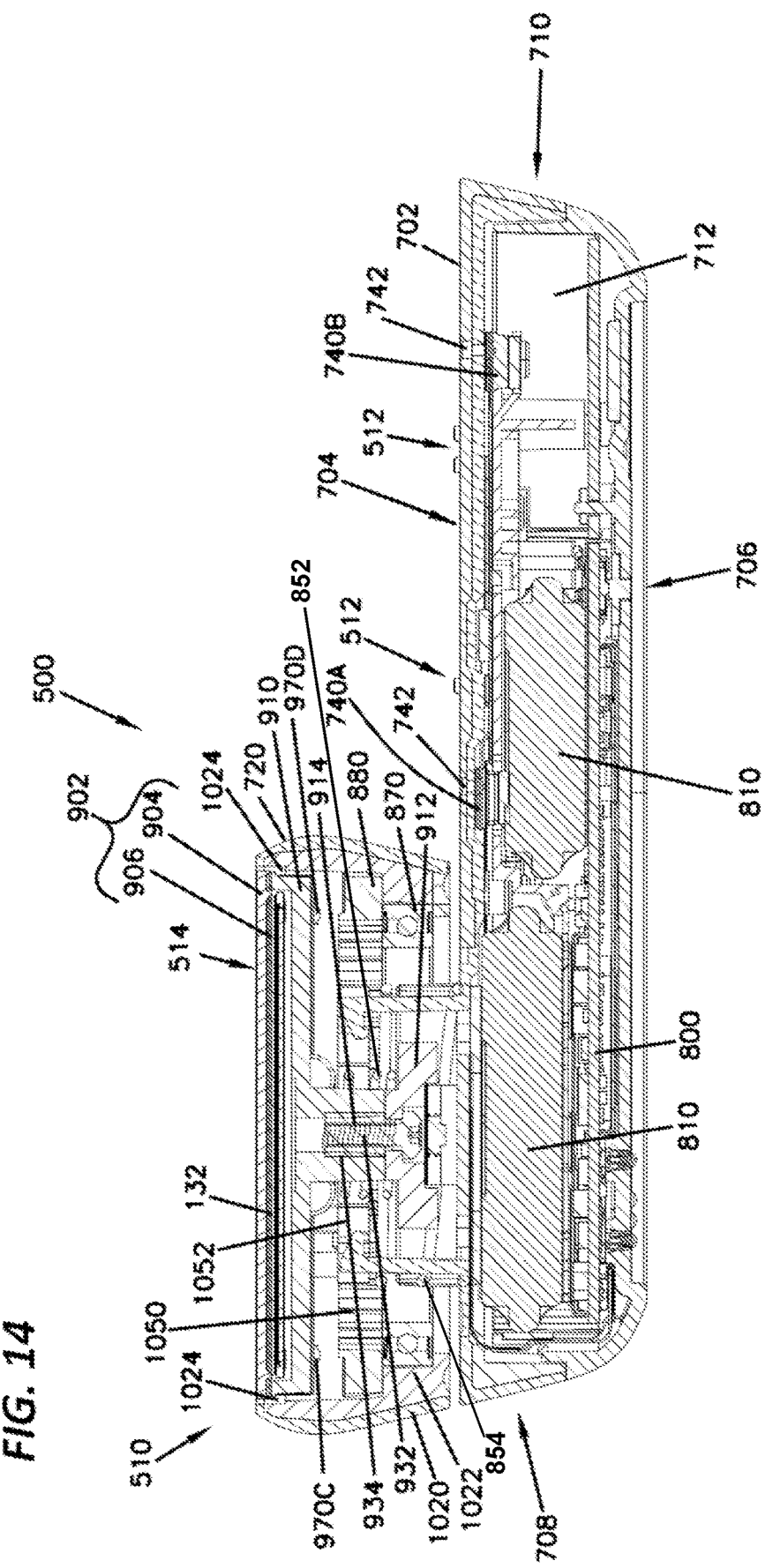
FIG. 14 is a cross sectional view of the PMSA of FIG. 10.

FIG. 14 is a cross sectional view of the PMSA 500 of FIG. 10. It is noted that the PMSA 500 can include one or more components (e.g., an inner knob 900 in FIG. 26) in addition to the components illustrated in FIG. 14. As described herein, the control knob assembly 510 includes the front face 514, the rotary knob 720, and the display device 132. In some embodiments, the control knob assembly 510 further includes a display carrier assembly 830, a press input sensor assembly 840, a spring device 850, an inner knob support structure 860, a bearing device 870, and a detent device 880. Various features of the control knob assembly 510 will be described below with reference back to FIG. 14.

Figure 15:
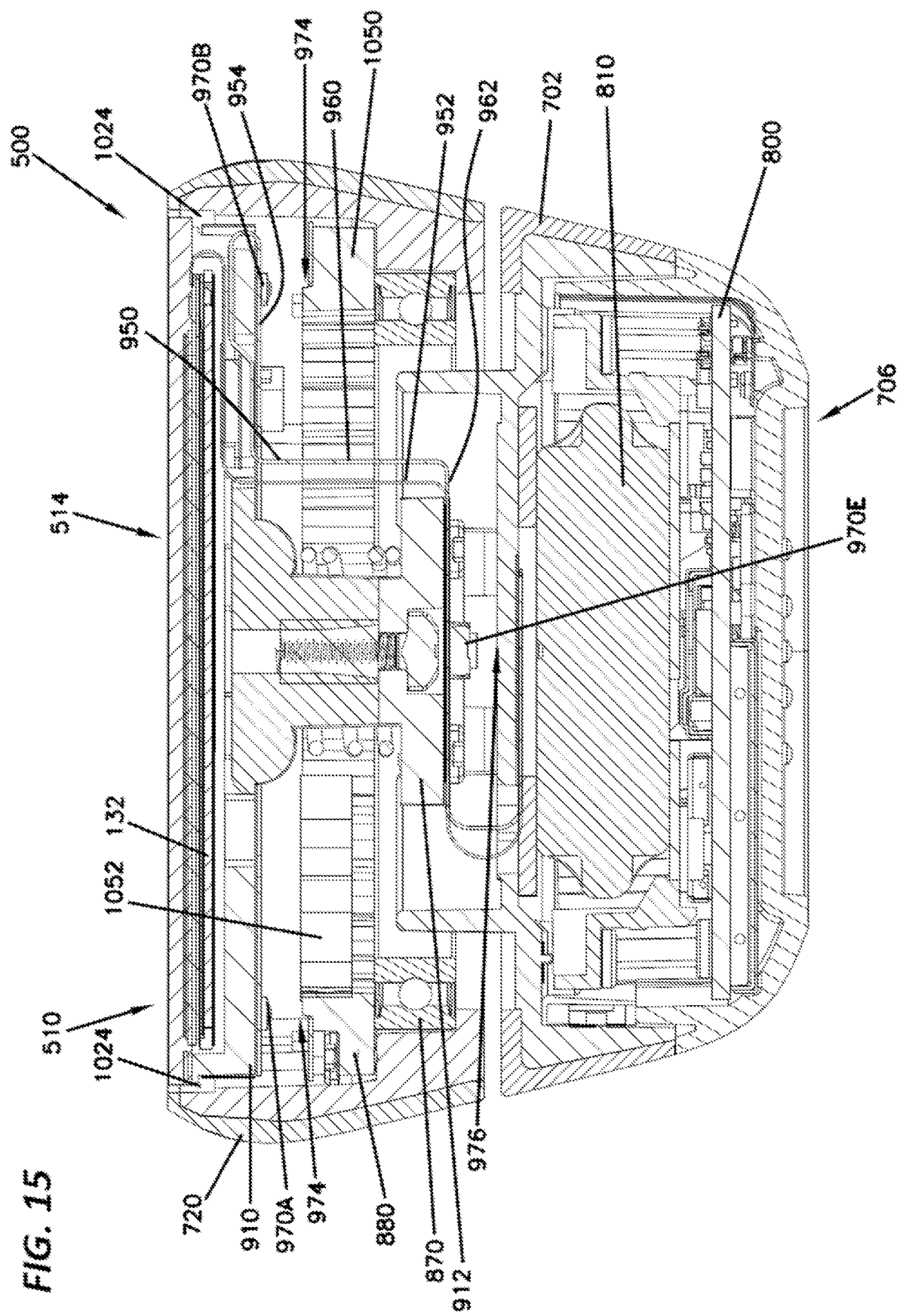
FIG. 15 is another cross sectional view of the PMSA of FIG. 10.

FIG. 15 is another cross sectional view of the PMSA 500 of FIG. 10. It is noted that the PMSA 500 can include one or more components (e.g., an inner knob 900 in FIG. 26) in addition to the components illustrated in FIG. 15. In some embodiments, the control knob assembly 510 further includes a rotational input sensor device 890. Various features of the control knob assembly 510 will be described below with reference back to FIG. 15.

Figure 16:
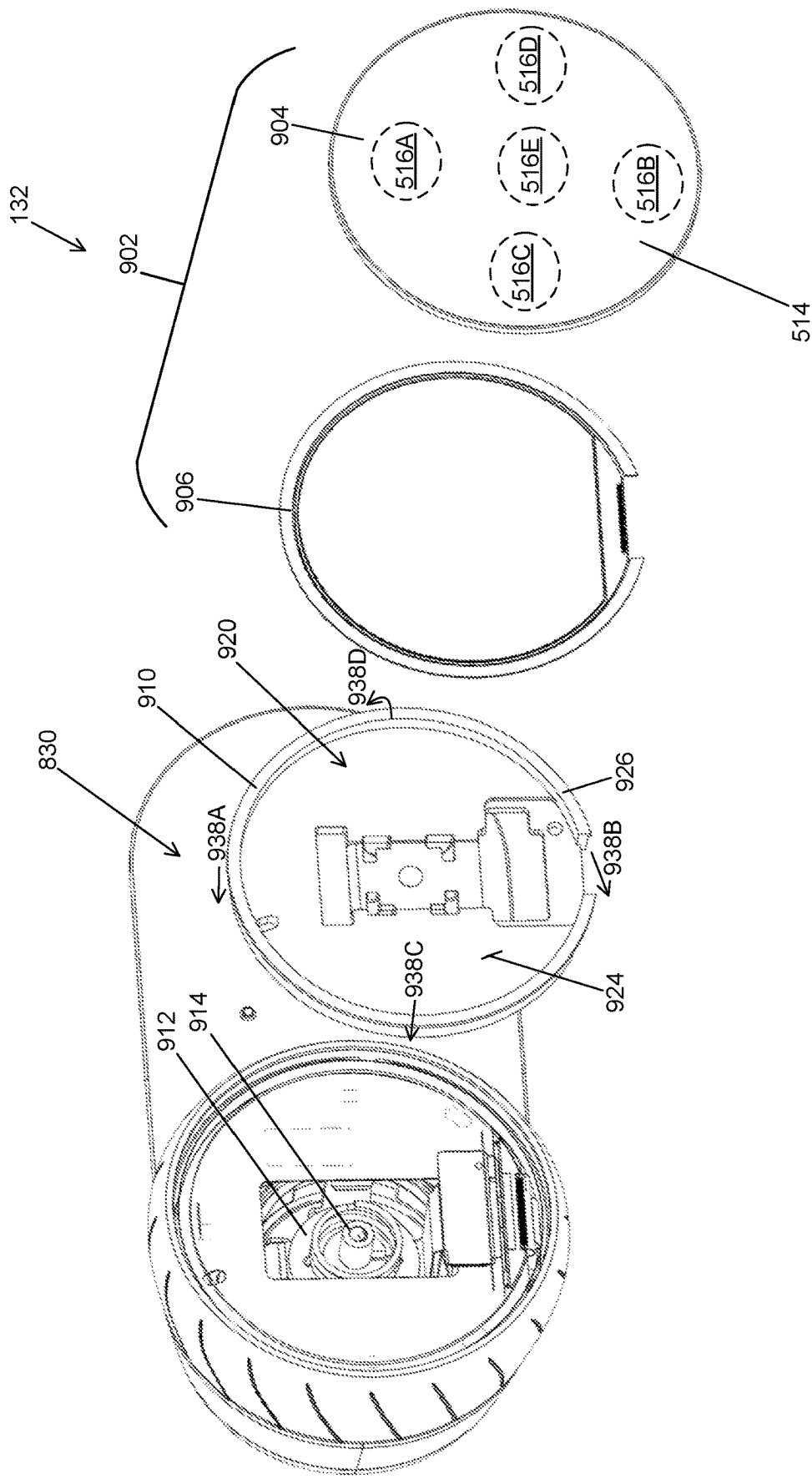
FIG. 16 is an exploded front perspective view of the PMSA of FIG. 10.

FIG. 16 is an exploded front perspective view of the PMSA 500 of FIG. 10. In some embodiments, the control knob assembly 510 includes a display assembly 902 and the display carrier assembly 830.

The display assembly 902 can be configured to provide the display device 132 as described herein. In some embodiments, the display assembly 902 can provide the front face 514 so that the display device 132 is arranged at the front face 514 as described herein. In some embodiments, the display assembly 902 includes a protective layer assembly 904 and a display layer assembly 906.

The protective layer assembly 904 includes one or more layers configured to cover the display layer assembly 906 and protect the display layer assembly 906 and other elements under the protective layer assembly 904. In some embodiments, the protective layer assembly 904 provides the front face 514 as described herein.

The display layer assembly 906 includes one or more layers that constitute the display device 132, such as LED, LCD, or other suitable display devices. In some embodiments, the display device 132 is arranged under the front face 514.

The display carrier assembly 830 is configured to receive and support the display device 132. In some embodiments, the display carrier assembly 830 includes a display carrier 910, a carrier base 912, and a carrier fastening device 914.

Figure 17:
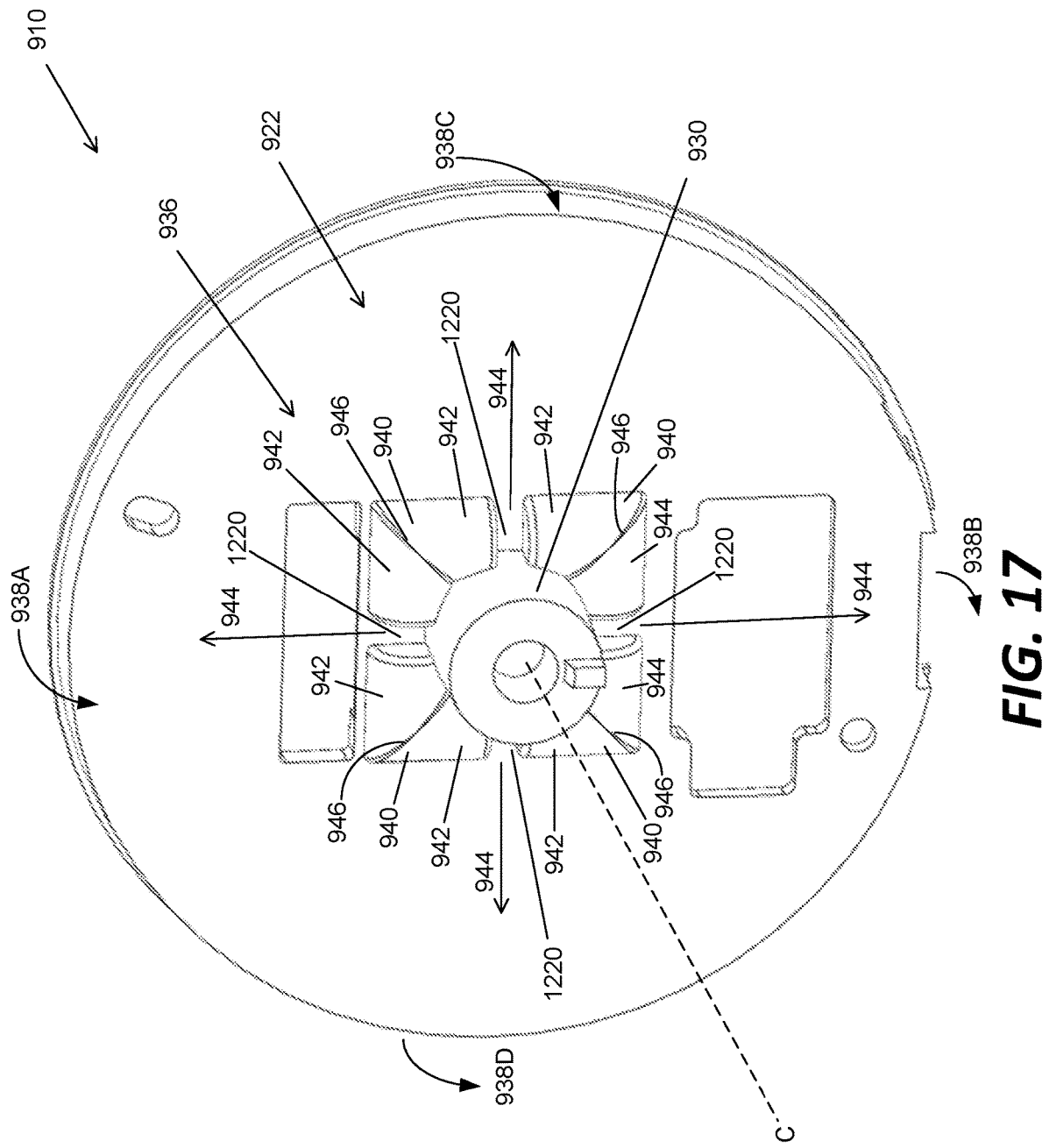
FIG. 17 is a rear perspective view of an example display carrier.

The display carrier 910 has a front side 920 and an opposite rear side 922 (FIG. 17). The display carrier 910 includes a recess 924 at the front side 910 that is configured to at least partially receive the display device 132, such as the display layer assembly 906. In some embodiments, the display carrier 910 includes a lip 926 that surrounds the recess 924, and the protective layer assembly 904 can seat against the lip 926 of the display carrier 910.

As described herein, in the illustrated example herein, the plurality of input regions 516 includes a first region 516A and a second region 516B arranged opposite to the first region 516A with a center C of the front face 514 therebetween. In some embodiments, when the pressing input is applied on the first region 516A, the front face 514 (and thus the display carrier 910) is configured to pivot in a first pivot direction (e.g., a first primary direction of rotation 938A) and trigger an instruction for first playback control. When the pressing input is applied on the second region 516B, the front face 514 (and thus the display carrier 910) is configured to pivot in a second pivot direction (e.g., a second primary direction of rotation 938B) and trigger an instruction for second playback control. The plurality of input regions 516 can further include a third region 516C and a forth region 516D arranged opposite to the third region 516C with the center C of the front face 514 therebetween. In some embodiments, when the pressing input is applied on the third region 516C, the front face 514 (and thus the display carrier 910) is configured to pivot in a third pivot direction (e.g., a third primary direction of rotation 938C) and trigger an instruction for third playback control. When the pressing input is applied on the fourth region 516D, the front face 514 (and thus the display carrier 910) is configured to pivot in a fourth pivot direction (e.g., a fourth primary direction of rotation 938D) and trigger an instruction for fourth playback control. The plurality of input regions 516 can further include a fifth region 516E arranged at the center C of the front face 514. In some embodiments, when the pressing input is applied to the fifth region 516E, the front face 514 (and thus the display carrier 910) is configured to depress with respect to the body 702 of the PMSA 500 and trigger an instruction for fifth playback control.

FIG. 17 is a rear perspective view of the display carrier 910 of FIG. 16. In some embodiments, the display carrier 910 includes a carrier neck 930 that extends from the rear side 922 and is configured to connect with the carrier base 912 using the carrier fastening device 914. In some embodiments, the carrier neck 930 extends along a center axis C of the display carrier 910.

As illustrated in FIGS. 14 and 15, the display carrier 910 and the carrier base 912 can be connected by the carrier fastening device 914. In some embodiments, the carrier fastening device 914 includes a screw 932 that couples the carrier base 912 to the carrier neck 930 of the display carrier 910. In some embodiments, a sleeve 934 is provided to be disposed between the screw 932 and the carrier neck 930.

In some embodiments, the display carrier 910 includes a tilt guide structure 936 configured to guide the display carrier 910 to tilt (or incline) in the primary directions of rotation 938 (including 938A, 938B, 938C, and 938D). The primary directions of rotation 938A, 938B, 938C, and 938D can correspond to the rotational directions in which the display carrier 910 is tilted when the side input regions 516A, 516B, 516C, and 516D (collectively 516) are pressed on the front face 514. The tilt guide structure 936 is configured to prevent the display carrier 910 from tilting in rotational directions other than the primary directions of rotation 938, such as rotational directions arranged between the primary directions of rotation 518A, 518B, 518C, and 518D (i.e., rotational directions positioned between the side input regions 516A, 516B, 516C, and 516D).

In some embodiments, the tilt guide structure 936 includes one or more blocks 940 that have curved surfaces 942 toward directions 944 aligning the primary directions of rotation 938 so that the display carrier 910 can smoothly tilt in the primary directions of rotation 938. The blocks 940 include ridges 946 that extend between the directions 944 (i.e., extend along lines between the primary directions of rotation 938) so that the display carrier 910 is prevented from tilting when the front face 514 is pressed between the side input regions 516.

Figure 18:
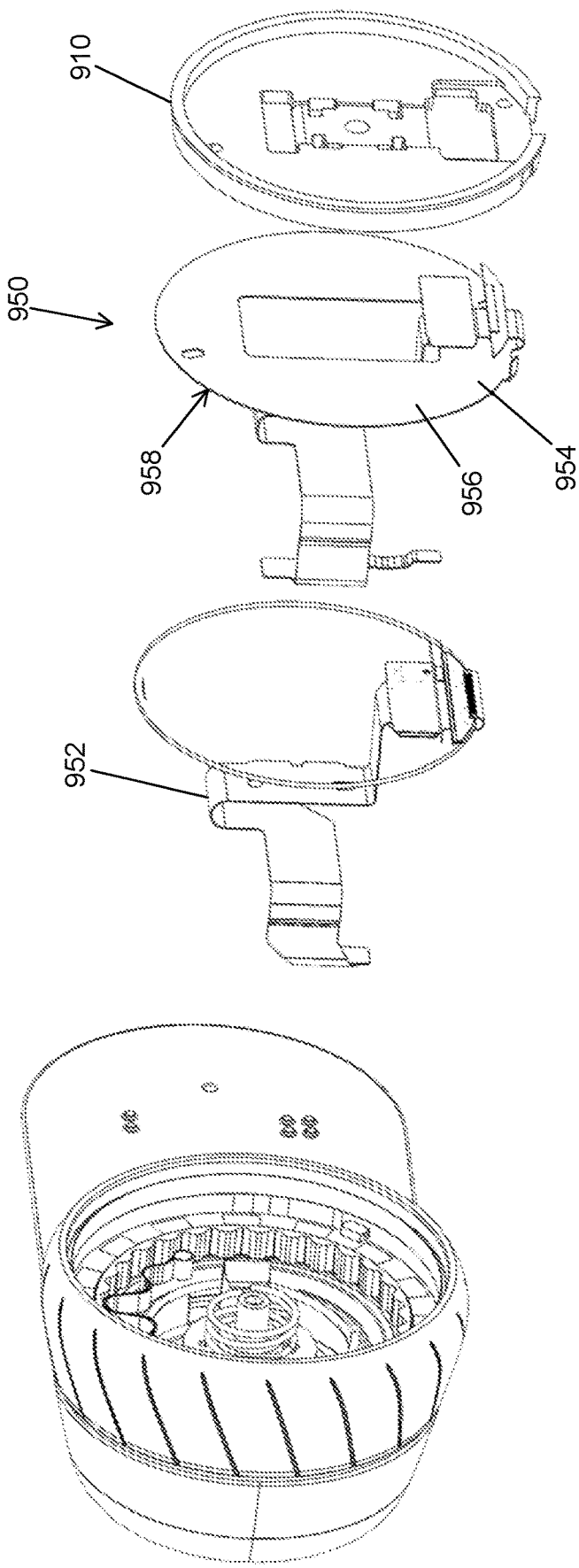
FIG. 18 is another exploded rear perspective view of the PMSA.

FIG. 18 is another exploded rear perspective view of the PMSA 500. It is noted that the PMSA 500 can include one or more components (e.g., an inner knob 900 in FIG. 26) in addition to the components illustrated in FIG. 18. In some embodiments, the control knob assembly 510 includes a carrier support frame 950 and an electrical wiring 952.

Figure 19:
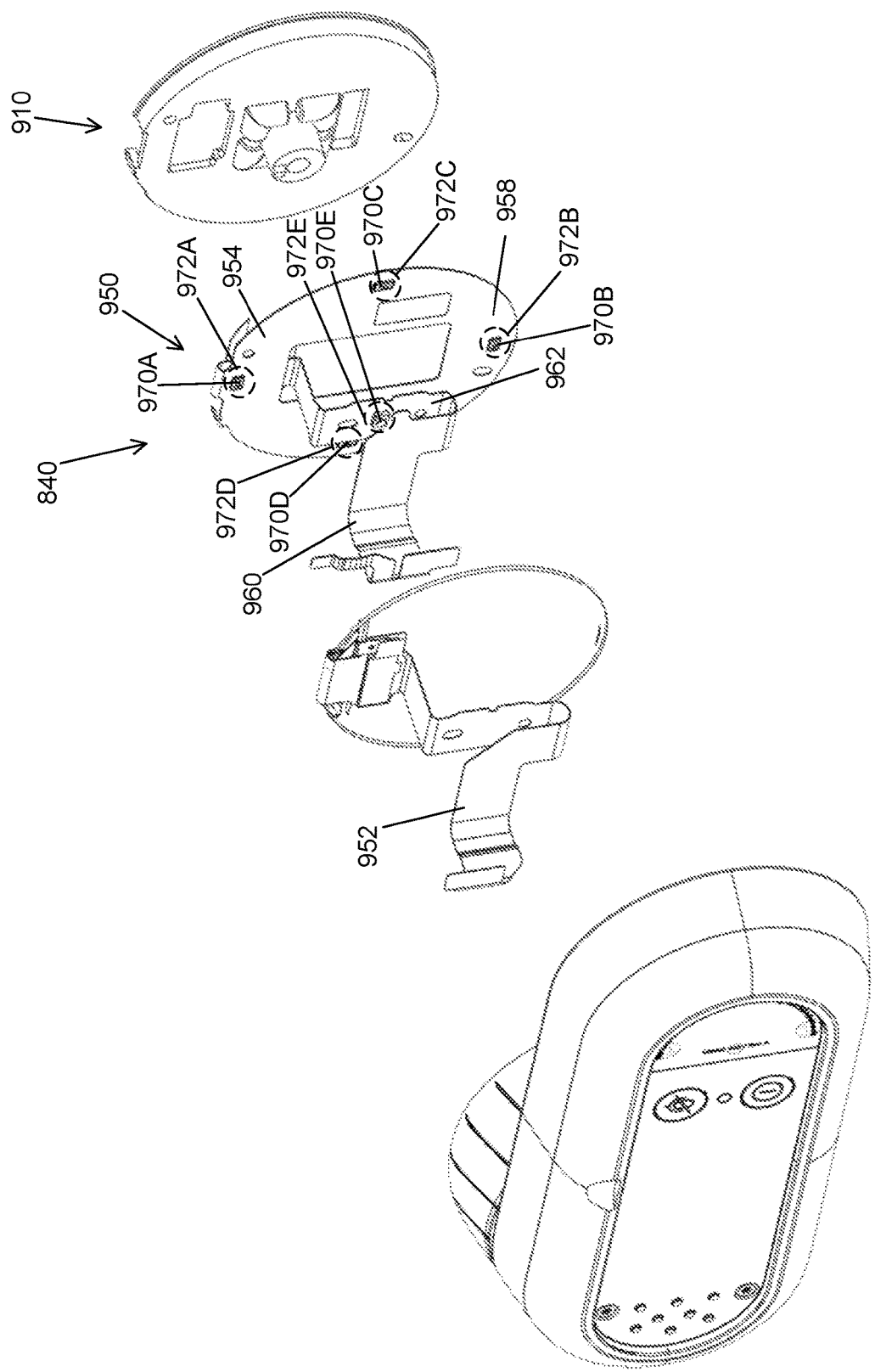
FIG. 19 is an exploded front perspective view of the PMSA of FIG. 18.

The carrier support frame 950 is disposed in the control knob assembly 510 and configured to support the display carrier 910 in the control knob assembly 510. In some embodiments, the carrier support frame 950 includes a head plate 954 having a front surface 956 and an opposite rear surface 958 (FIG. 19). The display carrier 910 can be secured to the front surface 956 of the head plate 954.

In some embodiments, the carrier support frame 950 is configured to at least partially route the electrical wiring 952 from the control knob assembly 510 to the PCB 800 in the body 702 of the PMSA 500.

The electrical wiring 952 is configured to electrically connect various electrical elements of the control knob assembly 510 to the PCB 800 in the body 702 of the PMSA 500. In some embodiments, the electrical wiring 952 is configured to electrically connect the display device 132 to the PCB 800 in the body 702 of the PMSA 500. Further, the electrical wiring 952 can electrically connect sensors in the control knob assembly 510 to the PCB 800.

FIG. 19 is an exploded front perspective view of the PMSA 500 of FIG. 18. It is noted that the PMSA 500 can include one or more components (e.g., an inner knob 900 in FIG. 26) in addition to the components illustrated in FIG. 19. In some embodiments, the carrier support frame 950 includes a frame leg 960 extending from the head plate 954 and configured to route the electrical wiring 952. The electrical wiring 952 can be routed in the PMSA 500 by following the configuration of the frame leg 960 of the carrier support frame 950.

In some embodiments, the frame leg 960 includes a carrier base support portion 962 configured to secure the carrier base 912 thereto. As illustrated, the carrier base support portion 962 can be arranged generally in parallel with the head plate 954 so that the assembly of the display carrier 910 and the carrier base 912 is disposed between the head plate 954 and the carrier base support portion 962 of the frame leg 960, as illustrated in FIG. 15.

In some embodiments, the press input sensor assembly 840 is secured to the carrier support frame 950. The press input sensor assembly 840 is configured to detect a pressing input against the control knob assembly 510. For example, the press input sensor assembly 840 operates to detect the pressing input against the input regions 516 (including 516A, 516B, 516C, 516D, and 516E) on the front face 514.

In some embodiments, the press input sensor assembly 840 includes a plurality of press input sensors 970 arranged under the input regions 516 of the front face 514, respectively. Each of the press input sensors 970 is configured to be actuated when the pressing input is applied to a corresponding input region 516, thereby causing the front face 514 (e.g., the display carrier 910) to be depressed at the corresponding input region.

In some embodiments, the plurality of press input sensors 970 is arranged at a plurality of sensor regions 972 under the display carrier. The plurality of sensor regions 972 can be aligned with the plurality of input regions 516 of the front face 514. In some embodiments, the sensor regions 972 are provided at the carrier support frame 950 so that the press input sensors 970 are secured to the carrier support frame 950.

For example, the side press input sensors 970A, 970B, 970C, and 970D can be secured to the sensor regions 972A, 972B, 972C, and 972D on the rear surface 958 of the head plate 954 of the carrier support frame 950. The sensor regions 972A, 972B, 972C, and 972D (and thus the side press input sensors 970A, 970B, 970C, and 970D) are generally aligned with the side input regions 516A, 516B, 516C, and 516D on the front face 514. In addition, in some embodiments, the center press input sensor 970E can be secured to the sensor region 972E on the carrier base support portion 962 of the carrier support frame 950.

The press input sensors 970 can be of various types. In some embodiments, the press input sensors 970 include push switches, push buttons, tactile switches, or other switches that are actuated when pressed. Other types of switches can be used for the press input sensors 970, such as electrical, mechanical, electromechanical, or optical switches.

The press input sensors 970 can be actuated in various methods. In some embodiments, when each of the side input regions 516A, 516B, 516C, and 516D on the front face 514 are depressed by a pressing input, the front face 514 (and thus the display carrier 910) is tilted or pivoted accordingly, and the press input sensor 970A, 970B, 970C, or 970D that is associated with the depressed side input region becomes abutted with, and pressed against, a structure 974 in the control knob assembly 510. In some embodiments, the structure 974 includes a peripheral lip portion 1212 of an inner knob 900 as described herein. Similarly, when the center input region 516E on the front face 514 is depressed by a pressing input, the front face 514 (and thus the display carrier 910) is depressed entirely, and the center press input sensor 970E becomes abutted with, and pressed against, a structure 976 (e.g., the knob base structure 1034) in the control knob assembly 510. When fully pressed, the press input sensors 970 can be actuated and generate an electrical signal representative of such actuation.

Figure 20:
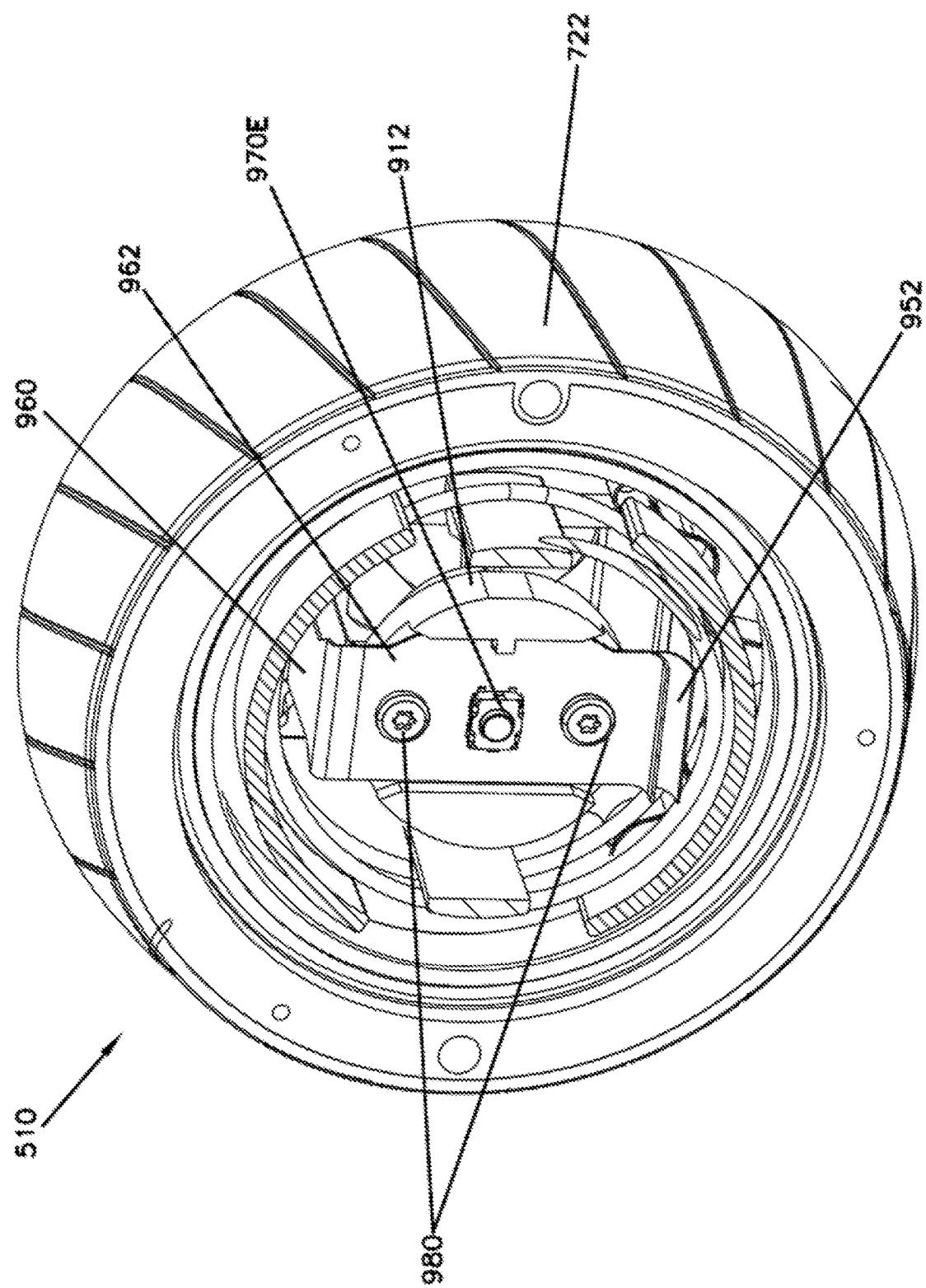
FIG. 20 illustrates a cross sectional perspective view of an example control knob assembly with an example center press input sensor and surrounding structures.

FIG. 20 illustrates a cross sectional perspective view of the control knob assembly 510 that illustrates the center press input sensor 970E and surrounding structures. As described herein, the carrier base 912 is secured to the carrier base support portion 962 of the frame leg 960. In some embodiments, fasteners 980 can be used to fasten the carrier base support portion 962 with the carrier base 912. The center press input sensor 970E is secured to the carrier base support portion 962 of the carrier support frame 950 and aligned with the center of the display carrier 910 (thus to be aligned with the center input region 516E on the front face 514).

In some embodiments, the electrical wiring 952 can be also secured to the carrier base 912 together with the carrier base support portion 962 of the frame leg 960. In this example, the same fasteners 980 are used to fasten the carrier base support portion 962 and the electrical wiring 952 to the carrier base 912.

Figure 21:
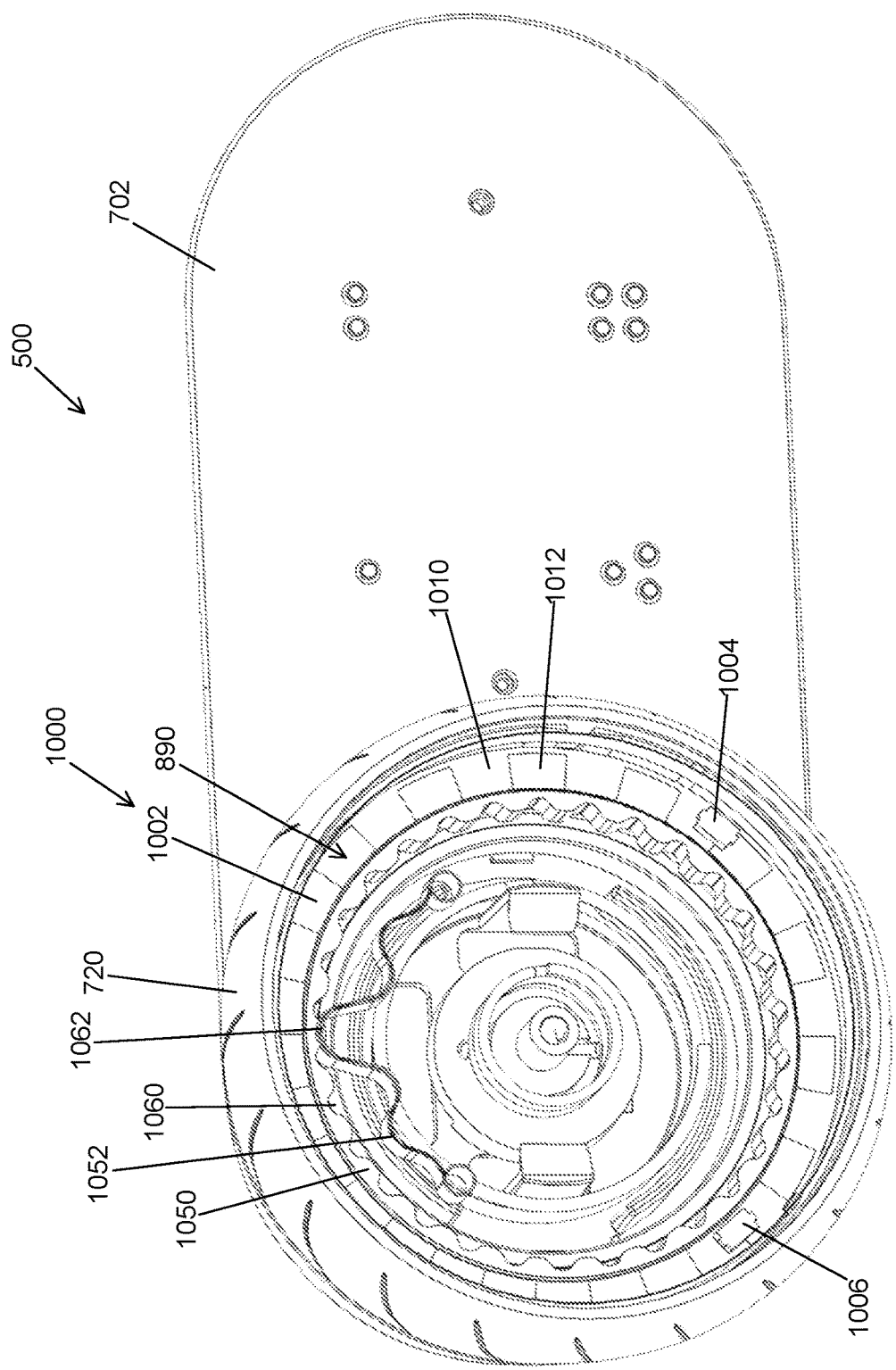
FIG. 21 is a front perspective view of an internal structure of the control knob assembly.

FIG. 21 is a front perspective view of an internal structure of the control knob assembly 510. It is noted that the PMSA 500 can include one or more components (e.g., an inner knob 900 in FIG. 26) in addition to the components illustrated in FIG. 21. In some embodiments, the control knob assembly 510 includes the rotational input sensor device 890 that detects receipt of the rotational input on the rotary knob 720. In some embodiments, the rotational input sensor device 890 includes an optical rotary encoder assembly 1000.

In some embodiments, the optical rotary encoder assembly 1000 includes a disc or wheel that is made of glass or plastic with alternating transparent and opaque areas or alternating light and dark strips around a periphery of the disc or wheel. The optical rotary encoder assembly 1000 can further include a light source and photo detector array configured to read the optical pattern that results from the disc's position at any one time. In some embodiments, a reflected binary code (RBC) can be used. Such a code can be read by a controlling device, such as a microprocessor or microcontroller to determine the angle of the disc or wheel. In some embodiments, the optical rotary encoder assembly 1000 is configured to detect an absolute position of the rotary knob 720. In other embodiments, the optical rotary encoder assembly 1000 is configured to detect a relative position of the rotary knob 720.

In the illustrated example, the optical rotary encoder assembly 1000 includes a sensing wheel 1002 and one or more sensing units, such as a first sensing unit 1004 and a second sensing unit 1006.

The sensing wheel 1002 is configured to rotate with the rotary knob 720. The sensing wheel 1002 has a plurality of first strips 1010 and a plurality of second strips 1012 that are alternately arranged at a peripheral area of the sensing wheel 1002 (e.g., the peripheral strip area). The first strips 1010 can have a first reflection coefficient, and the second strips 1012 can have a second reflection coefficient different from the first reflection coefficient. By way of example, the first strips 1010 has a dark color (e.g., black), and the second strips 1012 has a light color (e.g., white).

The sensing units 1004 and 1006 are arranged adjacent the sensing wheel 1002 and configured to detect the rotation and/or position of the sensing wheel 1002. In some embodiments, the sensing units 1004 and 1006 are arranged above the peripheral area of the sensing wheel 1002 where the first strips 1010 and the second strips 1012 are located. The sensing units 1004 and 1006 are fixedly arranged while the sensing wheel 1002 rotates according to the rotation of the rotary knob 720. In some embodiments, the sensing units 1004 and 1006 are secured to the opposite rear surface 958 of the head plate 954 of the carrier support frame 950.

The sensing units 1004 and 1006 are configured to emit light toward the peripheral strip area and receive any reflected light from the peripheral strip area of the sensing wheel 1002. In some embodiments, each of the sensing units 1004 and 1006 includes a light emitting element and a light receiving element (e.g., a photo detector). As the sensing wheel 1002 rotates, the light beam emitted from the sensing units 1004 and 1006 can reflect from the first strips 1010 or the second strips 1012. The light reflected from the first strips 1010 have different reflection from the light reflected from the second strips 1012 due to different reflection coefficients. Therefore, the light reflected from the first strips 1010 generate a first signal, and the light reflected from the second strips 1012 generates a second signal that is different from the first signal.

In some embodiments, the sensing units 1004 and 1006 can process the first signal and the second signal and convert them into a pulse wave that is suitable for interfacing the processing device of the PMSA 500. By way of example, when the first strip 1010 (e.g., black strip) is in front of the sensing unit 1004, 1006, the output voltage switches to a high voltage (e.g., 5 VDC). When the seconds strip 1012 (e.g., white strip) is in front of the sensing unit 1004, 1006, the output voltage switches to a low voltage (e.g., 0 VDC). The processing device of the PMSA 500 can read these pulses and count them. Based on the number of pulses that are detected per wheel revolution, the amount of rotation of the sensing wheel 1002 can be calculated. Thus, the amount of rotation of the rotary knob 720 is also determined because the sensing wheel 1002 is configured to rotate together with the rotary knob 720. In addition or alternatively, the speed of rotation of the sensing wheel 1002 (and thus the speed of rotation of the rotary knob 720) can be also calculated by considering the period of time over which the sensing wheel 1002 rotates.

In some embodiments, the first sensing unit 1004 and the second sensing unit 1006 are used for a quadrature encoder to detect the direction of rotation of the sensing wheel 1002.

The first sensing unit 1004 and the second sensing unit 1006 can be arranged to be pointed at different strips (i.e., either the first strip 1010 or the second strip 1012). By way of example, the first sensing unit 1004 is pointed at the first strip 1010 (e.g., the start thereof) and the second sensing unit 1006 is pointed at the second strip 1012 (e.g., the center thereof). In some embodiments, the first sensing unit 1004 and the second sensing unit 1006 can be located around the sensing wheel 1002 such that they have an offset of one half the width of the first or second strip. Such an offset can provide a phase difference (e.g., lead or lag) of a phase detected from the first sensing unit 1004 and a phase detected from the second sensing unit 1006, and the phase difference can be used to detect the direction of rotation of the sensing wheel 1002.

In other embodiments, the rotational input sensor device 890 can be of other types, such as mechanical encoders, magnetic encoders, capacitive encoders, or other devices that can convert the angular position or motion to an analog or digital signal.

Figure 22:
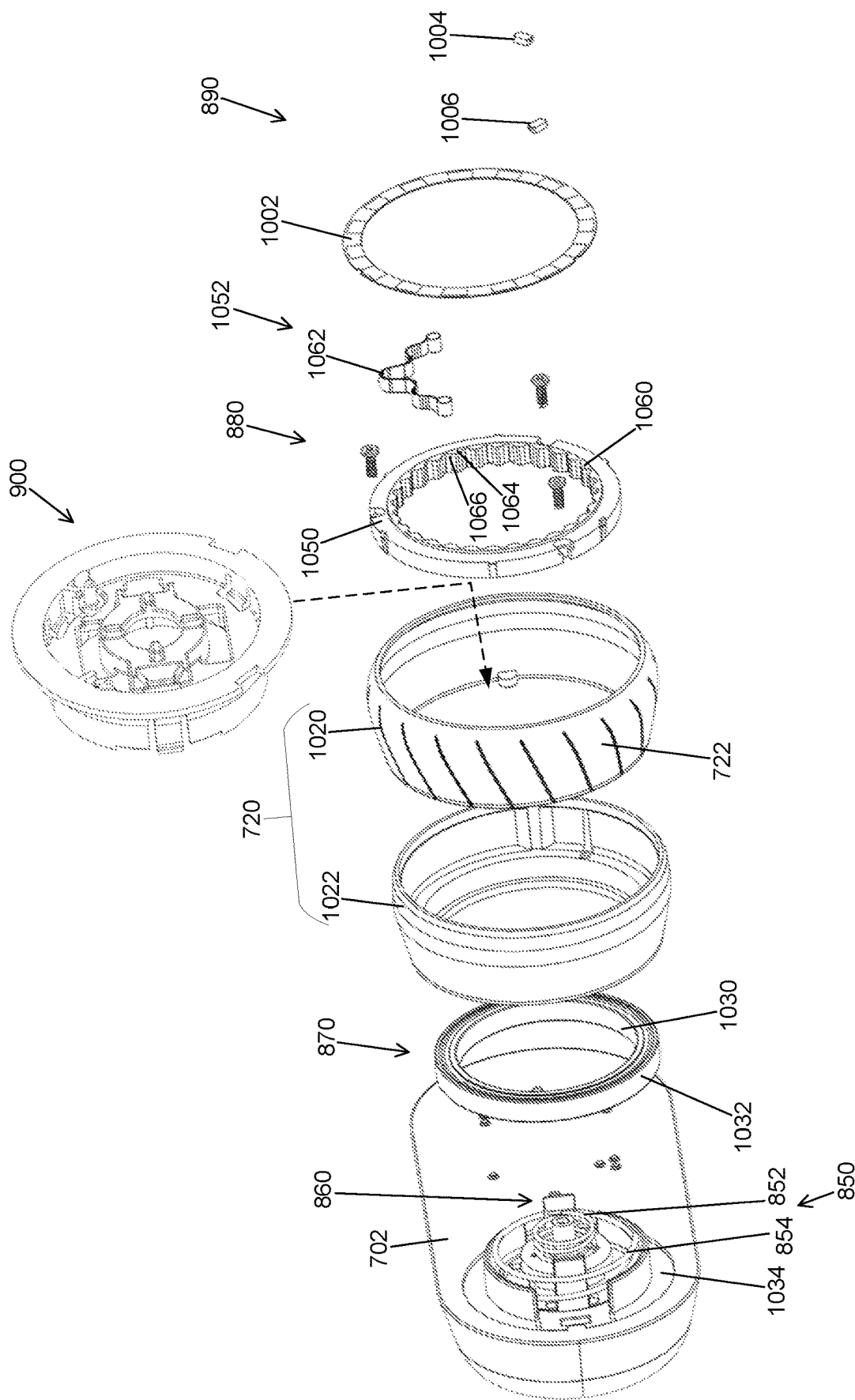
FIG. 22 is a partially exploded perspective view of an internal structure of the control knob assembly.

FIG. 22 is a partially exploded perspective view of the internal structure of the control knob assembly 510. It is noted that the PMSA 500 can include one or more components in addition to the components illustrated in FIG. 22. In some embodiments, the control knob assembly 510 includes the spring device 850, the inner knob support structure 860, the bearing device 870, and the detent device 880. Also shown are the rotary knob 720 and the rotational input sensor device 890. The control knob assembly 510 can further include an inner knob 900.

In some embodiments, the rotary knob 720 includes a ring handle 1020 and a ring bracket 1022. In some embodiments, the ring handle 1020 is configured to provide the peripheral grip surface 722 as described herein. The ring handle 1020 can be secured around the ring bracket 1022 so that the rotational input against the ring handle 1020 causes the rotation of the ring handle 1020 and the ring bracket 1022 together.

In some embodiments, the rotary knob 720 is arranged such that the rotary knob 720 does not interfere with the front face 514 so that the rotary knob 720 and the front face 514 are independently operable by the user input (e.g., the pressing input and the rotational input). As illustrated in FIGS. 14 and 15, for example, the rotary knob 720 and the display carrier assembly 830 are arranged to define a gap 1024 between the outer diameter of the display carrier 910 and the inner diameter of the rotary knob 720 (e.g., the ring bracket 1022 thereof). The gap 1024 is configured such that the display carrier assembly 830 is depressible without interfering with the rotary knob 720, and such that the rotary knob 720 is rotatable without interfering with the display carrier assembly 830.

Further, the inner knob 900 is configured to enable the front face 514 and the rotary knob 720 to operate independently. An example of the inner knob 900 is described and illustrated in more detail herein, such as with reference to FIGS. 26-29.

The spring device 850 is configured to move the knob assembly 510 in response to the press input against the knob face 514. In some embodiments, the spring device 850 includes a first spring unit 852 and a second spring unit 854.

The first spring unit 852 can be configured to enable the display carrier 910 to pivot sideways in response to the press input against the side input regions 516A, 516B, 516C, and 516D on the front face 514. As described and illustrated herein, the first spring unit 852 can be disposed between the carrier base 912 and a portion of the inner knob 900 opposite to the display carrier 910 (e.g., a first spring seat portion 1232 of the inner knob 900).

The second spring unit 854 can be configured to enable the display carrier 910 to be depressed in response to the press input against the center input region 516E on the front face 514. In some embodiments, the second spring unit 854 is configured to enable at least part of the knob assembly 510 to be depressed in response to the press input against the center input region 516E on the front face 514. As described and illustrated herein, the second spring unit 854 can be disposed between the inner knob 900 and the structure 976 (e.g., the knob base structure 1034) in the control knob assembly 510.

The spring device 850 can be of various types. In the illustrated embodiment, the first spring unit 852 and/or the second spring unit 854 are configured as coil springs.

The inner knob support structure 860 is configured to restrict movement of the inner knob 900 within the knob assembly 510. An example of the inner knob support structure 860 is described and illustrated in more detail herein, such as with reference to FIGS. 26-29.

The bearing device 870 is configured to enable the rotary knob 720 to rotate relative to the body 702 of the PMSA 500. In some embodiments, the bearing device 870 includes a ball bearing assembly having an inner race 1030 and an outer race 1032. The inner race 1030 is fixedly secured to a stationary structure in the PMSA 500, and the outer race 1032 is fixedly secured to the rotary knob 720. In some embodiments, the inner race 1030 of the bearing device 870 is mounted to a knob base structure 1034 that is stationary relative to the body 702 of the PMSA 500. In other embodiments, the inner race 1030 of the bearing device 870 is mounted to the inner knob 900, as described herein. The outer race 1032 of the bearing device 870 is mounted to the ring bracket 1022 of the rotary knob 720.

The detent device 880 is configured to resist the rotation of the rotary knob 720 as the rotational input is applied to the rotary knob 720. In some embodiments, such resistance generated by the detent device 880 provides a tactile feedback to the user who holds and rotates the rotary knob 720 relative to the body 702 of the PMSA 500.

In some embodiments, the detent device 880 includes a detent wheel 1050 and an elastic member 1052.

The detent wheel 1050 can be rotatable with the rotary knob 720. In some embodiments, the detent wheel 1050 is mounted to the ring bracket 1022 of the rotary knob 720. In some embodiments, the detent wheel 1050 includes a plurality of grooves 1060 formed at an inner diameter thereof. The grooves 1060 are configured to shape the inner diameter of the detent wheel 1050 in a wave form with ridges 1064 and recesses 1066 (e.g., detents) that are alternately arranged. The shape, dimension, and/or number of the grooves 1060 can be configured to provide different tactile sensation.

The elastic member 1052 can be fixedly arranged in the control knob assembly 510 to be engaged with the detent wheel 1050. In some embodiments, the elastic member 1052 includes an arcuate portion 1062 that is flexible and configured to engage with the grooves 1060. As the detent wheel 1050 rotates together with the rotary knob 720, the arcuate portion 1062 of the elastic member 1052 can continue to contact with the inner diameter of the detent wheel 1050. The arcuate portion 1062 of the elastic member 1052 can flex radially inwardly when the detent wheel 1050 rotates between adjacent grooves 1060, and then flex back into the groove 1060 when the groove 1060 is aligned with the arcuate portion 1062. As the detent wheel 1050 further rotates, the alternating engagement and disengagement between the arcuate portion 1062 of the elastic member 1052 and the grooves 1060 of the detent wheel 1050 can generate resisting force against the rotation of the rotary knob and provide tactile feedback to the user's fingers.

Figure 23:
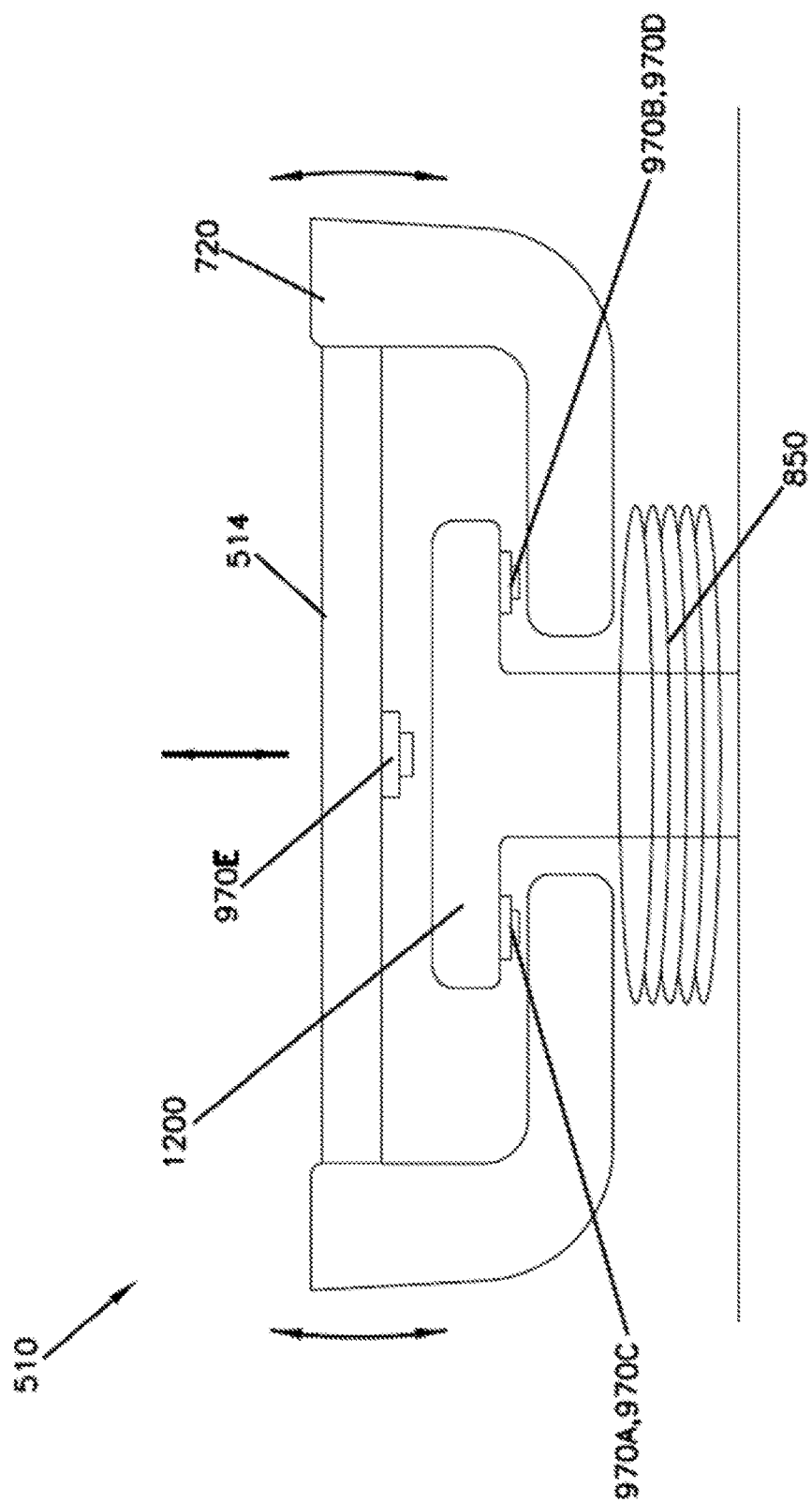
FIG. 23 is a schematic side view of another example embodiment of the control knob assembly.

FIG. 23 is a schematic side view of another example embodiment of the control knob assembly 510. In this embodiment, the front face 514 and the rotary knob 720 are connected and movable together. For example, upon receiving the pressing input at the center input region 516E, the front face 514 and the rotary knob 720 can move together vertically against the spring device 850 and actuates the center press input sensor 970E against a center support member 1200. Further, upon receiving the pressing input at the side input region 516A, 516B, 516C, 516D, the front face 514 and the rotary knob 720 can tilt together sideways against the spring device 850 and actuates the center press input sensor 970E against the center support member 1200.

Figure 24:
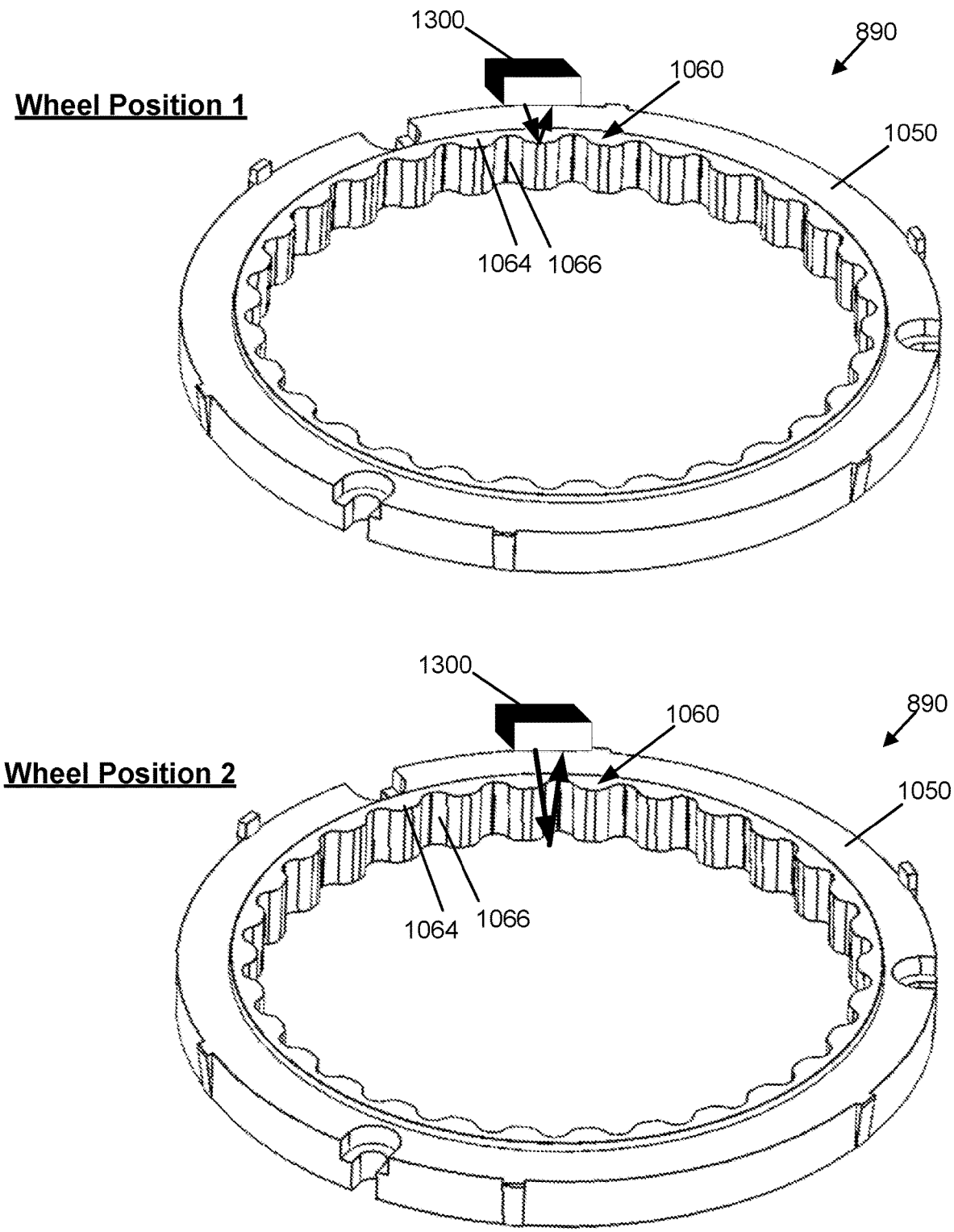
FIG. 24 illustrates another example embodiment of a rotational input sensor device.

FIG. 24 illustrates another example embodiment of the rotational input sensor device 890. In this embodiment, the rotational input sensor device 890 uses the detent wheel 1050 of the detent input device 880. The rotational input sensor device 890 includes at least one sensing unit 1300 that is similar to the sensing units 1004, 1006. The sensing unit 1300 can be arranged above a peripheral area of the detent wheel 1050 where the grooves 1060 are arranged. The sensing unit 1300 can operate to emit light toward the peripheral area and receive reflected light from the peripheral area of the detent wheel 1050. As the detent wheel 1050 rotates, the sensing unit 1300 can be positioned above the ridges 1064 or the recesses 1066. When the sensing unit 1300 is positioned above the ridges 1064 ("Wheel Position 1"), the light emitted from the sensing unit 1300 reflects against the upper surface of the peripheral area of the detent wheel 1050. When the sensing unit 1300 is positioned above the recesses 1066 ("Wheel Position 2"), the light emitted from the sensing unit 1300 reflects against a surface below the detent wheel 1050. The reflected lights in these detent wheel positions have different characteristics. The PMSA 500 can determine the amount, speed, and/or direction of rotation of the detent wheel 1050 (thus the rotary knob 720) based on such different characteristics of the reflected lights.

Figure 25:
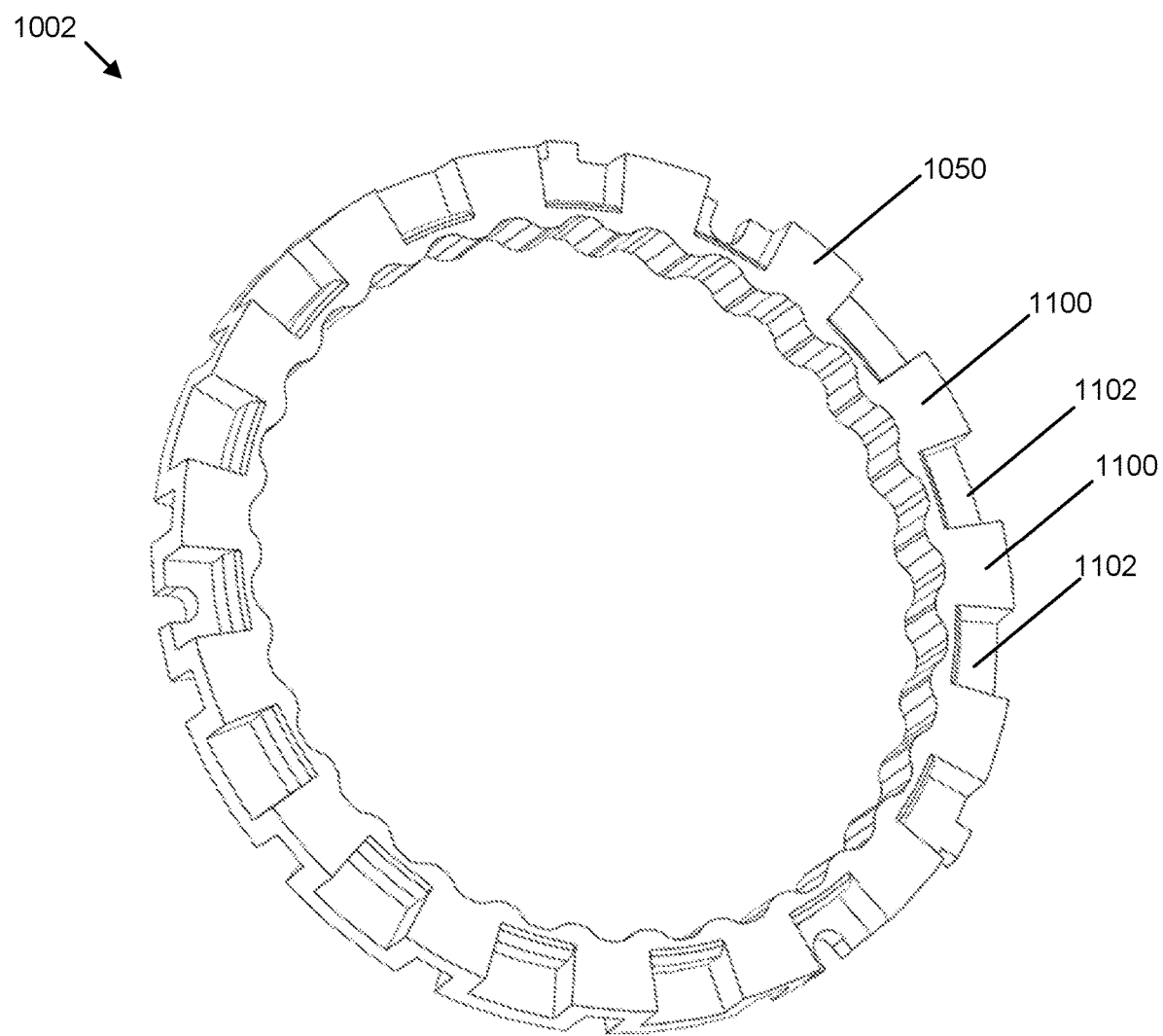
FIG. 25 illustrates another embodiment of a sensing wheel.

FIG. 25 illustrates another embodiment of the sensing wheel 1002. In this embodiment, the sensing wheel 1002 is incorporated with the detent wheel 1050 of the detent device 880. Instead of the first strips 1010 and the second strips 1012 as illustrated in FIGS. 21 and 22, the sensing wheel 1002 (i.e., the detent wheel 1050) includes a plurality of first sensing surfaces 1100 and a plurality of second sensing surfaces 1102 that are alternately arranged at a peripheral area of the sensing wheel 1002 (i.e., the detent wheel 1050). In some embodiments, the second sensing surfaces 1102 are recessed from the first sensing surfaces 1100 so that the first sensing surfaces 1100 and the second sensing surfaces 1102 are arranged at different distances from one or more the sensing units, such as the sensing units 1004 and 1006. Such different distances cause different reflections of light, which are used to determine the amount, speed, and/or direction of rotation of the sensing wheel 1002 (i.e., the detent wheel 1050) (thus the rotary knob 720). For example, when the sensing unit 1004, 1006 is positioned above the first sensing surfaces 1100, the light emitted from the sensing unit 1004, 1006 reflects against the first sensing surfaces 1100 and travels a shorter distance. In contrast, when the sensing unit 1004, 1006 is positioned above the second sensing surfaces 1102, the light emitted from the sensing unit 1004, 1006 reflects against the second sensing surfaces 1102 and travels a longer distance.

Figure 26:
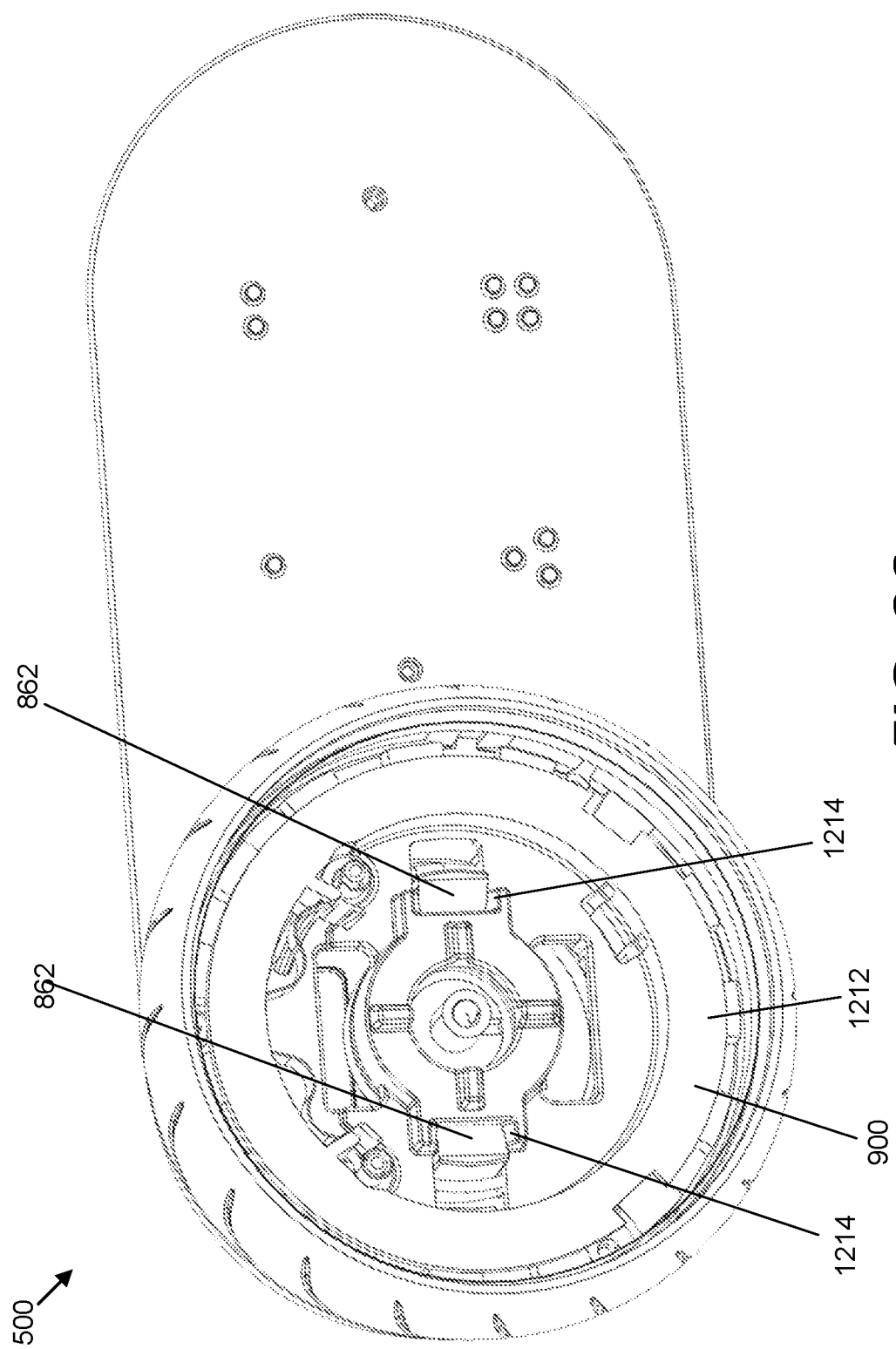
FIG. 26 is a front perspective view of an internal structure of the control knob assembly with an inner knob assembled.
Figure 27:
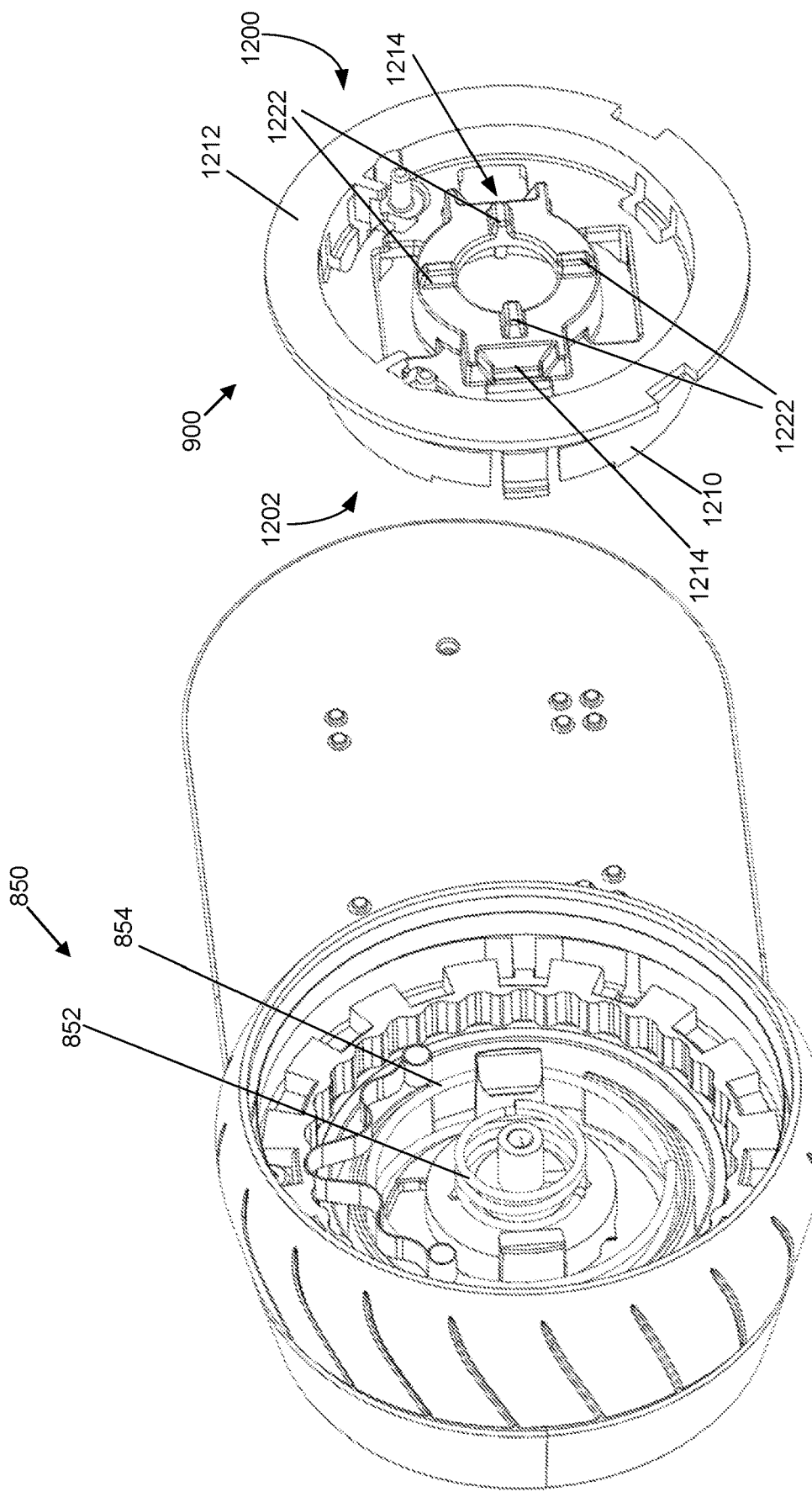
FIG. 27 is a partial exploded view of the control knob assembly of FIG. 26 with the inner knob disassembled.
Figure 28:
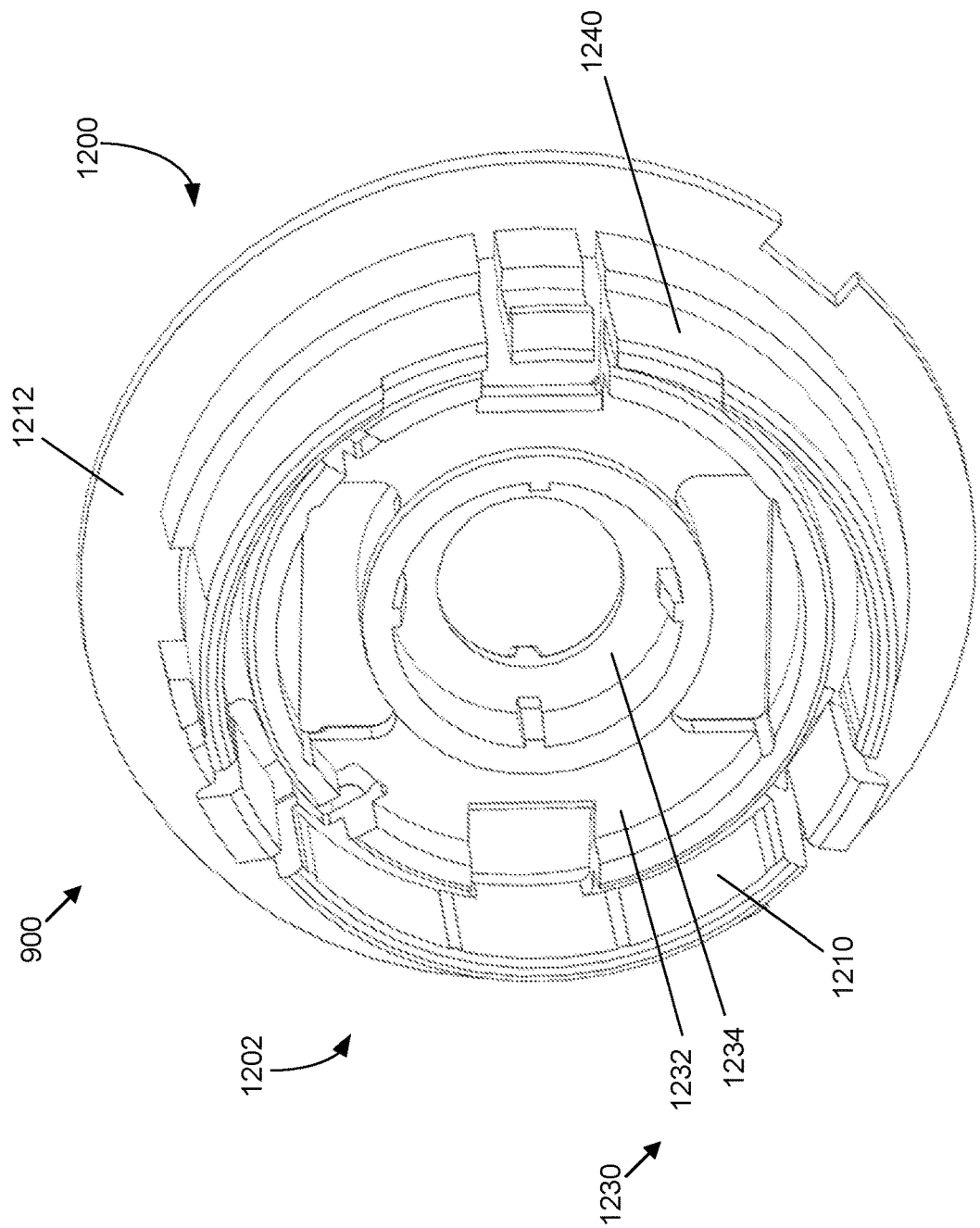
FIG. 28 is a rear perspective view of the inner knob of FIG. 27.
Figure 29:
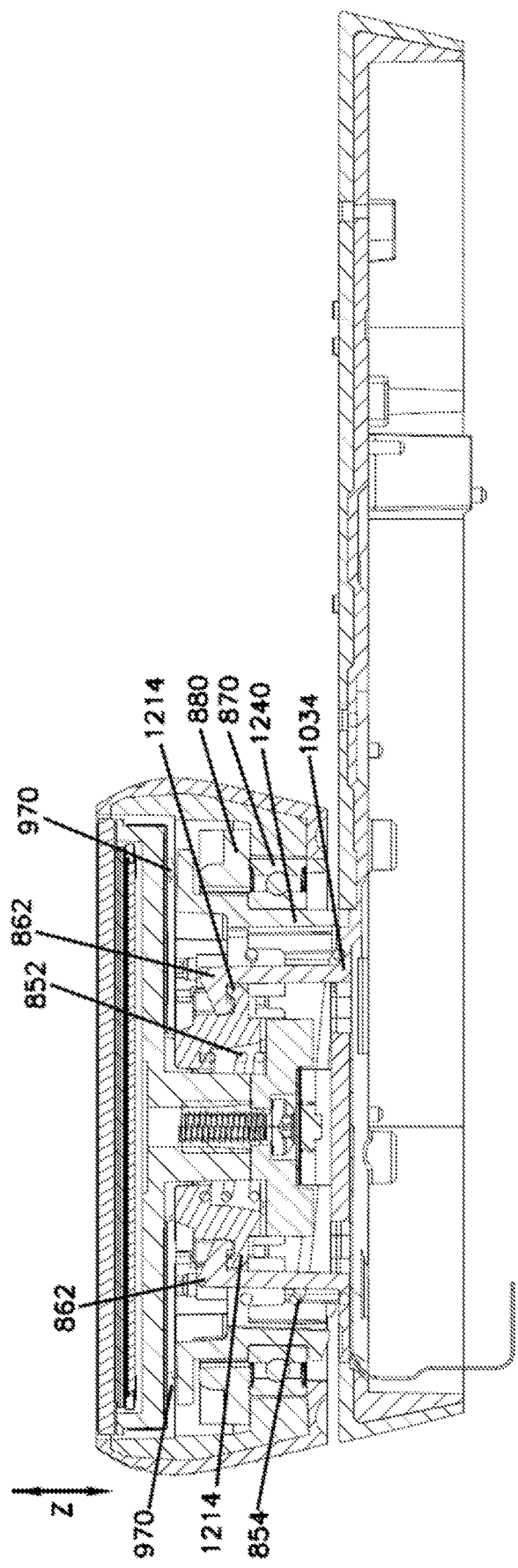
FIG. 29 is a cross sectional view of the control knob assembly with the inner knob assembled.

Referring to FIGS. 26-29, an example of the inner knob 900 is described. In particular, FIG. 26 is a front perspective view of an internal structure of the control knob assembly 510 with the inner knob 900 assembled. FIG. 27 is a partial exploded view of the control knob assembly 510 of FIG. 26 with the inner knob 900 disassembled. FIG. 28 is a rear perspective view of the inner knob 900 of FIG. 27. FIG. 29 is a cross sectional view of the control knob assembly 510 with the inner knob 900 assembled.

The inner knob 900 has a front side 1200 and a rear side 1202 opposite to the front side 1200. The inner knob 900 includes an inner knob body 1210, which can be generally cylindrical in shape. The inner knob 900 includes a peripheral lip portion 1212 extending radially from the inner knob body 1210 at the front side 1200.

The inner knob 900 can be fixedly mounted in the inner structure of the knob assembly 510. As illustrated in FIG. 26, the inner knob 900 can be engaged with the inner knob support structure 860. In some embodiments, the inner knob 900 includes one or more catch portions 1214, and the inner knob support structure 860 includes one or more hooks 862 extending from the knob base structure 1034 and configured to engage with the catch portions 1214, respectively. The inner knob support structure 860 restricts movement of the inner knob 900 in a vertical direction Z (FIG. 29).

In some embodiments, the inner knob support structure 860 can also prevent the inner knob 900 from rotating as the rotary knob 720 (i.e. an outer knob) rotates. For example, the hooks 862 of the inner knob support structure 860 laterally engages with the catch portions 1214 of the inner knob 900 so that the inner knob 900 cannot rotate within the knob assembly 510.

In some embodiments, the inner knob 900 includes the peripheral lip portion 1212 that extends radially from the cylindrical body 1210 at the front side 1200. The peripheral lip portion 1212 provides a contact surface against which the side press input sensors 970A, 970B, 970C, 970D contact to be actuated as the display carrier 910 is pivoted sideways.

The inner knob 900 can include a display carrier support portion 1216 at the front side 1200. The display carrier support portion 1216 is configured to guide the display carrier 910 to tilt (or incline) in the primary directions of rotation 938 (including 938A, 938B, 938C, and 938D). As described herein, the primary directions of rotation 938A, 938B, 938C, and 938D can correspond to the rotational directions in which the display carrier 910 is tilted when the side input regions 516A, 516B, 516C, and 516D (collectively 516) are pressed on the front face 514.

In some embodiments, the display carrier support portion 1216 is configured to engage at least partially with the tilt guide structure 936 of the display carrier 910. The display carrier support portion 1216 can include one or more guide projections 1222 that extend in the directions 944 aligning the primary directions of rotation 938. The guide projections 1222 are configured to at least partially engage with guide grooves 1220 (FIG. 17) between the blocks 940 in the tilt guide structure 936 of the display carrier 910. As the display carrier 910 is tilted sideways, the guide projections 1222 of the display carrier support portion 1216 at least partially engage the guide grooves 1220 of the display carrier 910 to ensure that the display carrier 910 is pivoted in the primary directions of rotation 938.

In some embodiments, the display carrier support portion 1216 can also prevent the display carrier 910 from rotating relative to the inner knob 900. For example, the engagement between the guide projections 1222 and the tilt guide structure 936 of the display carrier 910 stops the display carrier 910 from rotating relative to the inner knob 900.

The inner knob 900 can include a spring seat portion 1230 configured to engage the spring device 850. In some embodiments, the spring seat portion 1230 includes a first spring seat portion 1232 and a second spring seat portion 1234. The first spring seat portion 1232 provides a portion against which one end of the first spring 852 is engaged. The second spring seat portion 1234 provides a portion against which one end of the second spring 854 is engaged.

The inner knob 900 can include a bearing support portion 1240 configured to support the bearing device 870. In some embodiments, the bearing support portion 1240 is provided around the inner knob body 1210. The bearing support portion 1240 can engage the inner race 1030 of the bearing device 870.

Figure 30:
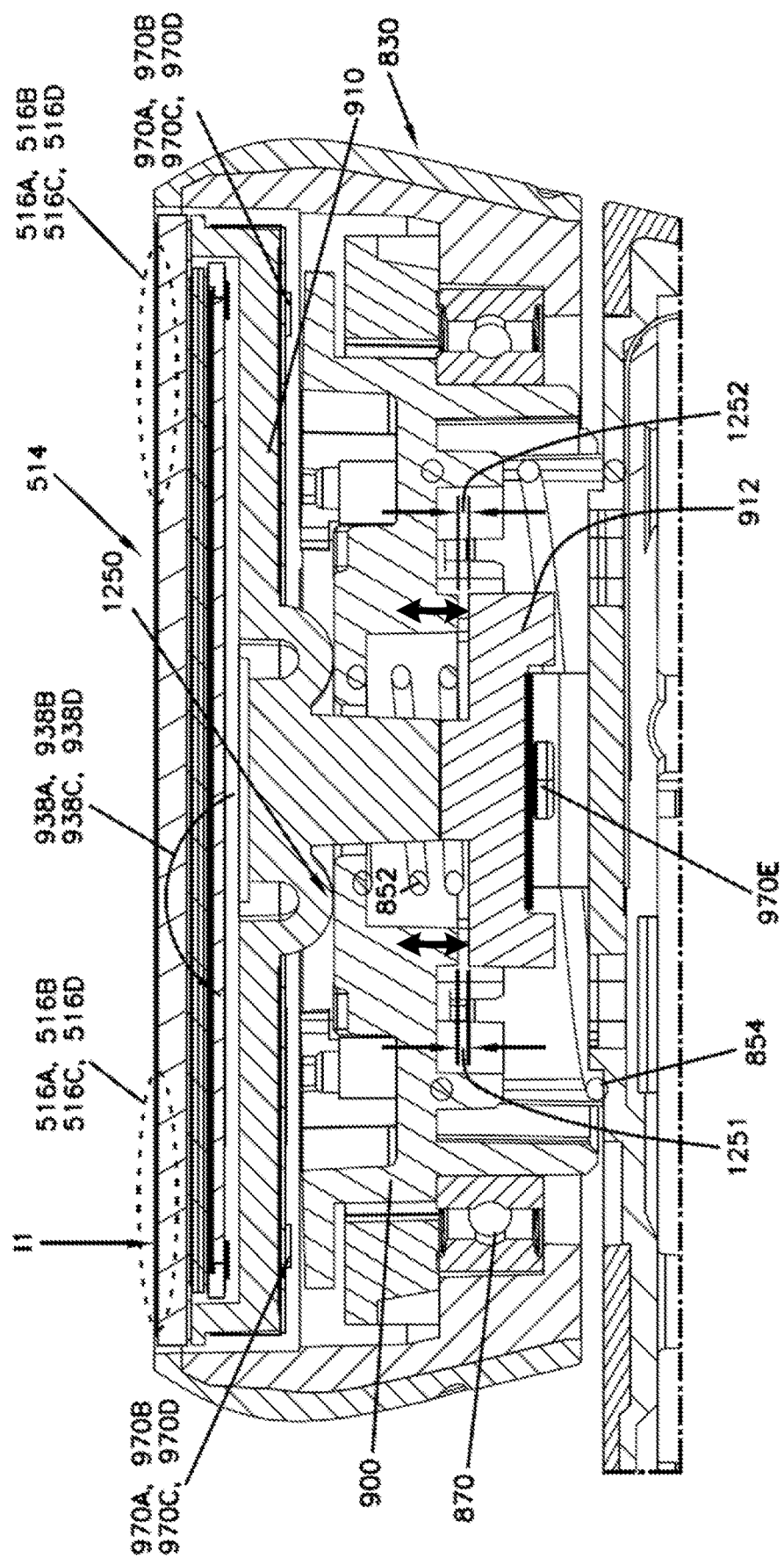
FIG. 30 schematically illustrates an example operation of the control knob assembly in response to a side press input.
Figure 31:
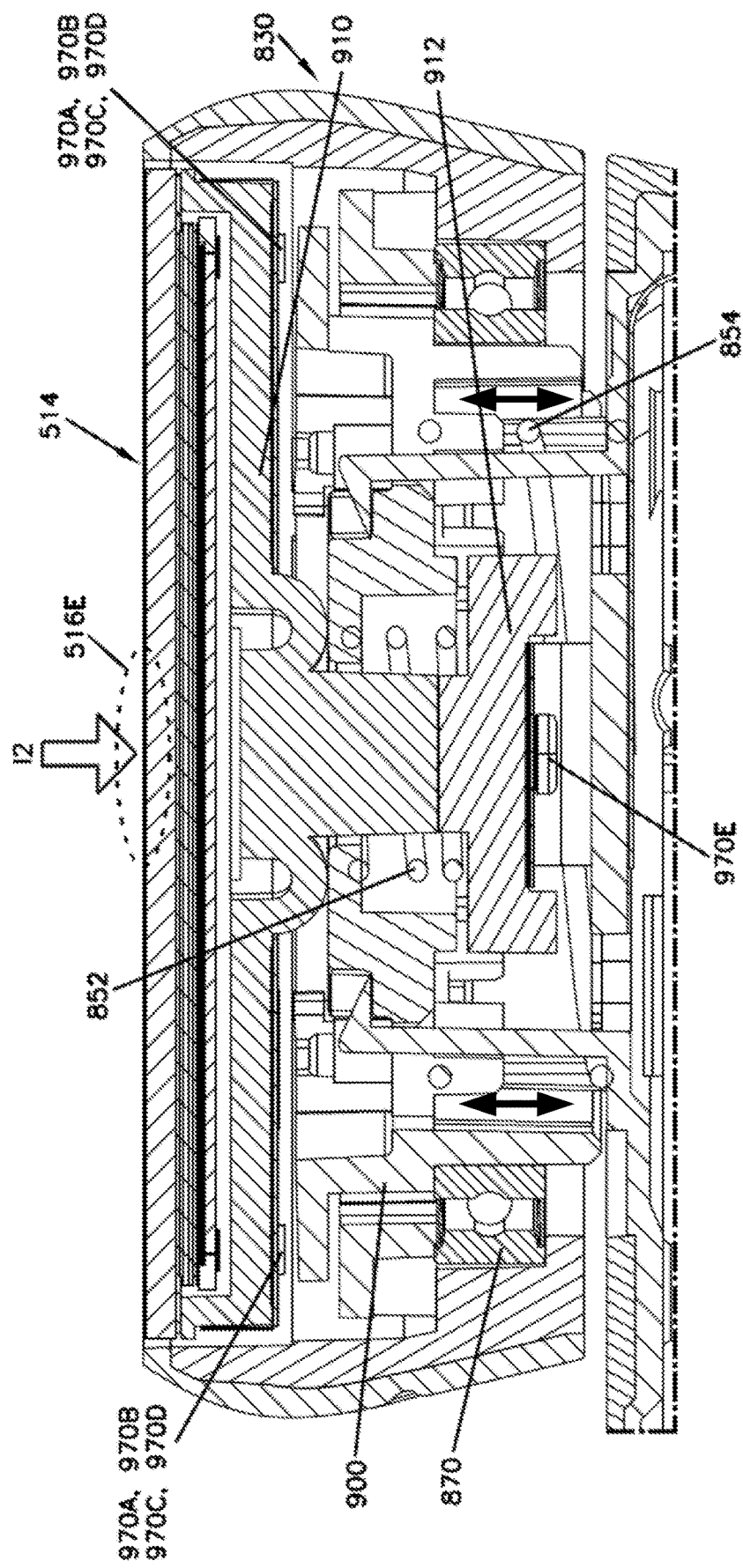
FIG. 31 schematically illustrates an example operation of the control knob assembly in response to a center press input.

Referring to FIGS. 30 and 31, an example operation of the knob assembly 510 is described in response to a press input against the front face 514.

FIG. 30 schematically illustrates an example operation of the knob assembly 510 in response to a side press input I1 against the front face 514. When the side press input I1 is provided against one of the side input regions 516A, 516B, 516C, and 516D on the front face 514, the display carrier assembly 830 (including the display carrier 910 and the carrier base 912) is tilted in a corresponding one of the primary directions of rotation 938A, 938B, 938C, and 938D until a corresponding side press input sensor 970A, 970B, 970C, or 970D contacts and is actuated against the peripheral lip portion 1212 of the inner knob 900.

In some embodiments, the display carrier assembly 830 can pivot at a pivot point 1250 that can be defined by an interface between the tilt guide structure 936 of the display carrier 910 and the display carrier support portion 1216 of the inner knob 900. For example, the pivot point 1250 can be provided by an interface between one or more of the blocks 940 and the surface of the display carrier support portion 1216 while one of the guide projections 1222 engages at least partially with a corresponding guide projection 1222 of the display carrier support portion 1216.

As the side press input I1 is provided, the first spring element 852 is at least partially compressed in a corresponding direction (e.g., the corresponding one of the primary directions of rotation 938A, 938B, 938C, and 938D), so that the display carrier assembly 830 (including the display carrier 910 and the carrier base 912) tilts in the same direction relative to the inner knob 900. In FIG. 30, as the display carrier assembly 830 tilts in response to the side press input I1, a first vertical gap 1251 becomes wider between the inner knob 900 and the carrier base 912 on the side of the side press input I1, and a second vertical gap 1252 becomes narrower between the inner knob 900 and the carrier base 912 on the other side of the side press input I1.

FIG. 31 schematically illustrates an example operation of the knob assembly 510 in response to a center press input I2 against the front face 514. When the center press input I2 is provided against the center input region 516E on the front face 514, the display carrier assembly 830 is depressed until the center press input sensor 970E contacts and is actuated against the structure 976 (e.g., the knob base structure 1034) in the control knob assembly 510.

In some embodiments, upon receiving the center press input I2, the display carrier assembly 830 can press down the inner knob 900 against the second spring element 854 until the center press input sensor 970E is actuated against the structure 976 of the control knob assembly 510. In some embodiments, because the inner knob 900 mounts one or more other components of the knob assembly 510, such other components of the knob assembly 510 can also be depressed together. As described herein, the components that are mounted to the inner knob 900 can include the rotary knob 720 (e.g., the outer knob), the bearing device 870, the detent device 880, and the rotational input sensor device 890. Therefore, in this embodiment, upon the center press input I2, the rotary knob 720 and the display carrier assembly 830 move together and thus the control knob assembly 510 can appear to be depressed entirely upon receiving the center input I2.

As such, the tiling movement of the display carrier assembly 830 can be different than the center depressing movement of the display carrier assembly 830. As described herein, the display carrier assembly 830 has a rounded pivot structure (e.g., the tilt guide structure 936) that can define the tilting movement of the display carrier assembly 830 upon receiving a side press input. The pivot structure controls the vertical direction Z against the inner knob 900 and enables the display carrier assembly 830 to roll in a controlled motion (e.g., in the primary directions of rotation) until the display carrier assembly 830 actuates the side sensors (e.g., the side press input sensor 970A, 970B, 970C, or 970D).

In a normal position (i.e., when no side press input is applied), the first spring unit 852 operates to bias the display carrier assembly 830 and pull the display carrier assembly 830 down against the inner knob 900 so that there is no or little gap in the interface between the display carrier assembly 830 (e.g., the display carrier 910) and the inner knob 900. When the side press input is applied, the first spring unit 852 operates to be compressed as described herein, and a gap can be created between the carrier base 912 and the inner knob 900. When the side press input is removed, the first spring unit 852 operates to push the display carrier assembly 830 back into the normal position. The gap between the carrier base 912 and the inner knob 900 is necessary to allow movement. The first spring unit 852 operates to enable the gap to stay between the carrier base 912 and the inner knob 900, and avoid or reduce a gap between the display carrier 910 and the inner knob 900.

The center depressing movement is only a movement along the vertical direction Z. When the center input region 516E is pressed, the display carrier assembly 830 does not pivot and moves straight down along the vertical direction Z. The downward force can move the display carrier assembly 830 all together (including the display carrier 910, the carrier base 912, and the side press input sensors 970A, 970B, 970C, and 970D) and also move the inner knob 900, thereby pulling the entire knob assembly against the second spring unit 854. In this way, the center depressing movement of the knob assembly 510 does not activate the side press input sensors 970A, 970B, 970C, and 970D. When the center press input is removed, the second spring unit 854 operates to push the knob assembly 510 back into the normal position and has no effect on the side press input sensors 970A, 970B, 970C, and 970D.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A playback control assembly for a media playback device in a vehicle, the playback control assembly comprising:
    a control knob assembly movably engaged with a body of the media playback device and configured to receive manual inputs from a user for controlling playback of media content, the manual inputs including a pressing input and a rotational input, the control knob assembly including:
        a front face input region configured to receive the pressing input, the front face input region configured to be physically depressible upon receiving the pressing input;
        a rotational input surface configured to receive the rotational input and rotate relative to the body of the media playback device upon receiving the rotation input; and
        a spring device configured to bias the front face input region to an undepressed position relative to the body of the media playback device, wherein the spring device includes:
            a first spring unit causing the front face input region to pivot sideways when the pressing input against the front face input region is offset from a center of the front face input region; and
            a second spring unit causing the front face input region to depress when the pressing input against the front face input region is aligned with the center of the front face input region, the second spring unit being concentric with the first spring unit.

2. The playback control assembly of claim 1, further comprising:
    a display device configured to display information relating to the playback of the media content.

3. The playback control assembly of claim 2, further comprising:
    a display carrier configured to receive and support the display device.

4. The playback control assembly of claim 1, wherein the front face input region includes a plurality of input regions including a first region and a second region arranged opposite to the first region with a center of the front face input region therebetween, the front face input region configured to pivot in a first pivot direction and trigger a first playback control instruction when the pressing input is applied on the first region, and pivot in a second pivot direction and trigger a second playback control instruction when the pressing input is applied on the second region.

5. The playback control assembly of claim 4, wherein the plurality of input regions includes a third region and a fourth region arranged opposite to the third region with the center of the front face input region therebetween, the front face input region configured to pivot in a third pivot direction and trigger a third playback control instruction when the pressing input is applied on the third region, and pivot in a fourth pivot direction and trigger a fourth playback control instruction when the pressing input is applied on the fourth region.

6. The playback control assembly of claim 5, wherein the plurality of input regions includes a fifth region arranged at the center of the front face input region, the front face input region configured to depress with respect to the body of the media playback device and trigger a fifth playback control instruction when the pressing input is applied to the fifth region.

7. The playback control assembly of claim 6, wherein the control knob assembly includes:
    a plurality of press input sensors arranged under the plurality of input regions of the front face input region, respectively, each of the plurality of press input sensors configured to be actuated when the pressing input is applied to a corresponding input region of the plurality of input regions, thereby causing the front face input region to be depressed at the corresponding input region.

8. The playback control assembly of claim 7, wherein the plurality of press input sensors is arranged at a plurality of sensor regions, the plurality of sensor regions aligned with the plurality of input regions of the front face input region.

9. The playback control assembly of claim 1, wherein the rotational input surface surrounds the front face input region and provides a peripheral grip surface on which the rotational input is applied to at least partially rotate the control knob assembly.

10. The playback control assembly of claim 1, wherein the control knob assembly includes:
    a rotational input sensor device that detects receipt of the rotational input on the rotational input surface.

11. The playback control assembly of claim 10, wherein the rotational input sensor device includes an optical rotary encoder assembly.

12. The playback control assembly of claim 11, wherein the optical rotary encoder assembly includes:
    a sensing wheel rotatable with the control knob assembly and having first strips and second strips that are alternately arranged, the first strips having a first reflection coefficient, and the second strips having a second reflection coefficient; and
    one or more sensing units, each fixed relative to the control knob assembly and configured to emit light toward the sensing wheel and receive reflected light from the sensing wheel.

13. The playback control assembly of claim 1, wherein the control knob assembly includes:
    a bearing device configured to enable the control knob assembly to rotate relative to the body; and
    a detent device configured to resist the rotation of the control knob assembly.

14. The playback control assembly of claim 13, wherein the detent device includes:
    a detent wheel rotatable with the control knob assembly, the detent wheel having an inner diameter with a plurality of grooves; and
    an elastic member fixedly arranged in the control knob assembly, the elastic member having an arcuate portion configured to engage the plurality of grooves as the detent wheel rotates together with the control knob assembly, thereby providing resisting force against the rotation of the control knob assembly.

* * * * *